(12) United States Patent
Seshadri et al.

(10) Patent No.: US 9,066,092 B2
(45) Date of Patent: Jun. 23, 2015

(54) COMMUNICATION INFRASTRUCTURE INCLUDING SIMULTANEOUS VIDEO PATHWAYS FOR MULTI-VIEWER SUPPORT

(75) Inventors: Nambirajan Seshadri, Irvine, CA (US); Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 372 days.

(21) Appl. No.: 12/982,088

(22) Filed: Dec. 30, 2010

(65) Prior Publication Data

US 2011/0157264 A1 Jun. 30, 2011

Related U.S. Application Data

(60) Provisional application No. 61/291,818, filed on Dec. 31, 2009, provisional application No. 61/303,119, filed on Feb. 10, 2010.

(51) Int. Cl.
*G09G 5/02* (2006.01)
*H04N 13/04* (2006.01)
(Continued)

(52) U.S. Cl.
CPC .......... *H04N 13/0456* (2013.01); *G06F 3/0346* (2013.01); *G06F 3/14* (2013.01); *G09G 3/003* (2013.01); *G09G 3/20* (2013.01); *G09G 5/003* (2013.01); *G09G 5/14* (2013.01); *G09G 2300/023* (2013.01); *G09G 2320/028* (2013.01); *G09G 2370/04* (2013.01);
(Continued)

(58) Field of Classification Search
None
See application file for complete search history.

(56) References Cited

U.S. PATENT DOCUMENTS

| 4,829,365 A | 5/1989 | Eichenlaub |
| 5,493,427 A | 2/1996 | Nomura et al. |

(Continued)

FOREIGN PATENT DOCUMENTS

| EP | 0833183 A1 | 4/1998 |
| EP | 1662808 A1 | 5/2006 |

(Continued)

OTHER PUBLICATIONS

"How browsers work", retrieved from <http://taligarsiel.com/Projects/howbrowserswork1.htm> on Oct. 21, 2010, 54 pages.

(Continued)

*Primary Examiner* — Jesus Hernandez
(74) *Attorney, Agent, or Firm* — Fiala & Weaver P.L.L.C.

(57) ABSTRACT

A communication system is described that allows co-located viewers to simultaneously consume different media content, such as different video content, via the same display screen, wherein video content delivered to at least one co-located viewer is not visible to the other co-located viewer(s). The communication system comprises an infrastructure that includes multiple pathways for delivering media content from one or more media sources to the eyes of each of the co-located viewers, wherein each pathway passes through the pixels of a pixel array included in the shared display screen. The pathways also include distributed or non-distributed processing circuitry that manages certain resources that are shared among the multiple pathways, wherein such shared resources may include shared display resources (e.g., pixels of the pixel array and light generated thereby) and shared data communication resources (e.g., bandwidth on data communication links and processing resources of nodes located on such links).

28 Claims, 22 Drawing Sheets

(51) Int. Cl.
*G06F 3/14* (2006.01)
*G09G 3/00* (2006.01)
*G09G 3/20* (2006.01)
*H04N 13/00* (2006.01)
*H04N 21/235* (2011.01)
*H04N 21/41* (2011.01)
*H04N 21/435* (2011.01)
*G03B 35/24* (2006.01)
*H04S 7/00* (2006.01)
*G06F 3/0346* (2013.01)
*G09G 5/00* (2006.01)
*G09G 5/14* (2006.01)

(52) U.S. Cl.
CPC ...... *H04N 13/0029* (2013.01); *H04N 13/0048* (2013.01); *H04N 13/0055* (2013.01); *H04N 13/0059* (2013.01); *H04N 13/0404* (2013.01); *H04N 13/0409* (2013.01); *H04N 13/0411* (2013.01); *H04N 13/0447* (2013.01); *H04N 13/0454* (2013.01); *H04N 13/0468* (2013.01); *H04N 13/0497* (2013.01); *H04N 21/235* (2013.01); *H04N 21/4122* (2013.01); *H04N 21/435* (2013.01); *H04N 2013/0463* (2013.01); *H04N 2013/0465* (2013.01); *G03B 35/24* (2013.01); *H04N 13/0413* (2013.01); *H04S 7/303* (2013.01); *H04N 13/0429* (2013.01); *H04N 13/0484* (2013.01)

(56) References Cited

U.S. PATENT DOCUMENTS

| | | |
|---|---|---|
| 5,615,046 A | 3/1997 | Gilchrist |
| 5,855,425 A | 1/1999 | Hamagishi |
| 5,945,965 A | 8/1999 | Inoguchi et al. |
| 5,959,597 A | 9/1999 | Yamada et al. |
| 5,969,850 A | 10/1999 | Harrold et al. |
| 5,990,975 A | 11/1999 | Nan et al. |
| 6,023,277 A | 2/2000 | Osaka et al. |
| 6,049,424 A | 4/2000 | Hamagishi |
| 6,094,216 A | 7/2000 | Taniguchi et al. |
| 6,144,375 A | 11/2000 | Jain et al. |
| 6,188,442 B1 | 2/2001 | Narayanaswami |
| 6,285,368 B1 | 9/2001 | Sudo |
| 6,697,687 B1 | 2/2004 | Kasahara et al. |
| 6,710,920 B1 | 3/2004 | Mashitani et al. |
| 6,909,555 B2 | 6/2005 | Wohlstadter |
| 7,030,903 B2 | 4/2006 | Sudo |
| 7,038,698 B1 | 5/2006 | Palm et al. |
| 7,091,471 B2 | 8/2006 | Wenstrand et al. |
| 7,123,213 B2 | 10/2006 | Yamazaki et al. |
| 7,190,518 B1 | 3/2007 | Kleinberger et al. |
| 7,359,105 B2 | 4/2008 | Jacobs et al. |
| 7,440,193 B2 | 10/2008 | Gunasekaran et al. |
| 7,511,774 B2 | 3/2009 | Lee et al. |
| 7,626,644 B2 | 12/2009 | Shestak et al. |
| 7,646,451 B2 | 1/2010 | Vogel et al. |
| 7,692,859 B2 | 4/2010 | Redert et al. |
| 7,885,079 B2 | 2/2011 | Chen et al. |
| 7,911,442 B2 | 3/2011 | Wang et al. |
| 7,924,456 B1 | 4/2011 | Kahn et al. |
| 7,954,967 B2 | 6/2011 | Kashiwagi et al. |
| 7,997,783 B2 | 8/2011 | Song et al. |
| 8,040,952 B2 | 10/2011 | Park et al. |
| 8,044,983 B2 | 10/2011 | Nonaka et al. |
| 8,049,710 B2 | 11/2011 | Shestak et al. |
| 8,072,411 B2 | 12/2011 | Chen et al. |
| 8,139,024 B2 | 3/2012 | Daiku |
| 8,154,686 B2 | 4/2012 | Mather et al. |
| 8,154,799 B2 | 4/2012 | Kim et al. |
| 8,174,564 B2 | 5/2012 | Kim et al. |
| 8,183,788 B2 | 5/2012 | Ma |
| 8,209,396 B1 | 6/2012 | Raman et al. |
| 8,233,034 B2 | 7/2012 | Sharp et al. |
| 8,284,119 B2 | 10/2012 | Kim et al. |
| 8,310,527 B2 | 11/2012 | Ko et al. |
| 8,334,933 B2 | 12/2012 | Tsukada et al. |
| 8,363,928 B1 | 1/2013 | Sharp |
| 8,368,745 B2 | 2/2013 | Nam et al. |
| 8,384,774 B2 | 2/2013 | Gallagher |
| 8,400,392 B2 | 3/2013 | Kimura et al. |
| 8,411,746 B2 | 4/2013 | Chen et al. |
| 8,438,601 B2 | 5/2013 | Putterman et al. |
| 8,441,430 B2 | 5/2013 | Lee |
| 8,466,869 B2 | 6/2013 | Kobayashi et al. |
| 8,482,512 B2 | 7/2013 | Adachi et al. |
| 8,487,863 B2 | 7/2013 | Park et al. |
| 8,525,942 B2 | 9/2013 | Robinson et al. |
| 8,587,642 B2 | 11/2013 | Shestak et al. |
| 8,587,736 B2 | 11/2013 | Kang |
| 8,605,136 B2 | 12/2013 | Yu et al. |
| 8,687,042 B2 | 4/2014 | Karaoguz et al. |
| 8,736,659 B2 | 5/2014 | Liu |
| 8,766,905 B2 | 7/2014 | Adachi |
| 8,823,782 B2 | 9/2014 | Karaoguz et al. |
| 8,854,531 B2 | 10/2014 | Karaoguz et al. |
| 8,885,026 B2 | 11/2014 | Endo |
| 8,922,545 B2 | 12/2014 | Bennett et al. |
| 2002/0010798 A1* | 1/2002 | Ben-Shaul et al. ........... 709/247 |
| 2002/0037037 A1 | 3/2002 | Van Der Schaar |
| 2002/0167862 A1 | 11/2002 | Tomasi et al. |
| 2002/0171666 A1 | 11/2002 | Endo et al. |
| 2003/0012425 A1 | 1/2003 | Suzuki et al. |
| 2003/0103165 A1 | 6/2003 | Bullinger et al. |
| 2003/0137506 A1 | 7/2003 | Efran et al. |
| 2003/0154261 A1 | 8/2003 | Doyle et al. |
| 2003/0223499 A1 | 12/2003 | Routhier et al. |
| 2004/0027452 A1 | 2/2004 | Yun et al. |
| 2004/0036763 A1 | 2/2004 | Swift et al. |
| 2004/0041747 A1 | 3/2004 | Uehara et al. |
| 2004/0109093 A1 | 6/2004 | Small-Stryker |
| 2004/0141237 A1 | 7/2004 | Wohlstadter |
| 2004/0164292 A1 | 8/2004 | Tung et al. |
| 2004/0239231 A1 | 12/2004 | Miyagawa et al. |
| 2004/0252187 A1 | 12/2004 | Alden |
| 2005/0073472 A1 | 4/2005 | Kim et al. |
| 2005/0128353 A1 | 6/2005 | Young et al. |
| 2005/0237487 A1 | 10/2005 | Chang |
| 2005/0248561 A1 | 11/2005 | Ito et al. |
| 2005/0259147 A1 | 11/2005 | Nam et al. |
| 2006/0050785 A1 | 3/2006 | Watanabe et al. |
| 2006/0087556 A1 | 4/2006 | Era |
| 2006/0109242 A1 | 5/2006 | Simpkins |
| 2006/0139448 A1 | 6/2006 | Ha et al. |
| 2006/0139490 A1 | 6/2006 | Fekkes et al. |
| 2006/0244918 A1 | 11/2006 | Cossairt et al. |
| 2006/0256136 A1 | 11/2006 | O'Donnell et al. |
| 2006/0256302 A1 | 11/2006 | Hsu |
| 2006/0271791 A1 | 11/2006 | Novack et al. |
| 2007/0002041 A1 | 1/2007 | Kim et al. |
| 2007/0008406 A1 | 1/2007 | Shestak et al. |
| 2007/0008620 A1 | 1/2007 | Shestak et al. |
| 2007/0052807 A1 | 3/2007 | Zhou et al. |
| 2007/0072674 A1 | 3/2007 | Ohta et al. |
| 2007/0085814 A1* | 4/2007 | Ijzerman et al. ............. 345/102 |
| 2007/0096125 A1 | 5/2007 | Vogel et al. |
| 2007/0097103 A1* | 5/2007 | Yoshioka et al. ........... 345/204 |
| 2007/0097208 A1 | 5/2007 | Takemoto et al. |
| 2007/0139371 A1* | 6/2007 | Harsham et al. ............ 345/156 |
| 2007/0146267 A1 | 6/2007 | Jang et al. |
| 2007/0147827 A1 | 6/2007 | Sheynman et al. |
| 2007/0153916 A1 | 7/2007 | Demircin et al. |
| 2007/0162392 A1 | 7/2007 | McEnroe et al. |
| 2007/0258140 A1 | 11/2007 | Shestak et al. |
| 2007/0270218 A1 | 11/2007 | Yoshida et al. |
| 2007/0296874 A1 | 12/2007 | Yoshimoto et al. |
| 2008/0025390 A1 | 1/2008 | Shi et al. |
| 2008/0037120 A1 | 2/2008 | Koo et al. |
| 2008/0043096 A1 | 2/2008 | Vetro et al. |
| 2008/0043644 A1 | 2/2008 | Barkley et al. |
| 2008/0068329 A1 | 3/2008 | Shestak et al. |
| 2008/0126557 A1 | 5/2008 | Motoyama et al. |

(56) References Cited

U.S. PATENT DOCUMENTS

| | | |
|---|---|---|
| 2008/0133122 A1* | 6/2008 | Mashitani et al. ............ 701/200 |
| 2008/0150853 A1 | 6/2008 | Peng et al. |
| 2008/0165176 A1 | 7/2008 | Archer et al. |
| 2008/0168129 A1* | 7/2008 | Robbin et al. ................ 709/203 |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0204550 A1 | 8/2008 | De Zwart et al. |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1* | 1/2009 | Zhang ...................... 370/395.21 |
| 2009/0051759 A1 | 2/2009 | Adkins et al. |
| 2009/0052164 A1 | 2/2009 | Kashiwagi et al. |
| 2009/0058845 A1* | 3/2009 | Fukuda et al. ................ 345/214 |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138805 A1 | 5/2009 | Hildreth |
| 2009/0141182 A1 | 6/2009 | Miyashita et al. |
| 2009/0167639 A1* | 7/2009 | Casner et al. ................... 345/58 |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0268816 A1 | 10/2009 | Pandit et al. |
| 2009/0319625 A1 | 12/2009 | Kouhi |
| 2010/0007582 A1 | 1/2010 | Zalewski |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0182407 A1 | 7/2010 | Ko et al. |
| 2010/0208042 A1 | 8/2010 | Ikeda et al. |
| 2010/0215343 A1 | 8/2010 | Ikeda et al. |
| 2010/0218231 A1 | 8/2010 | Frink et al. |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0302461 A1 | 12/2010 | Lim et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1* | 1/2012 | Priddle et al. ................. 707/827 |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |

FOREIGN PATENT DOCUMENTS

| | | |
|---|---|---|
| EP | 1816510 A1 | 8/2007 |
| EP | 1993294 A2 | 11/2008 |
| TW | 200938878 A | 9/2009 |
| WO | 2005/045488 A1 | 5/2005 |
| WO | 2007/024118 A1 | 3/2007 |
| WO | 2008126557 A1 | 10/2008 |
| WO | 2009031872 A2 | 3/2009 |
| WO | 2009/098622 A2 | 8/2009 |

OTHER PUBLICATIONS

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

Wikipedia entry on "Scripting language", available online at <http://en.wikipedia.org/wiki/Scripting_language>, retrieved on Aug. 16, 2012, 4 pages.

Shan et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006, pp. 365-372.

Peterka, Thomas, "Dynallax: Dynamic Parallax Barrier Autostereoscopic Display", PH.D. Dissertation, University of Illinois at Chicago, 2007, 134 pages.

Yanagisawa et al., "A Focus Distance Controlled 3D TV", Proc. SPIE 3012, Stereoscopic Displays and Virtual Reality Systems IV, May 15, 1997, pp. 256-261.

EPO Communication received for European Patent Application No. 10016055.5, dated Apr. 5, 2013, 6 pages.

Yanaka, Kazuhisa, "Stereoscopic Display Technique for Web3D Images", SIGGRAPH 2009, New Orleans, Louisiana, Aug. 3-7, 2009, 1 page.

European Search Report received for European Patent application No. 10016055.5, mailed on Apr. 12, 2011, 3 pages.

European Search Report received for European Patent application No. 10015984.7, mailed on May 3, 2011, 3 pages.

Fono, et al., "EyeWindows: Evaluation of Eye-Controlled Zooming Windows for Focus Selection", Apr. 2005, pp. 151-160.

Kumar, et al., "Eye Point: Practical Pointing and Selection Using Gaze and Keyboard", Apr. 2007, pp. 1-10.

Ko et al., "Facial Feature Tracking and Head Orientation-based Gaze Tracking", Electronics and Telecommunications Research Institute (ETRI), 2000, 4 Pages.

(56) References Cited

OTHER PUBLICATIONS

Ruddarraju et al., "Perceptual User Interfaces using Vision-based Eye Tracking", School of Electrical and Computer Engineering and GVU Center, College of Computing, Georgia Institute of Technology, 2003, 7 Pages.

"Displaying Stereoscopic 3D (S3D) with Intel HD Graphics Processors for Software Developers", Intel, Aug. 2011, pp. 1-10.

Liao, et al.,"The Design and Application of High-Resolution 3D Stereoscopic graphics Display on PC", Purdue University School of Science, 2000, 7 pages.

Office Action Received for Chinese Patent Application No. 201010619649.3, mailed on Mar. 31, 2014, 7 pages of Chinese Office action.

Office Action Received for Chinese Patent Application No. 201010619646.X, mailed on Mar. 5, 2014, 4 pages of Chinese Office action.

Office Action Received for Taiwan Patent Application No. 099147124, mailed on Mar. 31, 2014, 8 pages of official copy.

Office Action received for Chinese Patent Application No. 201010619649.3, mailed on Oct. 11, 2014, 5 pages (Official Copy only).

\* cited by examiner

COMMUNICATION INFRASTRUCTURE INCLUDING SIMULTANEOUS VIDEO PATHWAYS FOR MULTI-VIEWER SUPPORT

CROSS-REFERENCE TO RELATED APPLICATIONS

This application claims the benefit of U.S. Provisional Patent Application No. 61/291,818, filed on Dec. 31, 2009, and U.S. Provisional Patent Application No. 61/303,119, filed on Feb. 10, 2010. The entirety of each of these applications is incorporated by reference herein.

This application is also related to the following U.S. Patent Applications, each of which also claims the benefit of U.S. Provisional Patent Application Nos. 61/291,818 and 61/303,119 and each of which is incorporated by reference herein:

U.S. patent application Ser. No. 12/774,225, filed on May 5, 2010 and entitled "Controlling a Pixel Array to Support an Adaptable Light Manipulator";

U.S. patent application Ser. No. 12/774,307, filed on May 5, 2010 and entitled "Display with Elastic Light Manipulator";

U.S. patent application Ser. No. 12/845,409, filed on Jul. 28, 2010, and entitled "Display with Adaptable Parallax Barrier";

U.S. patent application Ser. No. 12/845,440, filed on Jul. 28, 2010, and entitled "Adaptable Parallax Barrier Supporting Mixed 2D and Stereoscopic 3D Display Regions";

U.S. patent application Ser. No. 12/845,461, filed on Jul. 28, 2010, and entitled "Display Supporting Multiple Simultaneous 3D Views";

U.S. patent application Ser. No. 12/982,020, filed on even date herewith and entitled "Backlighting Array Supporting Adaptable Parallax Barrier";

U.S. patent application Ser. No. 12/982,031, filed on even date herewith and entitled "Coordinated Driving of Adaptable Light Manipulator, Backlighting and Pixel Array in Support of Adaptable 2D and 3D Displays";

U.S. patent application Ser. No. 12/982,062, filed on even date herewith and entitled "Set-top Box Circuitry that Supports Selective Delivery of 2D and 3D Content to Support a Viewing Environment";

U.S. patent application Ser. No. 12/982,069, filed on even date herewith and entitled "Three-Dimensional Display System With Adaptation Based on Viewing Reference of Viewer(s)"; and U.S. patent application Ser. No. 12/982,078, filed on even date herewith and entitled "Multiple Remote Controllers that Each Simultaneously Controls a Different Visual Presentation of a 2D/3D Display."

BACKGROUND OF THE INVENTION

1. Field of the Invention

The present invention generally relates to communication systems and associated infrastructures that facilitate the delivery of media content, such as video content, to co-located viewers.

2. Background Art

There are rising desires and expectations for personal and interactive media delivery that is causing dissatisfaction among co-located viewers. For example, co-located viewers of a television must share a single display screen and, typically, a single remote control associated therewith. In such an environment, the selection of particular media content (e.g., particular video content) by one viewer often leads to disputes and viewer dissatisfaction. Where the selected media content is interactive, those who are not in control of the remote control and the interactivity decisions implemented therewith may become further dissatisfied. Additionally, when one viewer invokes pause, rewind, and replay type functions during video playback, this can prove annoying to other co-located viewers. Likewise, when one viewer utilizes the shared display screen to check other media or data (e.g., e-mail, etc.) during video playback, this can annoy other co-located viewers. Additionally, the communication of widgets and such to accompany a video selection are often not tailored to all viewers. Similar problems exist for other devices having a single display screen such as computers, smart phones, and the like.

Certain televisions implement so-called "picture-in-picture" (PIP) technology to allow two video streams to be viewed simultaneously via the same display screen. However, this technology is less than optimal in that the PIP view is typically fixed in size, smaller than desired, and is presented at the expense of a portion of the larger view. Furthermore the PIP view is typically presented without accompanying audio.

Certain video games have been designed that partition a shared display "space" into different sections in order to accommodate views associated with multiple co-located players. This approach is less than optimal in that each player must accept a fixed view of reduced size and also in that each player can see the views of the other players, which can be confusing and lead to unfair game practices. This approach is also less than optimal in that although each player has their own view, they do not have their own accompanying audio.

BRIEF SUMMARY OF THE INVENTION

A communication system is described herein that allows co-located viewers to simultaneously consume different media content, such as different video content, via the same display screen, wherein video content delivered to at least one co-located viewer is not visible to the other co-located viewer(s). The communication system comprises an infrastructure that includes multiple pathways for delivering media content from one or more media sources to the eyes of each of the co-located viewers, wherein each pathway passes through the pixels of a pixel array included in the shared display screen. The pathways also include distributed or non-distributed processing circuitry that manages certain resources that are shared among the multiple pathways, wherein such shared resources may include shared display resources (e.g., pixels of the pixel array and light generated thereby) and shared data communication resources (e.g., bandwidth on data communication links and processing resources of nodes located on such links).

In certain embodiments, the processing circuitry manages the shared resources by managing the utilization thereof to simultaneously support the multiple pathways. In further embodiments, the processing circuitry manages the shared resources by setting up or modifying an allocation of a shared resource among the multiple pathways based on an ascertained characteristic associated with at least one of the pathways. The processing circuitry may be configured to receive feedback and/or to gather pathway characteristics to facilitate resource allocation decisions. By simultaneously and adaptively managing each of the pathways, the processing circuitry can provide a stable, simultaneous, multiple-viewer viewing environment that can adapt over time as underlying pathway characteristics change. A communication system and infrastructure in accordance with the above are substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 16:
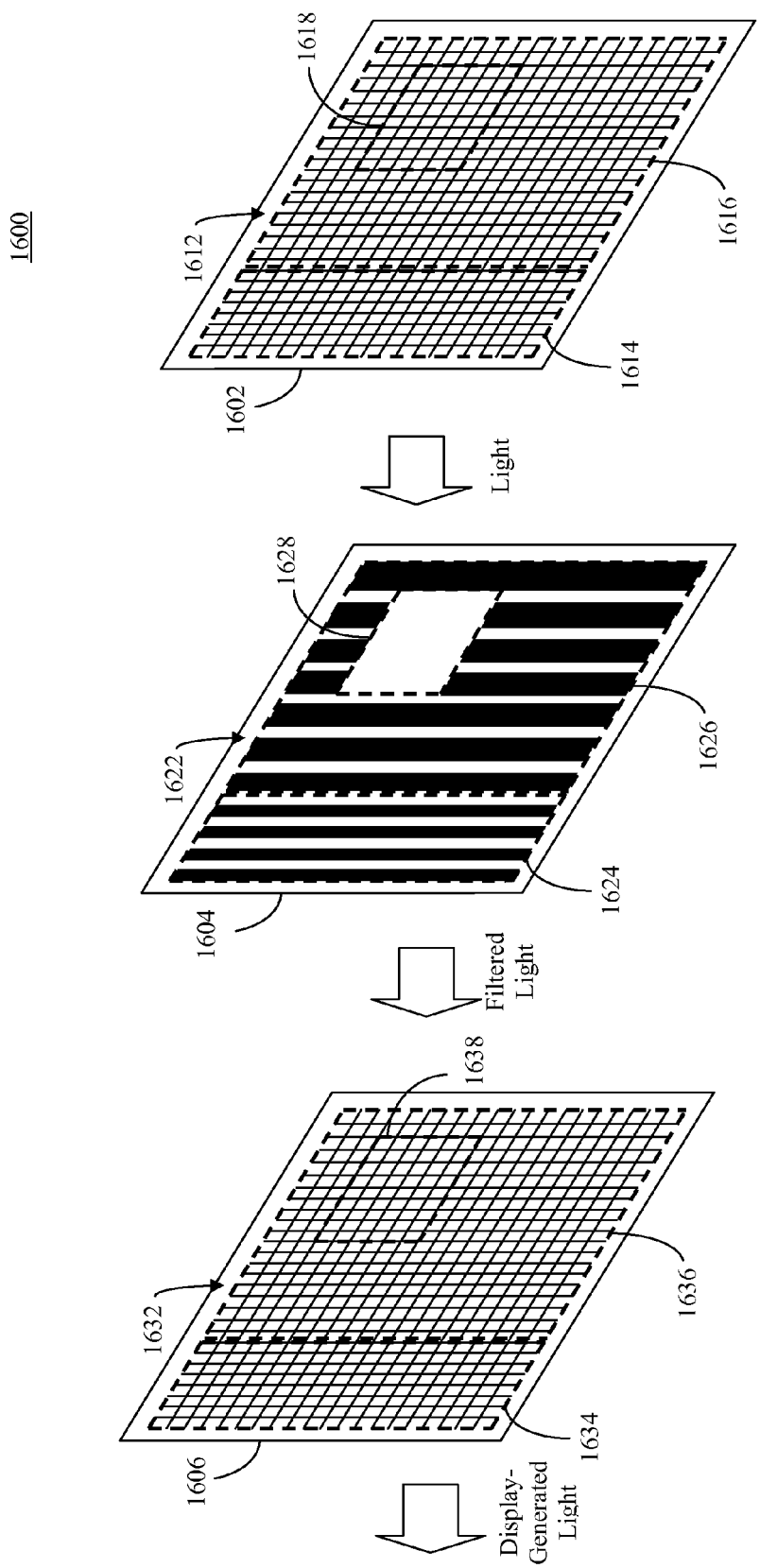

FIG. 16 provides an exploded view of a display system that utilizes a controllable backlight array to provide regional luminosity control in accordance with an embodiment.

Figure 17:
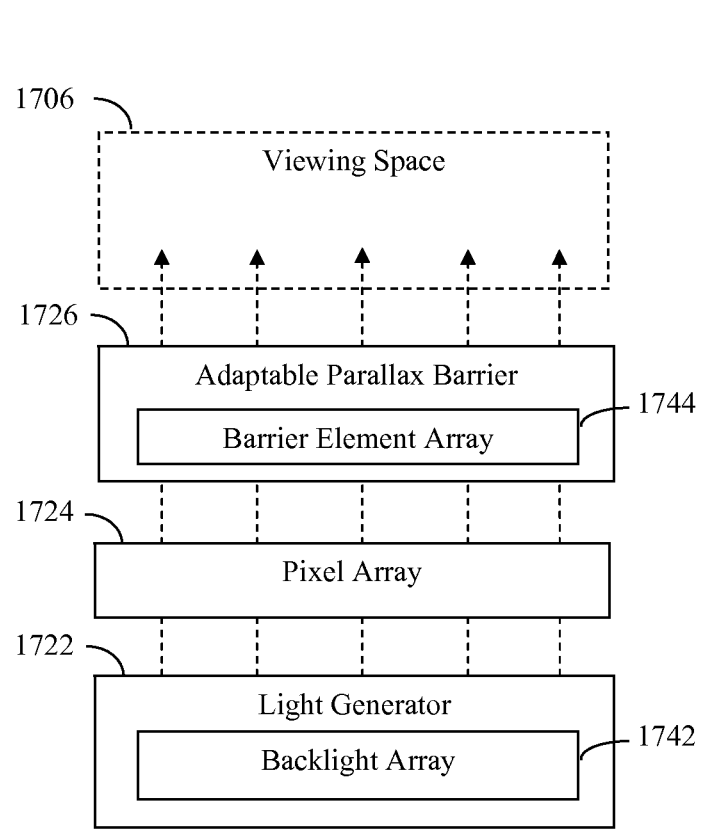

FIG. 17 is a block diagram of a display system that includes a pixel array disposed between a light generator and an adaptable parallax barrier in accordance with an embodiment.

Figure 18:
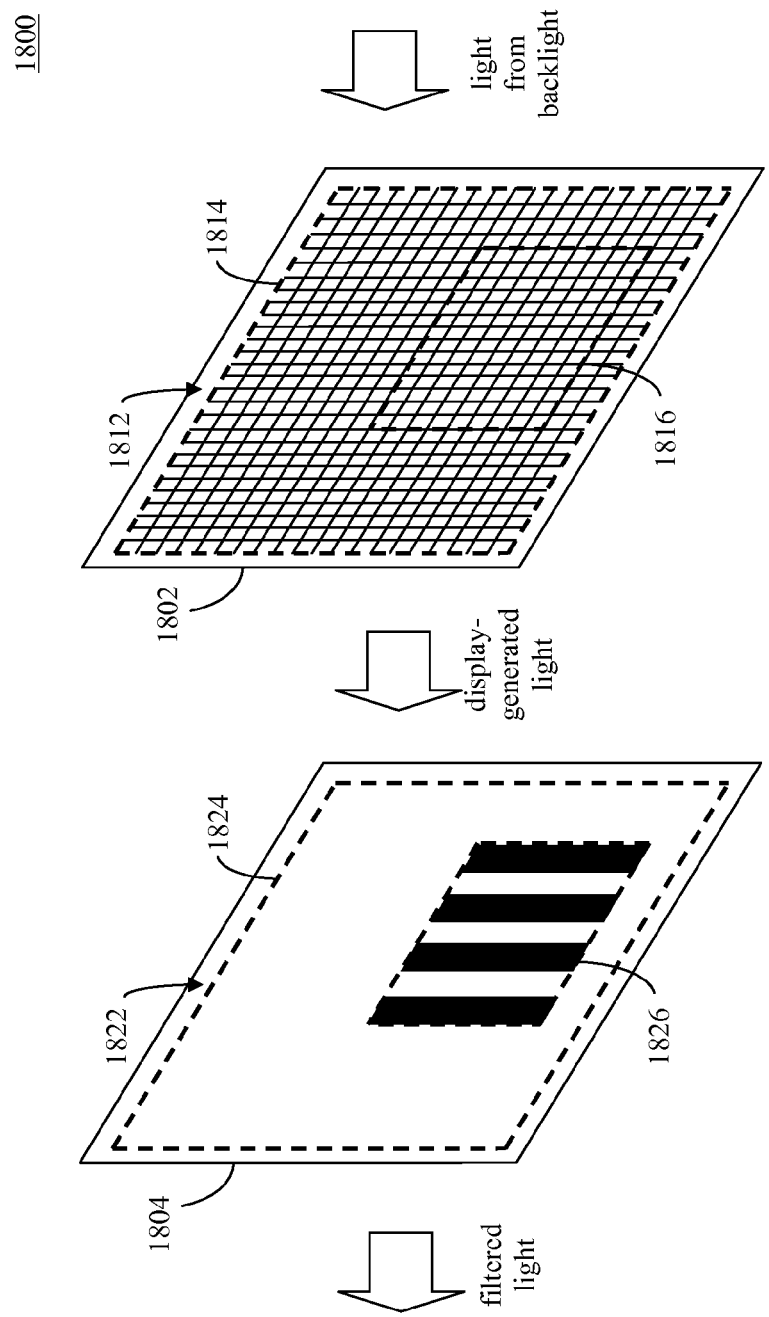

FIG. 18 provides an exploded view of a display system that implements a regional brightness control scheme based on pixel intensity in accordance with an embodiment.

Figure 19:
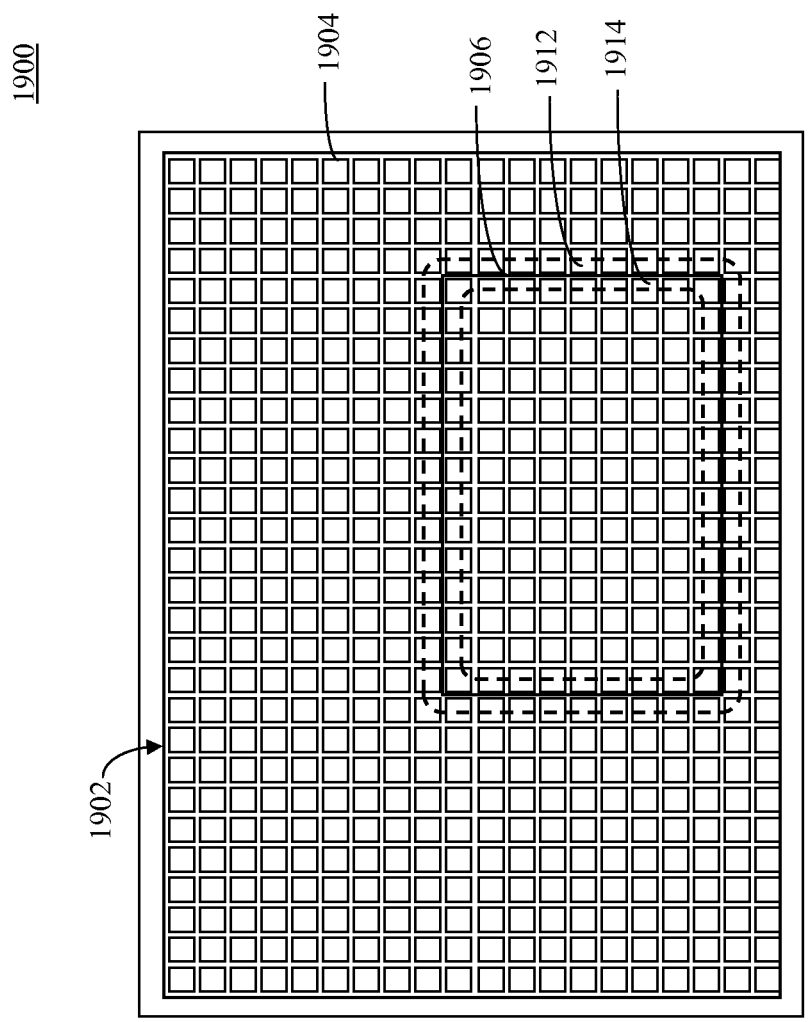

FIG. 19 illustrates a front perspective view of a display panel of a display system in accordance with an embodiment.

Figure 20:
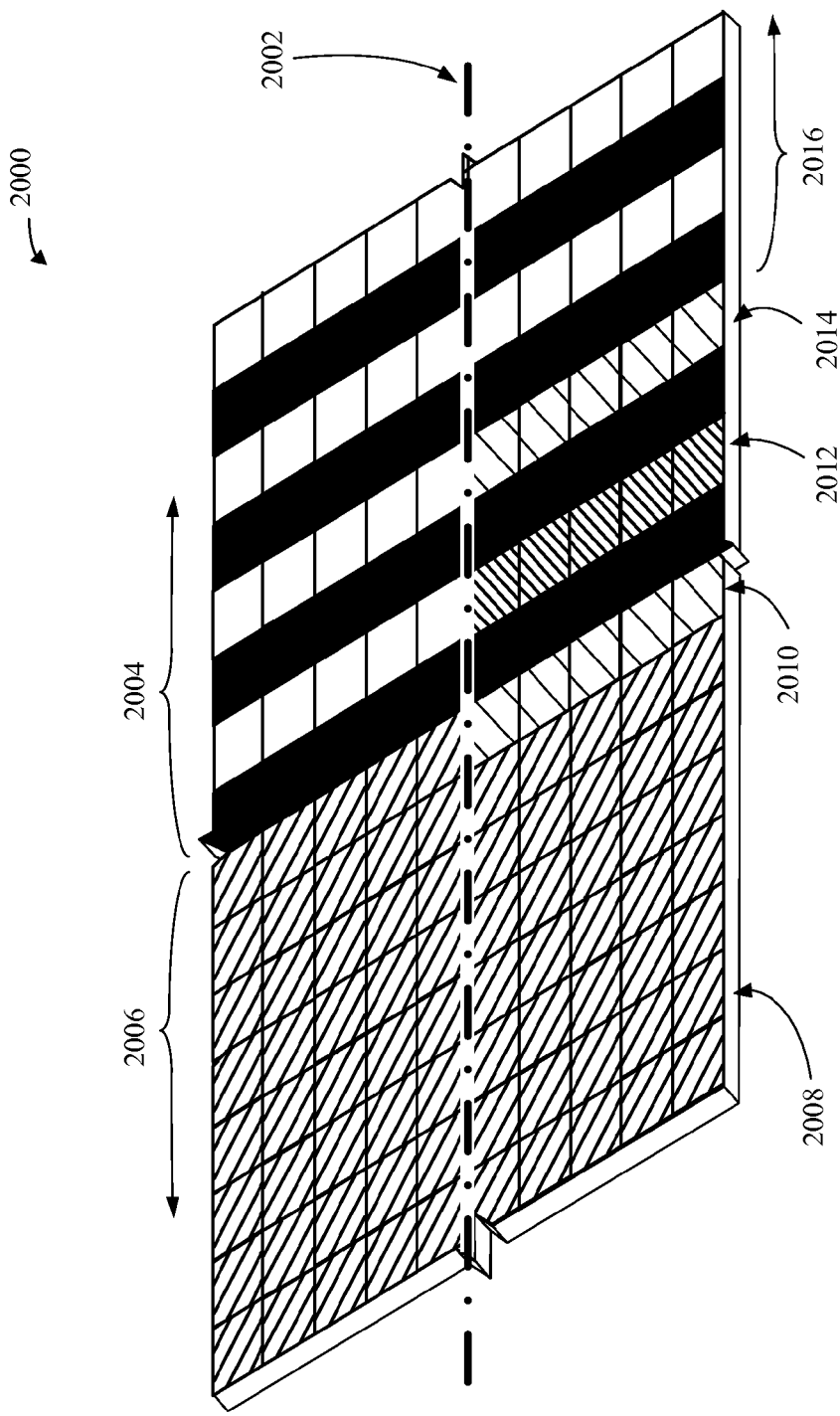

FIG. 20 illustrates two exemplary configurations of an adaptable light manipulator that includes a parallax barrier and a brightness regulation overlay in accordance with an embodiment.

Figure 21:
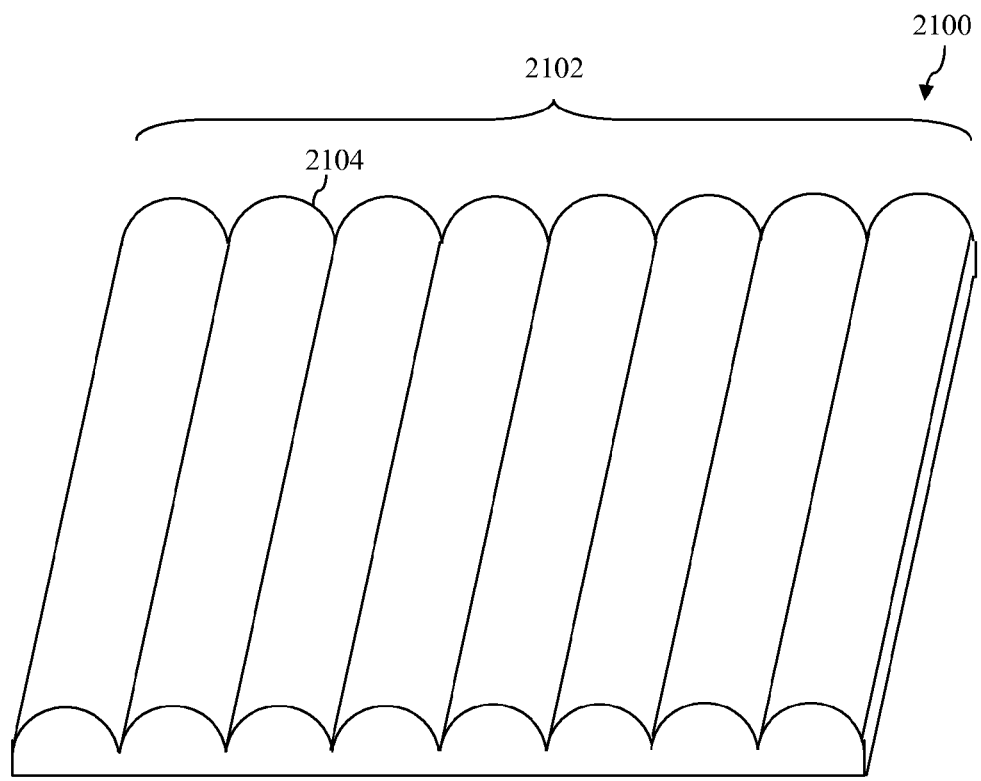

FIG. 21 shows a perspective view of an adaptable lenticular lens that may be used in a displays system in accordance with an embodiment.

Figure 22:
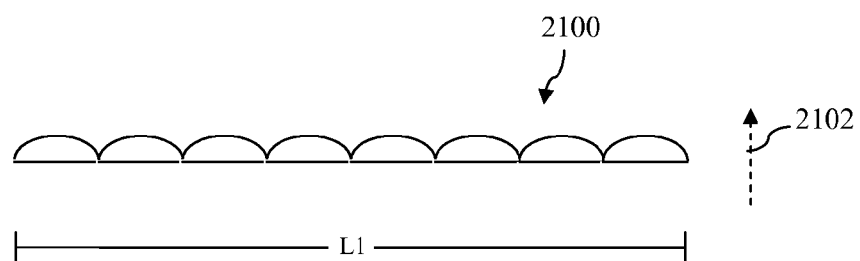

FIG. 22 shows a side view of the adaptable lenticular lens of FIG. 21.

Figure 23:
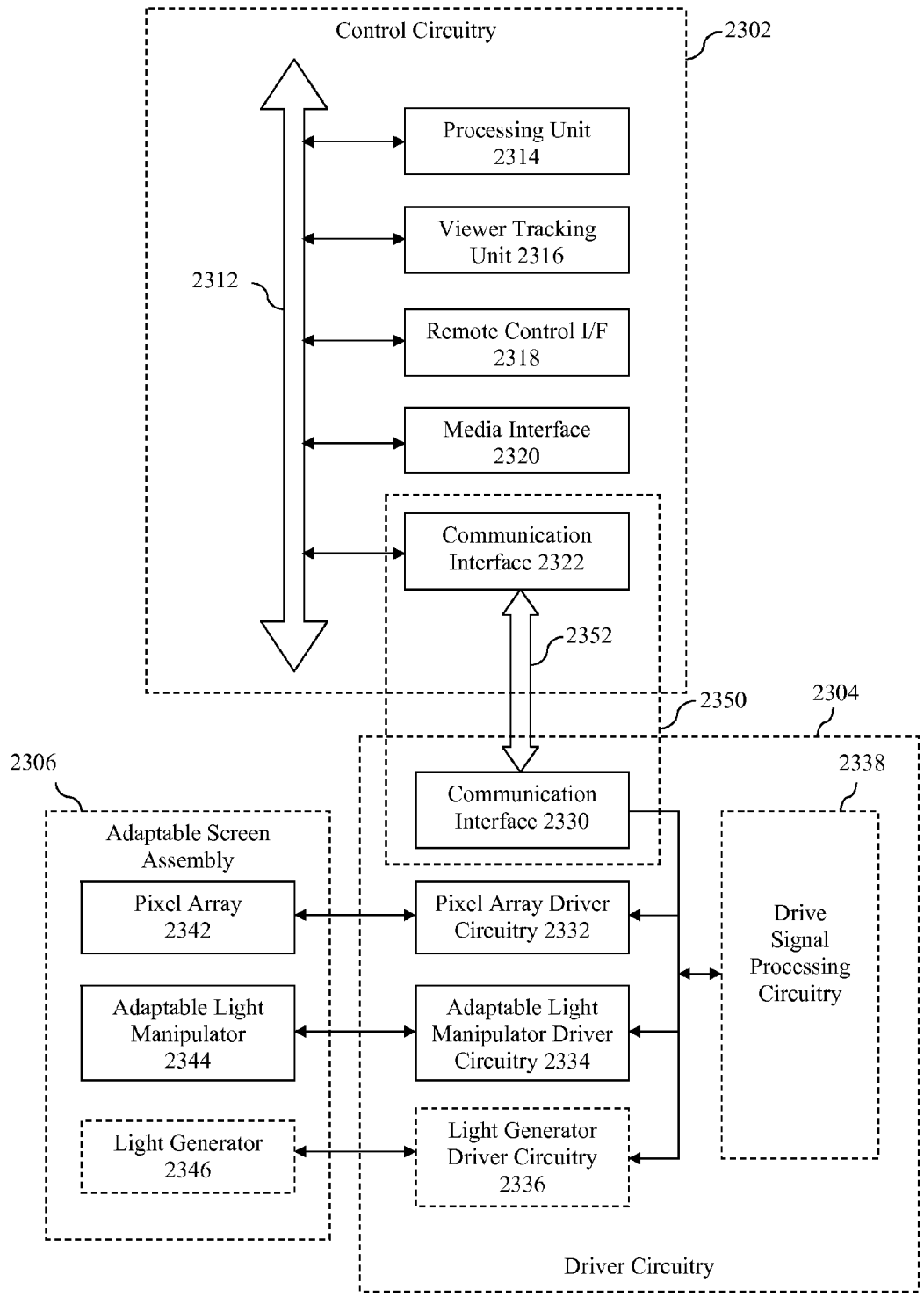

FIG. 23 is a block diagram of an example implementation of a display system that includes an adaptable screen assembly that supports the simultaneous display of different visual presentations to different corresponding viewers in accordance with an embodiment.

Figure 24:
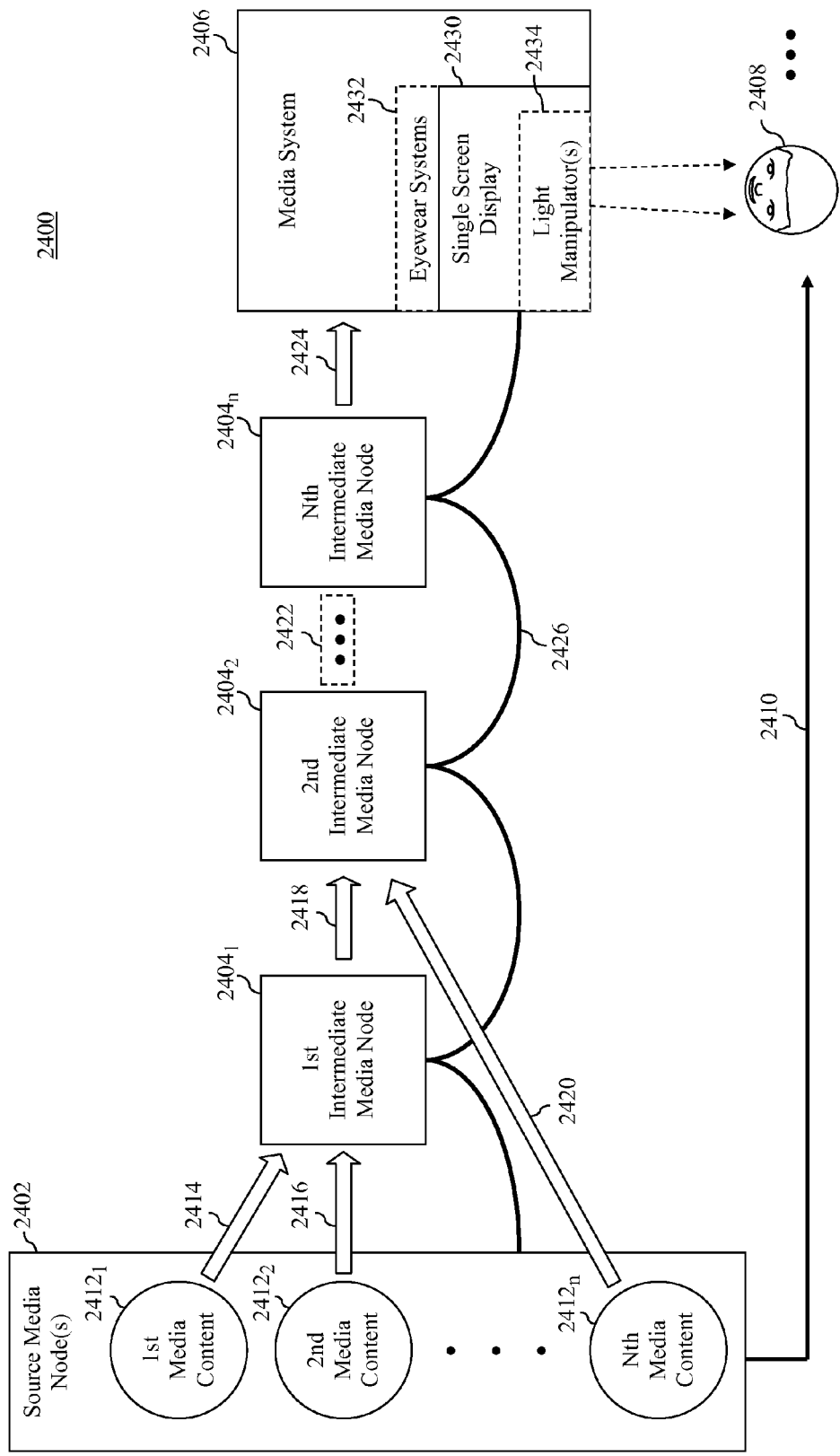

FIG. 24 is a block diagram of an example communication system that comprises a communication infrastructure that includes simultaneous pathways for multi-viewer support in accordance with an embodiment.

Figure 25:
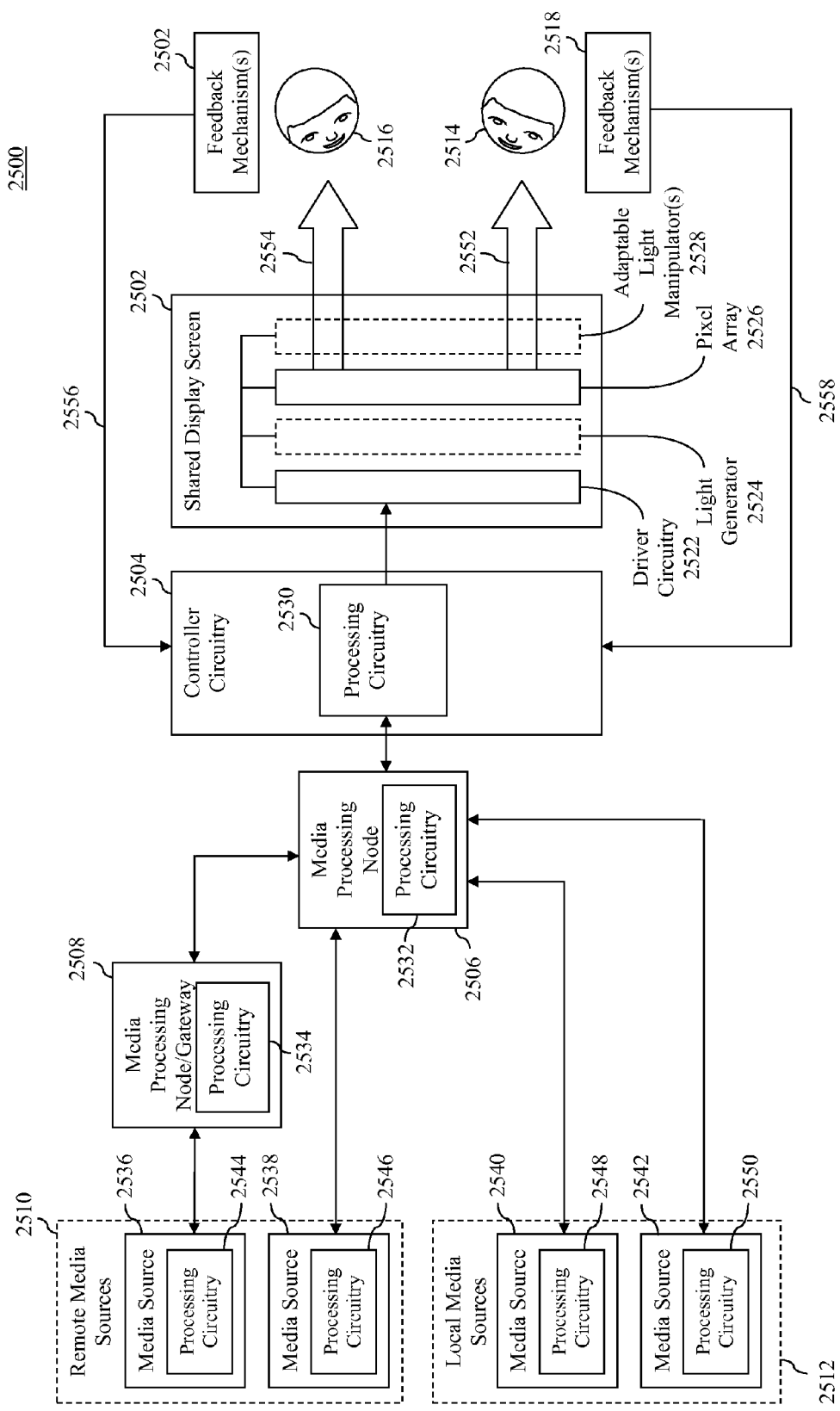

FIG. 25 is a block diagram of an example communication system that comprises a communication infrastructure that includes simultaneous pathways for multi-viewer support in accordance with a further embodiment.

Figure 26:
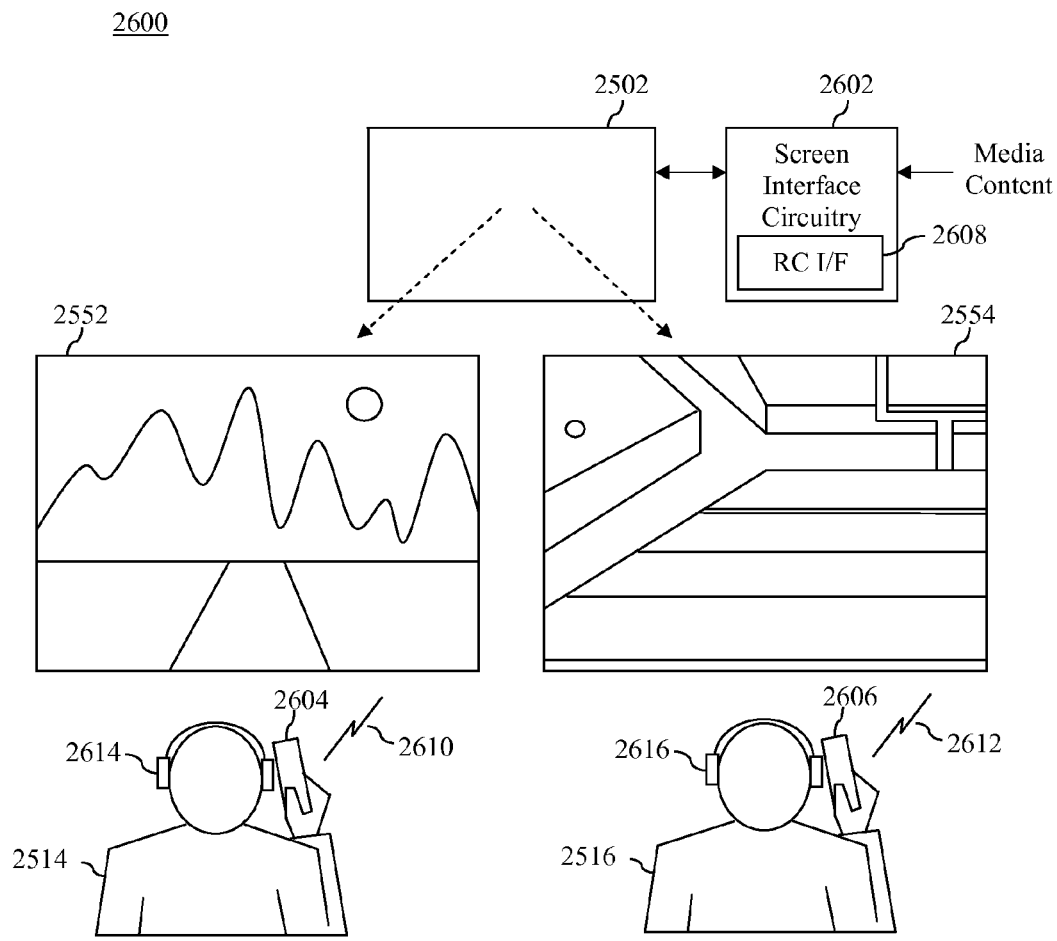

FIG. 26 illustrates a first example viewing environment in which a shared display screen of a communication system in accordance with an embodiment is used to simultaneously deliver a first visual experience to a first viewer and deliver a second visual experience to a second viewer.

Figure 27:
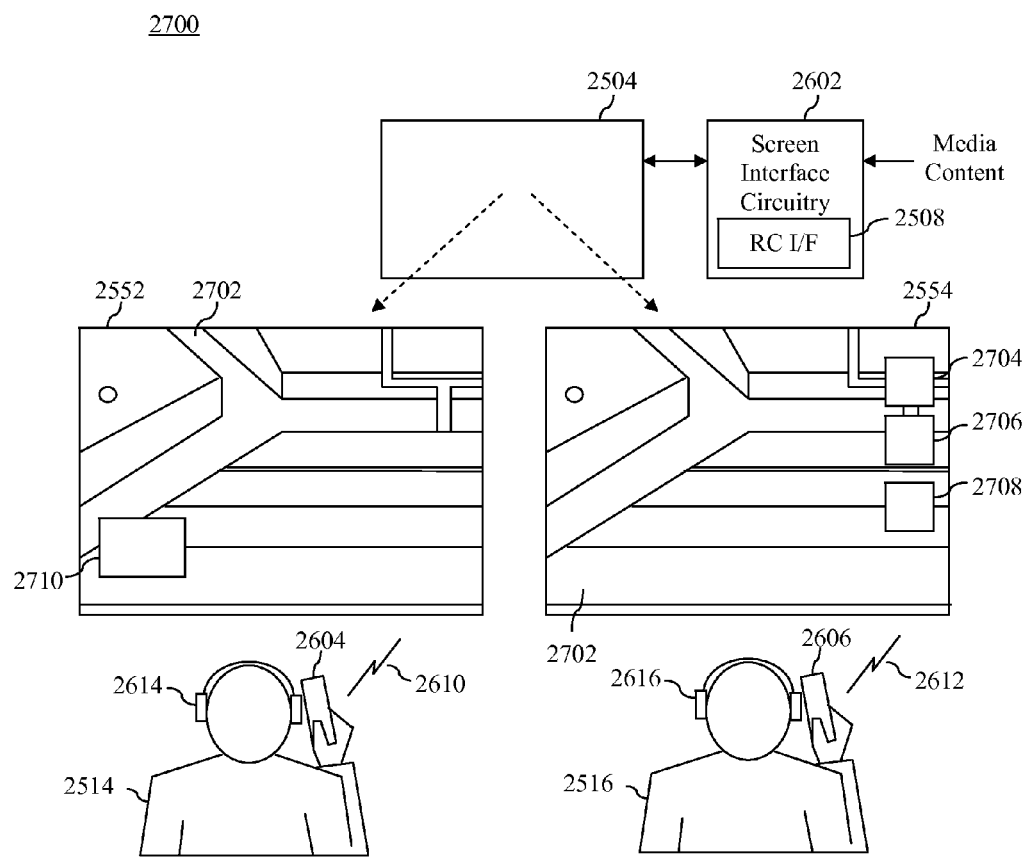

FIG. 27 illustrates a second example viewing environment in which a shared display screen of a communication system in accordance with an embodiment is used to simultaneously deliver a first visual experience to a first viewer and deliver a second visual experience to a second viewer.

Figure 28:
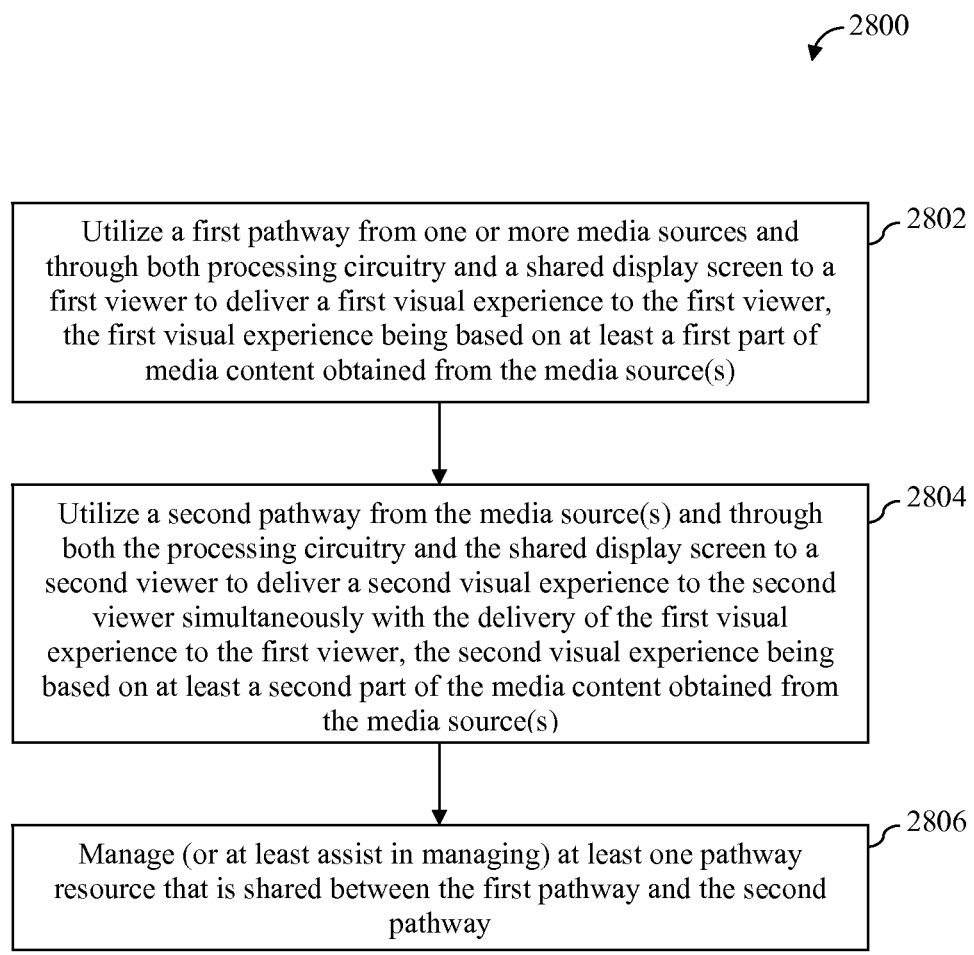

FIG. 28 depicts a flowchart of a method for operating a communication system that utilizes multiple pathways to simultaneously deliver media content to multiple corresponding viewers via a shared display screen.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

A communication system is described herein that allows co-located viewers to simultaneously consume different media content, such as different video content, via the same display screen, wherein video content delivered to at least one co-located viewer is not visible to the other co-located viewer(s). The communication system comprises an infrastructure that includes multiple pathways for delivering media content from one or more media sources to the eyes of each of the co-located viewers, wherein each pathway passes through the pixels of a pixel array included in the shared display screen. The pathways also include distributed or non-distributed processing circuitry that manages certain resources that are shared among the multiple pathways, wherein such shared resources may include shared display resources (e.g., pixels of the pixel array and light generated thereby) and shared data communication resources (e.g., bandwidth on data communication links and processing resources of nodes located on such links).

In certain embodiments, the processing circuitry manages the shared resources by managing the utilization thereof to simultaneously support the multiple pathways. In further embodiments, the processing circuitry manages the shared resources by setting up or modifying an allocation of a shared resource among the multiple pathways based on an ascertained characteristic associated with at least one of the pathways. The processing circuitry may be configured to receive feedback and/or to gather pathway characteristics to facilitate resource allocation decisions. By simultaneously and adaptively managing each of the pathways, the processing circuitry can provide a stable, simultaneous, multiple-viewer viewing environment that can adapt over time as underlying pathway characteristics change.

II. Exemplary Display Systems that Support Simultaneous Visual Presentations Observable by Different Viewers Before describing example communication systems that allow co-located viewers to simultaneously consume different media content via the same display screen, various exemplary screen assemblies that support such simultaneous viewing will first be described. The various screen assemblies described in this section rely on spatial filtering by one or more light manipulators (e.g. parallax barriers or lenticular lenses) to support the simultaneous viewing of different media content by different viewers. However, as will be noted in a subsequent section, communication systems in accordance with embodiments may include screen assemblies that utilize other mechanisms for facilitating such simultaneous viewing (e.g., such as those designed for use in conjunction with shutter glasses).

A. Example Screen Assemblies Including Adaptable Parallax Barriers

Figure 1:
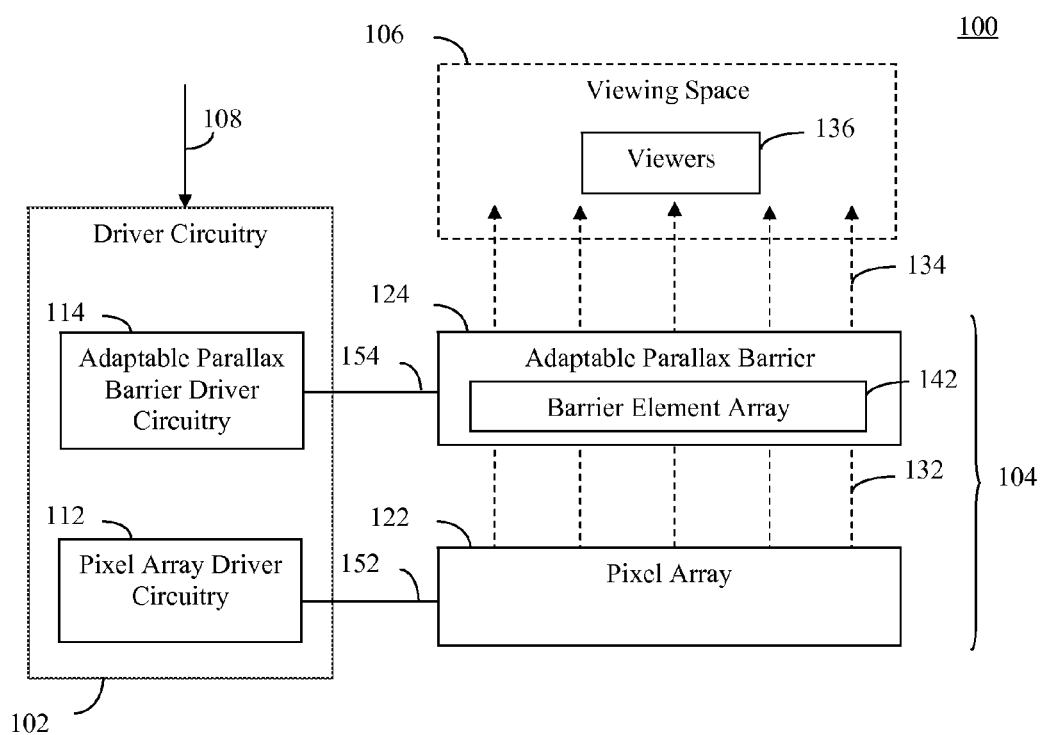
FIG. 1 is a block diagram of a display system that includes a screen assembly that utilizes an adaptable parallax barrier to support the simultaneous display of different visual presentations to different corresponding viewers in accordance with an embodiment.

FIG. 1 is a block diagram of a display system 100 that includes a screen assembly 104 that utilizes an adaptable parallax barrier to support the simultaneous display of different visual presentations to different corresponding viewers in accordance with an embodiment. As shown in FIG. 1, display system 100 includes driver circuitry 102 and a screen assembly 104, wherein screen assembly 104 include a pixel array 122 and an adaptable parallax barrier 124. As further shown in FIG. 1, driver circuitry 102 includes pixel array driver circuitry 112 and adaptable parallax barrier driver circuitry 114.

Pixel array 122 comprises a two-dimensional array of pixels (e.g., arranged as a grid or other distribution) that operates to emit light 132. Pixel array 122 may comprise a self-illuminating or light-generating pixel array such that the pixels of pixel array 122 each emit light included in light 132. Alternatively, each pixel in pixel array 122 may operate to selectively pass light emitted by a backlighting source (not shown in FIG. 1) to produce light 132. Each pixel of pixel array 122 may be individually controllable to vary color and intensity. In an embodiment, each pixel of pixel array 122 may include a plurality of sub-pixels that correspond to separate color channels, such as a trio of red, green, and blue sub-pixels included in each pixel.

Adaptable parallax barrier 124 is positioned proximate to a surface of pixel array 122. Barrier element array 142 is a layer of adaptable parallax barrier 124 that includes a plurality of barrier elements or blocking regions arranged in an array. Each barrier element of the array is configured to be selectively opaque or transparent. Combinations of barrier elements may be configured to be selectively opaque or transparent to enable various effects. For example, the states of the barrier elements of barrier element array 142 may be configured such that light 132 emanating from pixel array 122 is filtered to produce filtered light 134, wherein filtered light 134 includes one or more two-dimensional and/or three-dimensional images that may be viewed by viewers 136 in a viewing space 106.

Depending upon the implementation, each barrier element may have a round, square, or rectangular shape, and barrier element array 142 may have any number of rows of barrier elements that extend a vertical length of barrier element array 142. In another embodiment, each barrier element may have a "band" shape that extends a vertical length of barrier element array 142, such that barrier element array 142 includes a single horizontal row of barrier elements. Each barrier element may include one or more of such bands, and different regions of barrier element array 142 may include barrier elements that include different numbers of such bands.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Driver circuitry 102 receives control signals 108 from control circuitry (not shown in FIG. 1). The control signals 108 cause driver circuitry 102 to place screen assembly 104 in a selected one of a plurality of different viewing configurations. In particular, based on control signals 108, adaptable parallax barrier driver circuitry 114 transmits drive signals 154 that cause barrier element array 142 to be placed in a state that supports the selected viewing configuration. The selected viewing configuration may be a particular two-dimensional viewing configuration, a particular three-dimensional viewing configuration, or a viewing configuration that supports the simultaneous display of different types of two-dimensional and/or three-dimensional content.

Figure 2:
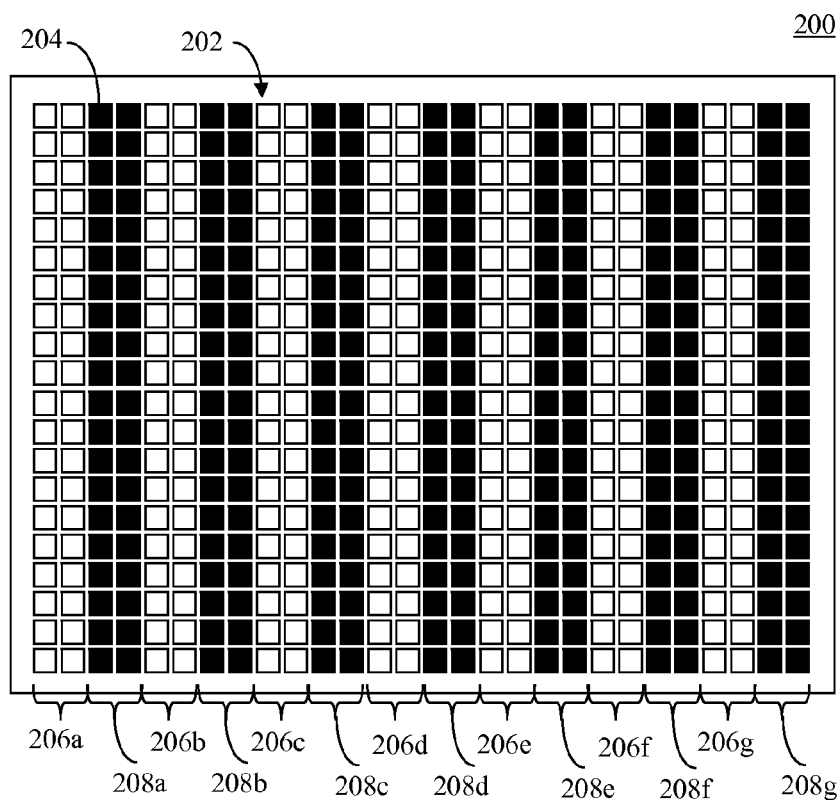
FIG. 2 illustrates an arrangement of an adaptable parallax barrier in accordance with an embodiment that supports a particular three-dimensional viewing configuration.

For example, FIG. 2 shows an arrangement of an adaptable parallax barrier 200 that supports a particular three-dimensional viewing configuration. Adaptable parallax barrier 200 is an example of adaptable parallax barrier 124 of FIG. 1. As shown in FIG. 2, adaptable parallax barrier 200 includes a barrier element array 202, which includes a plurality of barrier elements 204 arranged in a two-dimensional array. Furthermore, as shown in FIG. 2, barrier element array 202 includes a plurality of parallel strips of barrier elements 204 that are selected to be non-blocking to form a plurality of parallel non-blocking strips (or "slits") 206a-206g. As shown in FIG. 2, parallel non-blocking strips 206a-206g (non-blocking slits) are alternated with parallel blocking strips 208a-208g of barrier elements 204 that are selected to be blocking. In the example of FIG. 2, non-blocking strips 206a-206g and blocking strips 208a-208g each have a width (along the x-dimension) of two barrier elements 204, and have lengths that extend along the entire y-dimension (twenty barrier elements 204) of barrier element array 202, although in other embodiments, may have alternative dimensions. Non-blocking strips 206a-206g and blocking strips 208a-208g form a parallax barrier configuration for adaptable parallax barrier 200. The spacing (and number) of parallel non-blocking strips 206 in barrier element array 202 may be selectable by choosing any number and combination of particular strips of barrier elements 204 in barrier element array 202 to be non-blocking, to be alternated with blocking strips 208, as desired. For example, hundreds, thousands, or even larger numbers of non-blocking strips 206 and blocking strips 208 may be present in adaptable parallax barrier 200.

Figure 3:
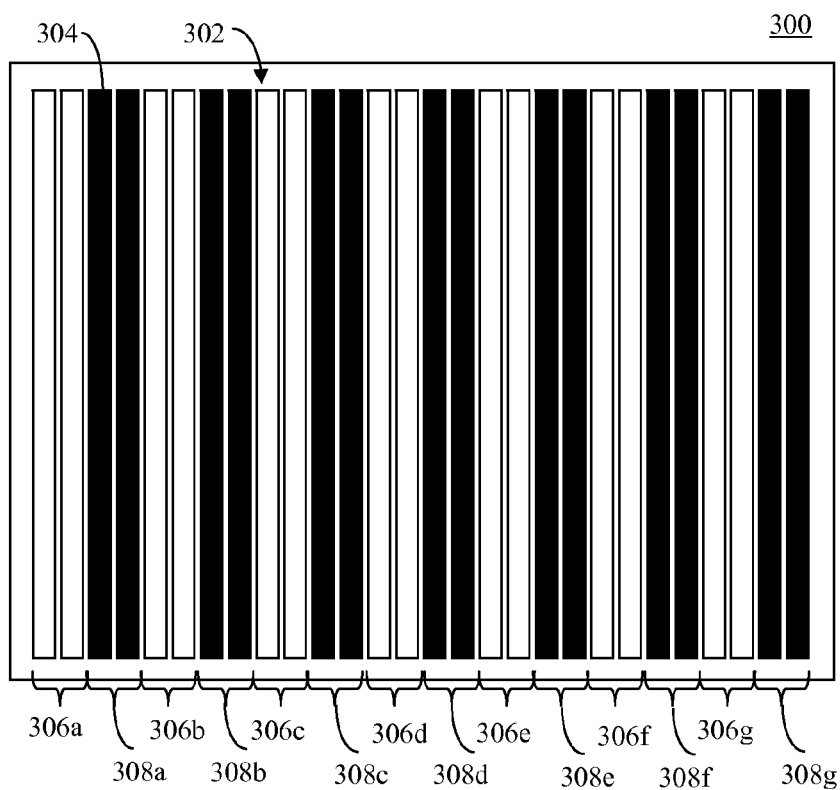
FIG. 3 illustrates an arrangement of an adaptable parallax barrier in accordance with an alternate embodiment that supports a particular three-dimensional viewing configuration.

FIG. 3 shows an alternative example of an adaptable parallax barrier 300 that has also been configured to support a particular three-dimensional viewing configuration. Similarly to adaptable parallax barrier 200 of FIG. 2, adaptable parallax barrier 300 includes a barrier element array 302, which includes a plurality of barrier elements 304 arranged in a two-dimensional array (28×1 array). Barrier elements 304 have widths (along the x-dimension) similar to the widths of barrier elements 204 in FIG. 2, but have lengths that extend along the entire vertical length (y-dimension) of barrier element array 302. As shown in FIG. 3, barrier element array 302 includes parallel non-blocking strips 306a-306g alternated with parallel blocking strips 308a-308g. In the example of FIG. 3, parallel non-blocking strips 306a-306g and parallel blocking strips 308a-308g each have a width (along the x-dimension) of two barrier elements 304, and have lengths that extend along the entire y-dimension (one barrier element 304) of barrier element array 302.

Each of adaptable parallax barriers 200 and 300, configured in the manner shown in FIGS. 2 and 3 respectively, filter light produced or passed by a pixel array to form one or more three-dimensional views in a viewing space, thus supporting a three-dimensional viewing configuration. To achieve a two-dimensional viewing configuration, all of the barrier elements of either adaptable parallax barrier 200 or 300 can simply be placed in a non-blocking state. Additional details concerning how the adaptable parallax barriers operate to support such three-dimensional viewing may be found, for example, in commonly-owned, co-pending U.S. patent application Ser. No. 12/845,409, filed on Jul. 28, 2010, and entitled "Display with Adaptable Parallax Barrier," the entirety of which is incorporated by reference herein.

In the adaptable parallax barrier configurations shown in FIGS. 2 and 3, the entirety of the barrier element array is filled with parallel non-blocking strips to support three-dimensional viewing. In further embodiments, one or more regions of an adaptable parallax barrier may be filled with parallel non-blocking strips to deliver three-dimensional images, and one or more other regions of the adaptable parallax barrier may be rendered transparent to deliver two-dimensional images. Thus, a viewing configuration that mixes two-dimensional and three-dimensional viewing regions may be supported.

Figure 4:
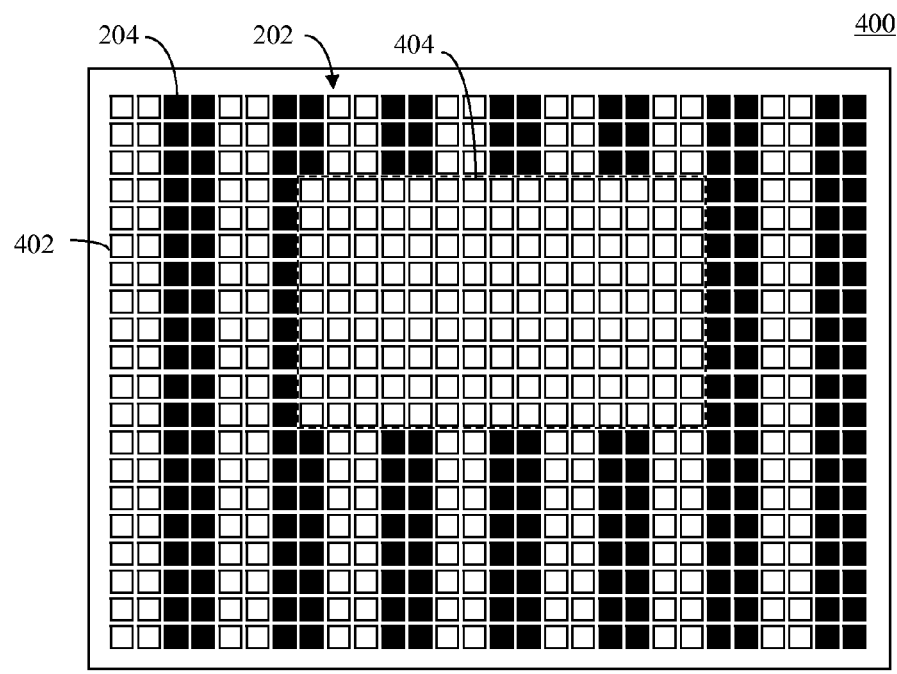
FIG. 4 illustrates an arrangement of an adaptable parallax barrier in accordance with an embodiment that supports a viewing configuration that mixes two-dimensional and three-dimensional viewing regions.

For instance, FIG. 4 shows an arrangement of an adaptable parallax barrier 400 that supports a viewing configuration that mixes two-dimensional and three-dimensional viewing regions according to example embodiments. Adaptable parallax barrier 400 is similar to adaptable parallax barrier 200 of FIG. 2, having barrier element array 202 including a plurality of barrier elements 204 arranged in a two-dimensional array. In FIG. 4, a first region 402 of barrier element array 202 includes a plurality of parallel non-blocking strips alternated with parallel blocking strips that together fill first region 402. A second region 404 of barrier element array 202 is surrounded by first region 402. Second region 404 is a rectangular shaped region of barrier element array 202 that includes a two-dimensional array of barrier elements 204 that are non-blocking. Thus, in FIG. 4, barrier element array 202 is configured to enable a three-dimensional image to be generated by pixels of a pixel array that are adjacent to barrier elements of first region 402, and to enable a two-dimensional image to be generated by pixels of the pixel array that are adjacent to barrier elements inside of second region 404. Note that alternatively, first region 402 may include all non-blocking barrier elements 202 to pass a two-dimensional image, and second region 404 may include parallel non-blocking strips alternated with parallel blocking strips to pass a three-dimensional image. In further embodiments, adaptable parallax barrier 400 may have additional numbers, sizes, and arrangements of regions configured to pass different combinations of two-dimensional images and three-dimensional images.

In still further embodiments, different regions of an adaptable parallax barrier that have parallel non-blocking strips may have the parallel non-blocking strips oriented at different angles to deliver three-dimensional images to viewers that are oriented differently. Thus, a viewing configuration that mixes three-dimensional viewing regions having different viewing orientations may be supported.

Figure 5:
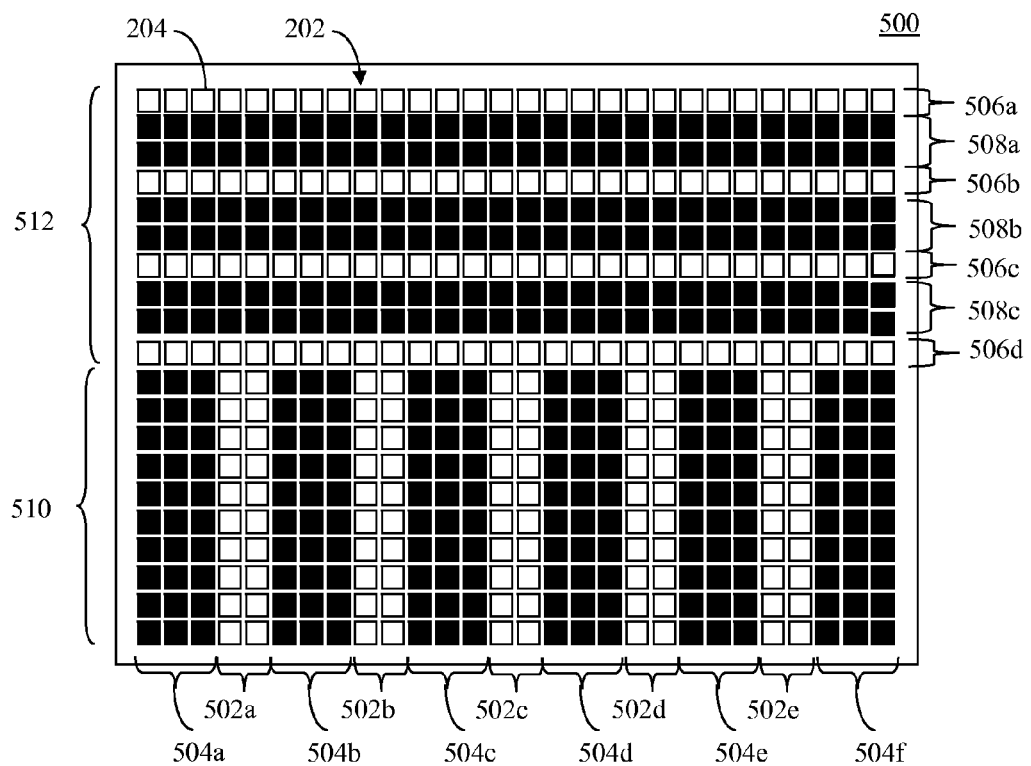
FIG. 5 illustrates an arrangement of an adaptable parallax barrier in accordance with an embodiment in which different orientations of transparent and opaque slits are used to simultaneously support different viewer orientations.

For example, FIG. 5 shows an arrangement of an adaptable parallax barrier 500 in which transparent slits have different orientations, according to an example embodiment. Adaptable parallax barrier 500 is similar to adaptable parallax barrier 200 of FIG. 2, having barrier element array 202 including a plurality of barrier elements 204 arranged in a two-dimensional array. A first region 510 (e.g., a bottom half) of barrier element array 202 includes a first plurality of parallel strips of barrier elements 204 that are selected to be non-blocking to form a first plurality of parallel non-blocking strips 502a-502e (each having a width of two barrier elements 204). As shown in FIG. 5, parallel non-blocking strips 502a-502e are alternated with parallel blocking strips 504a-504f of barrier elements 204 (each having a width of three barrier elements 204). Parallel non-blocking strips 502a-502e are oriented in a first direction (e.g., along a vertical axis).

Furthermore, as shown in FIG. 5, a second region 512 (e.g., a top half) of barrier element array 202 includes a second plurality of parallel strips of barrier elements 204 that are selected to be non-blocking to form a second plurality of parallel non-blocking strips 506a-506d (each having a width of one barrier element 204). As shown in FIG. 5, parallel non-blocking strips 506a-506d are alternated with parallel blocking strips 508a-508c of barrier elements 204 (each having a width of two barrier elements 204). Parallel non-blocking strips 506a-506d are oriented in a second direction (e.g., along a horizontal axis).

As such, in FIG. 5, first and second pluralities of parallel non-blocking strips 502a-502e and 506a-506d are present in barrier element array 202 that are oriented perpendicularly to each other. The region of barrier element array 202 that includes first plurality of parallel non-blocking strips 502a-502e may be configured to deliver a three-dimensional image in a viewing space to be viewable by a user whose body is oriented vertically (e.g., sitting upright or standing up). The region of barrier element array 202 that includes second plurality of parallel non-blocking strips 506a-506d may be configured to deliver a three-dimensional image in a viewing space to be viewable by a user whose body is oriented horizontally (e.g., laying down). In this manner, users who are oriented differently relative to each other can still each be provided with a corresponding three-dimensional image that accommodates their position.

Additional adaptable parallax barrier implementations and arrangements thereof that support mixed two-dimensional and/or three-dimensional viewing regions are described in commonly-owned, co-pending U.S. patent application Ser. No. 12/845,440, filed on Jul. 28, 2010 and entitled "Adaptable Parallax Barrier Supporting Mixed 2D and Stereoscopic 3D Display Regions," the entirety of which is incorporated by reference herein.

Figure 6:
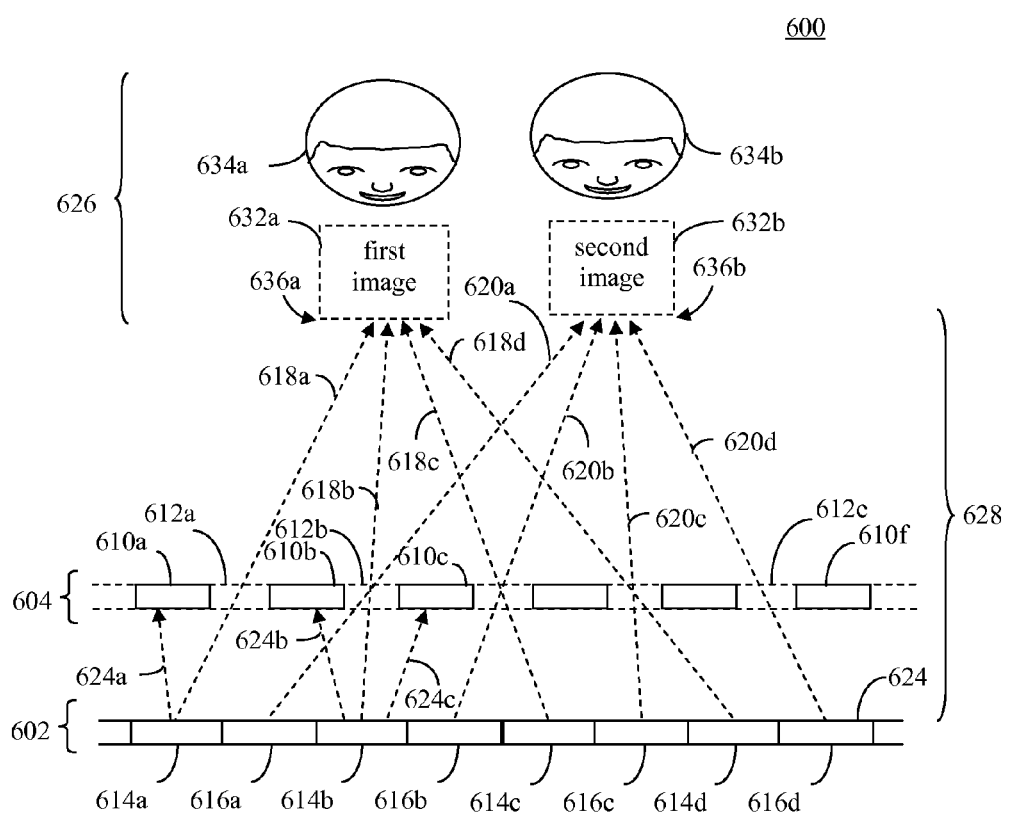
FIG. 6 shows a cross-sectional view of a display system configured to simultaneously deliver two different two-dimensional images to two different viewers, respectively, in accordance with an embodiment.

Display system 100 may be further configured to simultaneously generate multiple two-dimensional images or views for viewing by different viewers in a viewing space. For example, FIG. 6 shows a display system 600 configured to simultaneously deliver two different two-dimensional images to two different viewers, respectively, in accordance with an embodiment. Display system 600 may comprise one implementation of display system 100 of FIG. 1. As shown in FIG. 6, display system 600 includes a pixel array 602 and a barrier element array 604. Pixel array 602 includes a plurality of pixels 614a-614d and 616a-616d. Pixels 614 alternate with pixels 616, such that pixels 614a-614d and 616a-616d are arranged in series in the order of pixels 614a, 616a, 614b, 616b, 614c, 616c, 614d, and 616d. Further pixels may be included in pixel array 602 that are not visible in FIG. 6, including further pixels along the width dimension of pixel array 602 (e.g., in the left-right directions) as well as pixels along a length dimension of pixel array 602 (not visible in FIG. 6). Each of pixels 614a-614d and 616a-616d emits light, which emanates from a display surface 624 of pixel array 602 (e.g., generally upward in FIG. 6) towards barrier element array 604. Some example indications of light emanating from pixels 614a-614d and 616a-616d are shown in FIG. 6 (as dotted lines), including light 624a and light 618a emanating from pixel 614a, light 624b, light 618b, and light 624c emanating from pixel 614b, etc.

Light emanating from pixel array 602 is filtered by barrier element array 604 to form a plurality of images in a viewing space 626, including a first image 632a at a first location 636a and a second image 632b at a second location 636b. A portion of the light emanating from pixel array 602 is blocked by blocking barrier elements 610, while another portion of the light emanating from pixel array 602 passes through non-blocking barrier elements 612, according to the filtering by barrier element array 604. For instance, light 624a from pixel 614a is blocked by blocking barrier element 610a, and light 624b and light 624c from pixel 614b are blocked by blocking barrier elements 610b and 610c, respectively. In contrast, light 618a from pixel 614a is passed by non-blocking barrier element 612a and light 618b from pixel 614b is passed by non-blocking barrier element 612b.

System 600 shown in FIG. 6 is configured to form first and second images 632a and 632b at locations 636a and 636b, respectively, which are positioned at a distance 628 from pixel array 602. As described above, pixel array 602 includes a first set of pixels 614a-614d and a second set of pixels 616a-616d. Pixels 614a-614d correspond to first image 632a and pixels 616a-616d correspond to second image 632b. Due to the spacing of pixels 614a-614d and 616a-616d in pixel array 602, and the geometry of non-blocking barrier elements 612 in barrier element array 604, first and second images 632a and 632b are formed at locations 636a and 636b, respectively. As shown in FIG. 6, light 618a-618d from the first set of pixels 614a-614d is focused at location 636a to form first image 632a at location 636a. Light 620a-620d from the second set of pixels 616a-616d is focused at location 636b to form second image 632b at location 636b.

As shown in FIG. 6, a first viewer 634a receives first image 632a at first location 636a and a second viewer 634b receives second image 632b at second location 636b, according to an example embodiment. First and second images 632a and 632b may each comprise a different two-dimensional image that may be viewed independently from each other. For instance, first image 632a and second image 632b may be generated by display system 600 from first media content and second media content, respectively, that are independent of each other. First image 632a may be received by both eyes of first viewer 634a to be perceived by first viewer 634a as a first two-dimensional image, and second image 632b may be received by both eyes of second viewer 634b to be perceived by second viewer 634b as a second two-dimensional image. Thus, first and second images 632a and 632b may be generated to have a spacing that enables them to be separately viewed by first and second users 634a and 634b. Furthermore, first and second images 632a and 632b may be delivered to different viewer locations as determined by a configuration of display system 600, including a width and spacing of non-blocking slits in barrier element array 604 and by a spacing between pixel array 602 and barrier element array 604.

In accordance with the foregoing, display system 600 has a single viewing plane or surface (e.g., a plane or surface of pixel array 602, barrier element array 604, and/or display screen of display system 600) that supports multiple viewers with media content in the form of images or views. In the embodiment of FIG. 6, the single viewing plane of display system 600 may provide a first two-dimensional view based on first two-dimensional media content to first viewer 634a, and may provide a second two-dimensional view based on second two-dimensional media content to second viewer 634b. Barrier element array 604 causes the first media content to be presented to first viewer 634a via a first area of the single viewing plane, but not to second viewer 634b, while simultaneously causing the second media content to be presented to second viewer 634b via a second area of the single viewing plane, but not to first viewer 634a. Furthermore, the first area and second area of the single viewing plane that provide the first and second media content overlap each other at least in part, as barrier element array 604 enables both two-dimensional views to be provided from first set of pixels 614a-614d and second set of pixels 616a-616d, which are interleaved with each other. In accordance with certain configurations of display system 600, the first and second areas may be the same area and the area may encompass the entirety of the display screen or surface of display system 600 or only a region of the display screen or surface of display system 600.

Still further, the configuration of display system 600 in FIG. 6 may be used to deliver separate three-dimensional content to first and second viewers 634a and 634b. As such, display system 600 is capable of delivering multiple three-dimensional views to viewers. For example, in an embodiment, first and second viewers 634a and 634b may each wear a pair of 3D-enabled glasses, and the first and second media content associated with first and second images 632a and 632b, respectively, may be three-dimensional media content. In one embodiment, the 3D-enabled glasses may be color filtering glasses. The color filter lenses of the glasses worn by first viewer 634a may pass two-dimensional images (included in first image 632a) of differing perspective to the left and right eyes of first viewer 634a to be perceived by first viewer 634a as a first three dimensional image. Likewise, the color filter lenses of the glasses worn by second viewer 634b may pass two-dimensional images (included in second image 632b) of differing perspective to the left and right eyes of second viewer 634b to be perceived by second viewer 634b as a second three dimensional image. In another embodiment, the 3D-enabled glasses may be shutter lensed glasses. The shutter lenses of the glasses worn by first viewer 634a may be synchronized to pass two-dimensional images (included in first image 632a) of differing perspective to the left and right eyes of first viewer 634a to be perceived by first viewer 634a as a first three dimensional image. Likewise, the shutter lenses of the glasses worn by second viewer 634b may be synchronized to pass two-dimensional images (included in second image 632b) of differing perspective to the left and right eyes of second viewer 634b to be perceived by second viewer 632b as a second three dimensional image.

As such, display system 600 has a single viewing plane or surface (e.g., a plane or surface of pixel array 602 or barrier element array 604) that supports multiple viewers with media content in the form of three-dimensional images or views. The single viewing plane of display system 600 may provide a first three-dimensional view based on first three-dimensional media content to first viewer 634a, and may provide a second three-dimensional view based on second three-dimensional media content to second viewer 634b. Barrier element array 604 causes the first three-dimensional media content to be presented to first viewer 634a via a first area of the single viewing plane, but not to second viewer 634b, while simultaneously causing the second three-dimensional media content to be presented to second viewer 634b via a second area of the single viewing plane, but not to first viewer 634a. Furthermore, the first area and second area of the single viewing plane that provide the first and second media content overlap each other at least in part, as barrier element array 604 enables both three-dimensional views to be provided from first set of pixels 614a-614d and second set of pixels 616a-616d, which are interleaved with each other. In accordance with certain configurations of display system 600, the first and second areas may be the same area and the area may encompass the entirety of the display screen or surface of display system 600 or only a region of the display screen or surface of display system 600.

As such, display system 600 can be configured to deliver a single two-dimensional or three-dimensional view to a viewer, to deliver a pair of two-dimensional views to a pair of viewers, or to deliver a pair of three-dimensional views to a pair of viewers. Display system 600 can be configured to switch between delivering views to one and two viewers by turning off or turning on, respectively, the display of media content by pixel array 602 associated with one of the viewers (e.g., by turning off or on pixels 616 associated with second image 632b). Display system 600 can be configured to switch between delivering two-dimensional and three-dimensional views by providing the corresponding media content type at pixel array 602.

Display systems in accordance with further embodiments may include multiple layers of parallax barriers. Such display systems may enable multiple three-dimensional images to be displayed in a viewing space. The multiple parallax barrier layers may enable spatial separation of the images. For instance, in accordance with one embodiment, a display device that includes multiple parallax barrier layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In fact, a display device that includes multiple parallax barrier layers may be configured to display any number of spatially separated three-dimensional images as desired for a particular application (e.g., according to a number and spacing of viewers in the viewing space, etc.).

Figure 7:
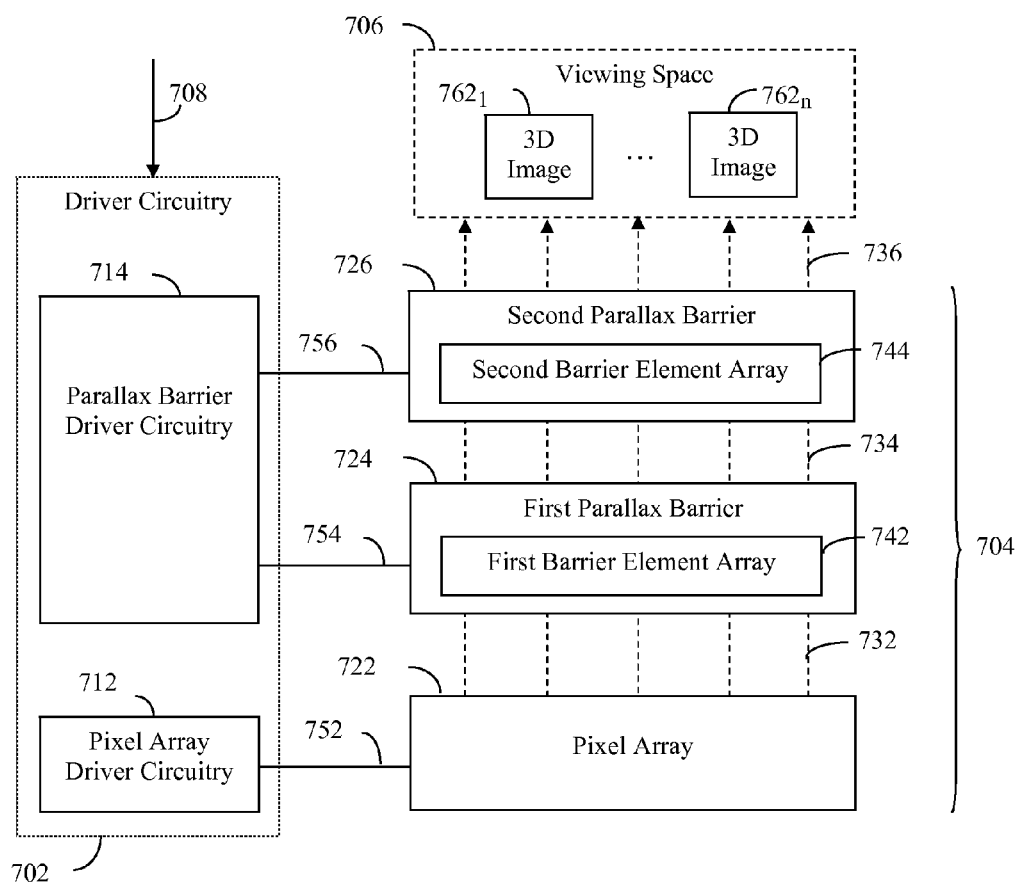
FIG. 7 is a block diagram of a display system that includes a screen assembly that utilizes multiple parallax barriers to support the simultaneous display of multiple visual presentations in accordance with an embodiment.

FIG. 7 is a block diagram of a display system 700 that includes multiple parallax barrier layers in accordance with an embodiment. As shown in FIG. 7, display system 700 includes driver circuitry 702 and a screen assembly 704, wherein screen assembly 704 includes a pixel array 722, a first parallax barrier 724 and a second parallax barrier 726. As shown in FIG. 7, first parallax barrier 724 includes a first barrier element array 742 and second parallax barrier 726 includes a second barrier element array 744. Furthermore, as shown in FIG. 7, driver circuitry 702 includes pixel array driver circuitry 712 and parallax barrier driver circuitry 714.

Light 732 is received at first parallax barrier 724 from pixel array 722. Pixel array 722 may comprise a self-illuminating or light-generating pixel array such that the pixels of pixel array 722 each emit light included in light 732. Alternatively, each pixel in pixel array 722 may operate to selectively pass light emitted by a backlighting source (not shown in FIG. 7) to produce light 732. Pixel array driver circuitry 712 may generate drive signals 752 based on a control signal 708 received from control circuitry (not shown in FIG. 7) and pixel array 722 may emit light 732 in accordance with the received drive signals 752. In an embodiment, pixel array driver circuitry 712 may generate drive signals 752 to cause pixel array 722 to emit light 732 containing a plurality of images corresponding to different sets of pixels.

First parallax barrier 724 may be configured to filter light 732 received from pixel array 722. As shown in FIG. 7, first parallax barrier 724 includes first barrier element array 742 that filters light 732 to generate filtered light 734. First barrier element array 742 may optionally be configurable to adjust the filtering performed by first parallax barrier 724 in a similar manner to that described above in regard to adaptable parallax barrier 124 or in another manner. In an embodiment, parallax barrier driver circuitry 714 may generate drive signals 754 based on control signal 708 received by driver circuitry 702 to cause first barrier element array 742 to filter light 732 as desired.

Filtered light 734 is received by second parallax barrier 726 to generate filtered light 736 that includes a plurality of three-dimensional images $762_1$-$762_n$ formed in a viewing space 706. As shown in FIG. 7, second parallax barrier 726 includes second barrier element array 744 that filters filtered light 734 to generate filtered light 736. Second barrier element array 744 may optionally be configurable to adjust the filtering performed by second parallax barrier 726 in a similar manner to that described above in regard to adaptable parallax barrier 124 or in another manner. In an embodiment, parallax barrier driver circuitry 714 may generate drive signals 756 based on control signal 708 to cause barrier element array 744 to filter filtered light 734 to generate filtered light 736 including three-dimensional images $762_1$-$762_n$ as desired.

As such, display system 700 has a single viewing plane or surface (e.g., a plane or surface of pixel array 722, first parallax barrier 724, second parallax barrier 726, or a display screen of display system 700) that supports multiple viewers with media content in the form of three-dimensional images or views. The single viewing plane of display system 700 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second parallax barrier 724 and 726 cause each three-dimensional media content to be presented to a corresponding viewer via a corresponding area of the single viewing plane, with each viewer being enabled to view corresponding media content without viewing media content directed to other viewers. Furthermore, the areas of the single viewing plane that provide the various three-dimensional views of media content overlap each other at least in part. In the embodiment of FIG. 7, the areas may be the same area—an area of a display screen or surface of display system 700. In accordance with certain configurations of display system 700, the areas may be the same area and the area may encompass the entirety of the display screen or surface of display system 700 or only a region of the display screen or surface of display system 700.

Display system 700 may be configured in various ways to generate multiple three-dimensional images in embodiments. Furthermore, as described below, embodiments of display system 700 may be configured to generate two-dimensional views, as well as any combination of one or more two-dimensional views simultaneously with one or more three-dimensional views. Examples of such embodiments are provided in the following.

Figure 8:
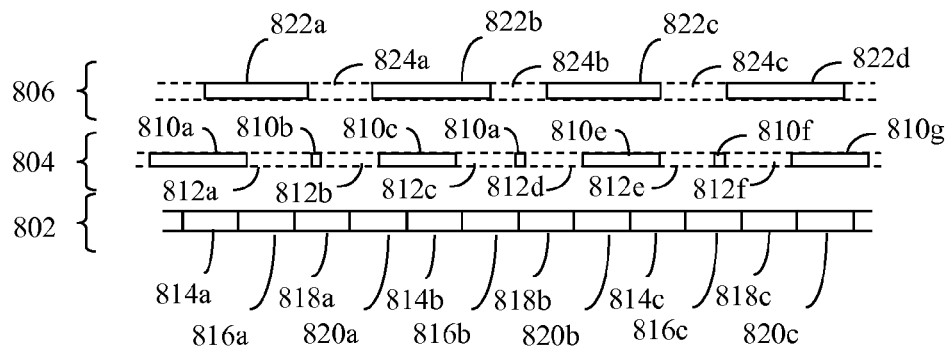
FIGS. 8 and 9 show cross-sectional views of a display system configured to simultaneously deliver two different three-dimensional images to two different viewers, respectively, in accordance with an embodiment.

FIG. 8 shows a cross-sectional view of a display system 800, which is an example implementation of system 700 shown in FIG. 7. As shown in FIG. 8, system 800 includes a pixel array 802, a first barrier element array 804, and a second barrier element array 806. System 800 may also include display controller 702 of FIG. 7, which is not shown in FIG. 8 for ease of illustration. System 800 is described as follows.

As shown in the example of FIG. 8, pixel array 802 includes a first set of pixels 814a-814c, a second set of pixels 816a-816c, a third set of pixels 818a-818c and a fourth set of pixels 820a-820c. Pixels of the four sets of pixels are alternated in pixel array 802 in the order of pixel 814a, pixel 816a, pixel 818a, pixel 820a, pixel 814b, pixel 816b, etc. Further pixels may be included in each set of pixels in pixel array 802 that are not visible in FIG. 8, including hundreds, thousands, or millions of pixels in each set of pixels.

Figure 9:
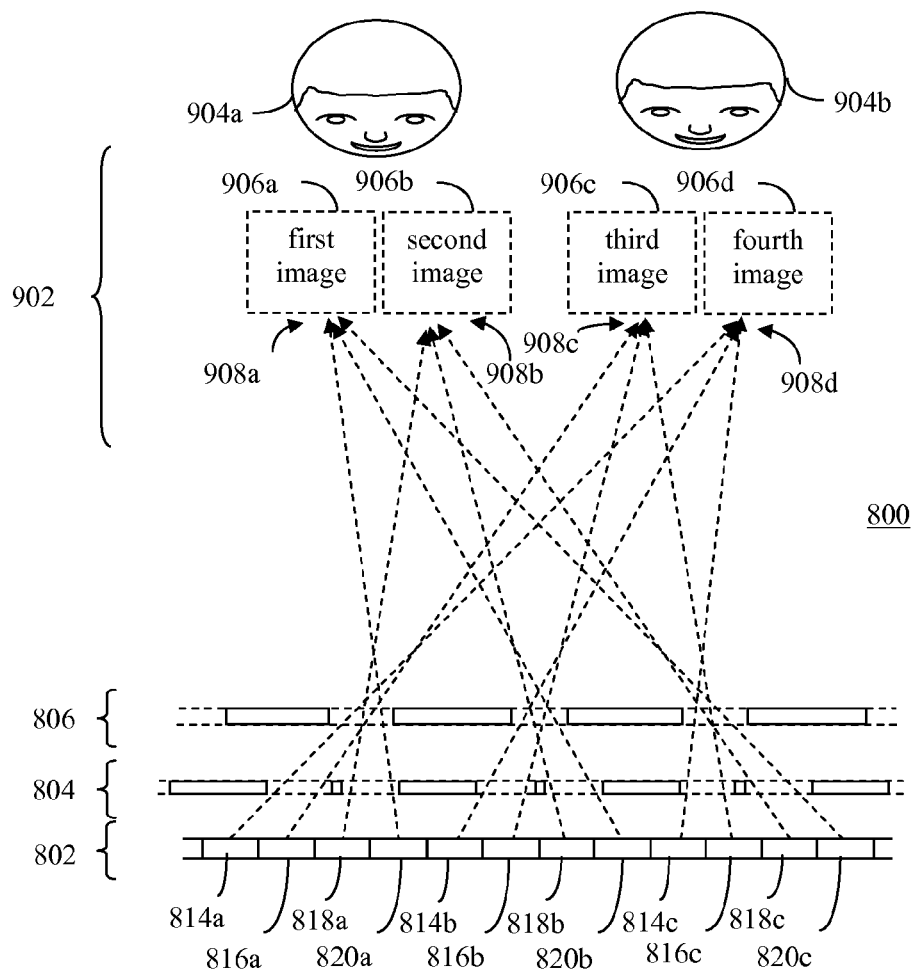

Each of pixels 814a-814c, 816a-816c, 818a-818c and 820a-820c is configured to emit light, which emanates from the surface of pixel array 802 towards first barrier element array 804. Each set of pixels is configured to generate a corresponding image. For example, FIG. 9 shows display system 800, where pixels of pixel array 802 emit light. Light from second set of pixels 816a-816c and first set of pixels 814a-814c is configured to generate third and fourth images 906c and 906d, respectively, which may be perceived together as a second three-dimensional image by a second viewer 904b. Light from fourth set of pixels 820a-820c and third set of pixels 818a-818c is configured to generate first and second images 906a and 906b, respectively, which may be perceived together as a first three-dimensional image by a first viewer 904a. The light emitted by the sets of pixels is filtered by first and second barrier element arrays 804 and 806 to generate the first and second three-dimensional images in respective desired regions of a viewing space 902 adjacent to display system 800.

For instance, in the example of FIG. 9, four images are formed in viewing space 902, including first-fourth images 906a-906d. Pixels 814a-814c correspond to fourth image 906d, pixels 816a-816c correspond to third image 906c, pixels 818a-818c correspond to second image 906b, and pixels 820a-820c correspond to first image 906a. As shown in FIG. 9, light from the first set of pixels 814a-814c forms fourth image 906d and light from the third set of pixels 818a-818c forms second image 906b, due to the filtering of the non-blocking slits in first and second barrier element arrays 804 and 806. In a similar fashion, light from the second set of pixels 816a-816c forms third image 906c and light from the fourth set of pixels 820a-820c forms first image 906a.

In the embodiment of FIG. 9, first and second images 906a and 906b may be configured to be perceived by viewer 904a as a first three-dimensional image, such that first image 906a is received at a right eye location 908a of viewer 904a and second image 906b is received at a left eye location 908b of viewer 904a (e.g., separated by an interocular distance). Furthermore, third and fourth images 906c and 906d may be configured to be perceived by viewer 904b as a second three-dimensional image, such that third image 906c is received at a right eye location 908c of viewer 904b and fourth image 906d is received at a second eye location 908d of viewer 904b.

First-fourth images 906a-906d may be formed in viewing space 902 at a distance from pixel array 802 and at a lateral location of viewing space 902 as determined by a configuration of display system 800, including by a width and spacing of non-blocking slits in first barrier element array 804, by a width and positioning of non-blocking slits in second barrier element array 806, by a spacing between pixel array 802 and first barrier element array 804, and a spacing between first and second barrier element arrays 804 and 806.

Furthermore, although shown in FIG. 9 as simultaneously delivering first and second three-dimensional views to viewers 904a and 904b, display system 800 may deliver a two-dimensional view to one of viewers 904a and 904b, and may simultaneously deliver a three-dimensional view to the other of viewers 904a and 904b. For example, pixels 814a-814c and pixels 816a-816c may deliver the same images (e.g., may display the same media content), such that third and fourth images 906c and 906d are the same. As such, because second viewer 904b receives the same view at each of right and left eye locations 908c and 908d, second viewer 904b perceives third and fourth images 906c and 906d as a single two-dimensional view. In another embodiment, to provide a two-dimensional view to viewer 904b, pixels 814a-814c may be turned off, and a width of slits 812a, 812c, and 812e may be adjusted such that pixels 816a-816c deliver a same view to both right and left eye locations 908c and 908d of viewer 904b (through slits 824a-824c). While second viewer 904b is being delivered a two-dimensional view, first and second images 906a and 906b may be simultaneously delivered to first viewer 904a as differing perspective images to be perceived as a three-dimensional view or as the same image to be perceived as a second two-dimensional view.

Still further, if it is desired for display system 800 to deliver a single two-dimensional or three-dimensional view (e.g., one of viewers 904a and 904b is no longer participating), one or both of first barrier element array 804 and second barrier element array 806 may be "turned off." For instance, to deliver a two-dimensional view to a viewer 904, first barrier element array 804 and second barrier element array 806 may each transition all of their corresponding barrier elements to the non-blocking state (be "turned off"), and pixel array 802 may be configured to emit a single two-dimensional image. To deliver a three-dimensional view to a viewer 904, one of first barrier element array 804 and second barrier element array 806 may transition all of its barrier elements to the non-blocking state, while the other of first barrier element array 804 and second barrier element array 806 may be configured to deliver a three-dimensional view.

Additional details concerning display systems that utilize adaptable light manipulators, such as adaptable parallax barriers, to support the simultaneous presentation of different two-dimensional and/or three-dimensional views to different viewers are provided in U.S. patent application Ser. No. 12/845,461, filed on Jul. 28, 2010, and entitled "Display Supporting Multiple Simultaneous 3D Views," the entirety of which is incorporated by reference herein.

As noted above, a configuration of adaptable parallax barrier 124 of display system 100 or a configuration of either of first and second parallax barrier 724 and 726 of display system 700 can be dynamically modified to support a particular viewing configuration. To further support the viewing configuration, the pixel array of each system must also be controlled to support the same viewing configuration. This concept will now be further described with continued reference to display system 100 of FIG. 1, although persons skilled in the relevant art(s) will appreciate that the concept is equally applicable to display system 700 of FIG. 7 and other display systems having adaptable light manipulators, such as adaptable parallax barriers.

When a configuration of adaptable parallax barrier 124 of display system 100 is modified to support a particular viewing configuration, pixel array 122 must also be controlled to support the same viewing configuration. In particular, the rendering of pixels of an image (also referred to herein as "image pixels") among the pixels of pixel array 122 (also referred to herein as "display pixels") must be handled in a manner that is consistent with a current configuration of adaptable parallax barrier 124. This may entail, for example, changing a number of display pixels that represents each image pixel (i.e., changing the resolution of a displayed image) and/or changing which display pixels or groups thereof correspond to the respective image pixels (i.e., changing the locations at which the image pixels are displayed), in response to modification of a configuration of adaptable parallax barrier 124. Such changes may be implemented by a controller (not shown in FIG. 1) via delivery of appropriate control signals 108 to pixel array driver circuitry 112.

For example, in one embodiment, when a configuration of adaptable parallax barrier 124 supports a first viewing configuration responsive to control signals 108, pixel array driver circuitry 112 sends drive signals 152 in conformance with control signals 108 such that the rendering of images to pixel array 122 occurs in a manner that also supports the first viewing configuration. Furthermore, when the configuration of adaptable parallax barrier 124 is modified to support a second viewing configuration responsive to control signals 108, pixel array driver circuitry 112 sends drive signals 152 in conformance with the control signals 108 such that the rendering of images to pixel array 122 occurs in a manner that also supports the second viewing configuration.

Figure 10:
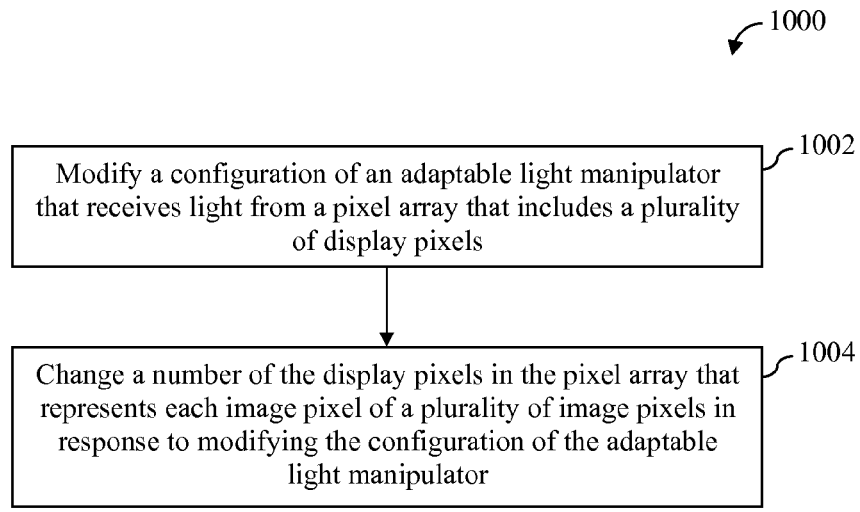
FIG. 10 depicts a flowchart of a method for controlling a pixel array to support a same viewing configuration as an adaptable light manipulator in accordance with an embodiment.

FIG. 10 depicts a flowchart 1000 of an example method for controlling a pixel array to support the same viewing configuration as an adaptable light manipulator (such as adaptable parallax barrier 124) in accordance with an embodiment. As shown in FIG. 10, the method of flowchart 1000 begins at step 1002. During step 1002, a configuration of an adaptable light manipulator, such as adaptable parallax barrier 124, is modified. At step 1004, a number of display pixels in a pixel array, such as pixel array 122, that represents each image pixel of a plurality of image pixels is changed in response to modifying the configuration of the adaptable light manipulator.

Figure 12:
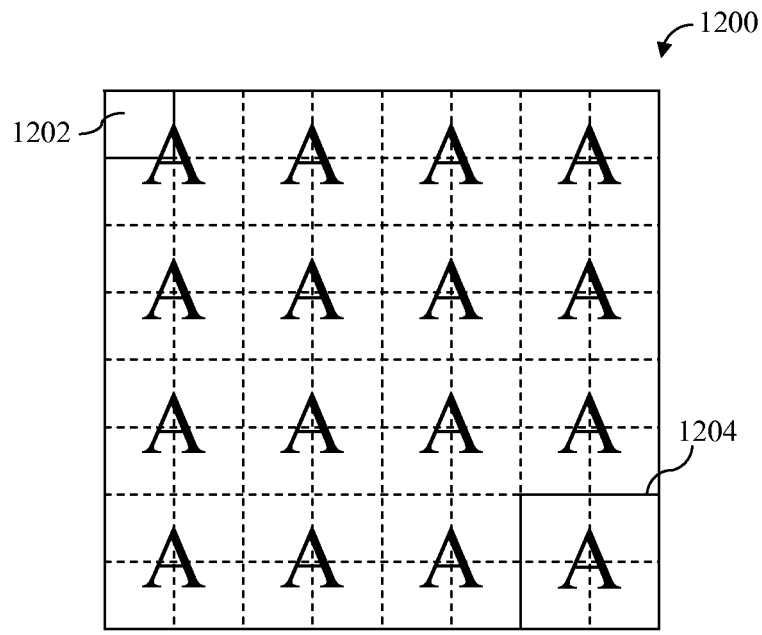
FIG. 12 illustrates a portion of a pixel array to which image pixels have been mapped to support a two-dimensional viewing configuration of an adaptable light manipulator in accordance with an embodiment.
Figure 13:
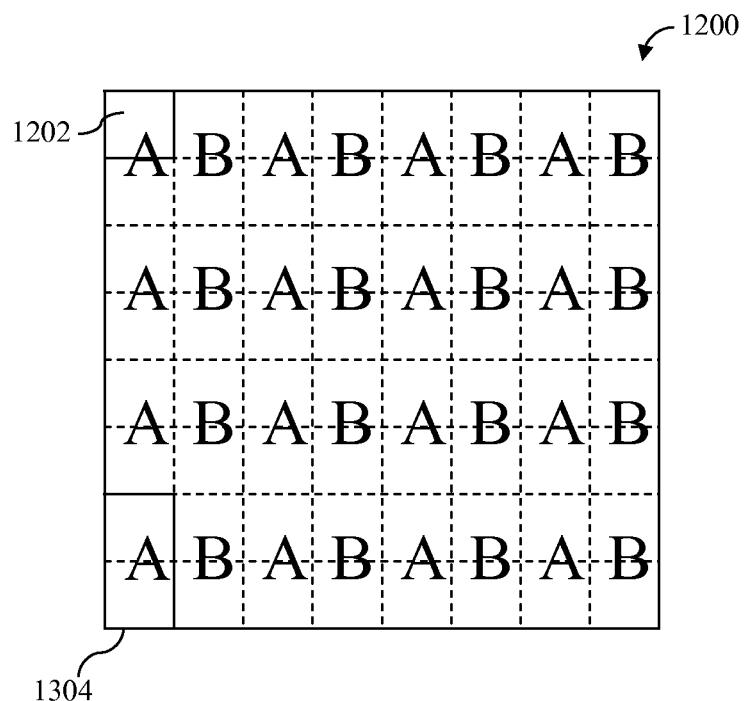
FIG. 13 illustrates how image pixels are mapped to the portion of the pixel array shown in FIG. 12 to support a first three-dimensional viewing configuration of an adaptable light manipulator in accordance with an embodiment.

FIGS. 12 and 13 provide a simple illustration of an application of the method of flowchart 10. As shown in FIG. 12, a portion of a pixel array 1200 includes a 16×16 array of display pixels. An example display pixel is shown as display pixel 1202. In one embodiment, each display pixel comprises a trio of red, green, and blue sub-pixels as discussed above. A first image comprising a 4×4 array of image pixels (each shown depicting the letter "A" to indicate that each is included in the same image) is mapped to the display pixels such that 4 display pixels are used to present each image pixel. An example of an image pixel is shown as image pixel 1204. In FIG. 12, the first image is intended to represent an image that is viewed when an adaptable light manipulator disposed proximate to the pixel array is configured to support a two-dimensional viewing configuration.

FIG. 13 is intended to represent the same portion of pixel array 1200 after the configuration of the adaptable light manipulator has been changed to support a three-dimensional viewing configuration. The three-dimensional viewing configuration requires the overlapping display of a first image and a second image across the same portion of pixel array 1200. This means that the first image must be represented with only half the display pixels. To achieve this, the pixel array is controlled such that 2 rather than 4 display pixels are used to present each image pixel of the first image (each still shown depicting the letter "A"). This corresponds to a decreased viewing resolution of the first image. The other half of the display pixels are now used to present each image pixel of a second image (each shown depicting the letter "B"). The image pixels associated with the different images are aligned with the adaptable light manipulator to achieve a desired three-dimensional viewing effect.

Figure 11:
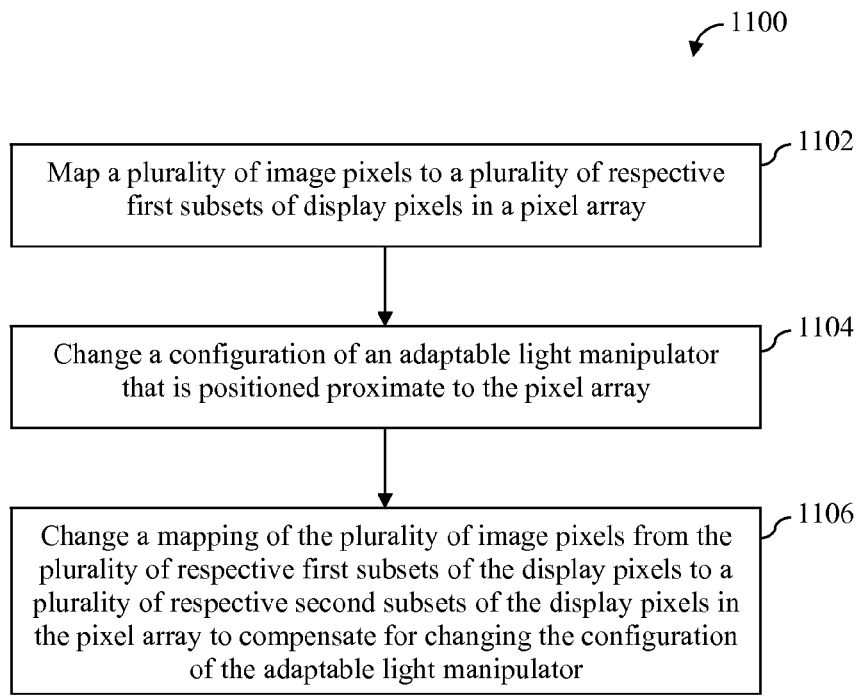
FIG. 11 depicts a flowchart of an alternate example method for controlling a pixel array to support a same viewing configuration as an adaptable light manipulator in accordance with an embodiment.

FIG. 11 depicts a flowchart 1100 of another example method for controlling a pixel array to support the same viewing configuration as an adaptable light manipulator (such as adaptable parallax barrier 124) in accordance with an embodiment. As shown in FIG. 11, the method of flowchart 1100 begins at step 1102. During step 1102, a plurality of image pixels is mapped to a plurality of respective first subsets of display pixels in a pixel array, such as pixel array 122. At step 1104, a configuration of an adaptable light manipulator that is positioned proximate to the pixel array is changed. For example, in an embodiment in which the adaptable light manipulator includes adaptable parallax barrier 124, a slit pattern, orientation, or the like, of adaptable parallax barrier 124 may be changed. At step 1106, a mapping of the plurality of image pixels is changed from the plurality of respective first subsets of the display pixels to a plurality of respective second subsets of the display pixels in the pixel array to compensate for changing the configuration of the adaptable light manipulator.

Figure 14:
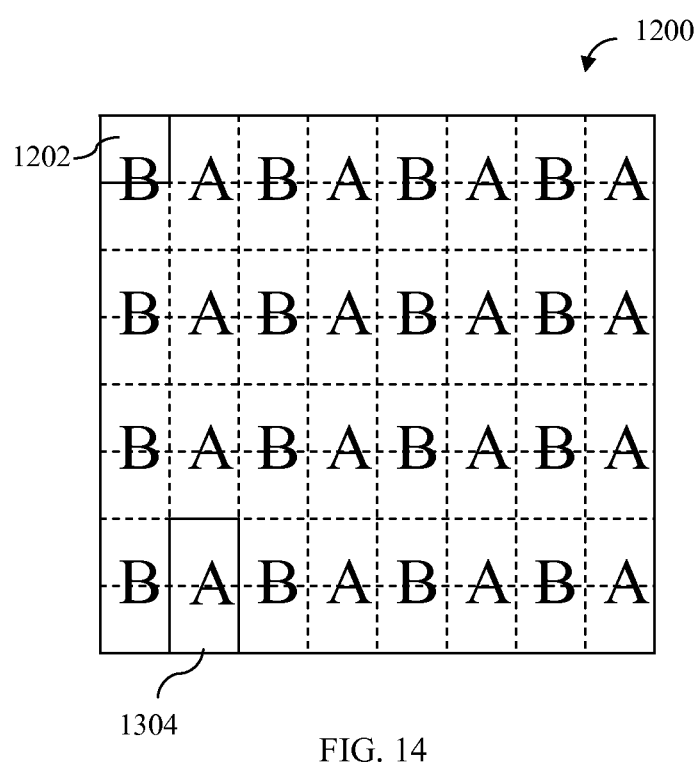
FIG. 14 illustrates how image pixels are mapped to the portion of the pixel array shown in FIGS. 12 and 13 to support a second three-dimensional viewing configuration of an adaptable light manipulator in accordance with an embodiment.

FIGS. 13 and 14 provide a simple illustration of an application of the method of flowchart 1100. As shown in FIG. 13, a portion of a pixel array 1200 is used to simultaneously display a first image comprising image pixels shown depicting the letter "A" and a second image comprising image pixels shown depicting the letter "B." As noted above, this display format is utilized to support a three-dimensional viewing configuration corresponding to a particular arrangement of an adaptable light manipulator disposed proximate to the pixel array. FIG. 14 is intended to represent the same portion of pixel array 1200 after the configuration of the adaptable light manipulator has been changed to support a modified three-dimensional viewing configuration (e.g., in response to a changed location of a viewer or some other factor). The modified three-dimensional viewing configuration requires the display location of the first image and the second image to be shifted, as shown in FIG. 14. Thus, for example, rather than rendering image pixel 1304 to the bottom-most two display pixels in the far-left column of array portion 1200, the same image pixel 1304 is now rendered to the bottom-most two display pixels in the second column from the left of array portion 1200.

Numerous other methods may be used to control the rendering of image pixels to display pixels in support of a desired two-dimensional and/or three-dimensional viewing configuration implemented by one or more adaptable parallax barriers or other adaptable light manipulator(s). Additional details concerning such control of a pixel array may be found in commonly-owned, co-pending U.S. patent application Ser. No. 12/774,225, filed on May 5, 2010 and entitled "Controlling a Pixel Array to Support an Adaptable Light Manipulator, the entirety of which is incorporated by reference herein."

Figure 15:
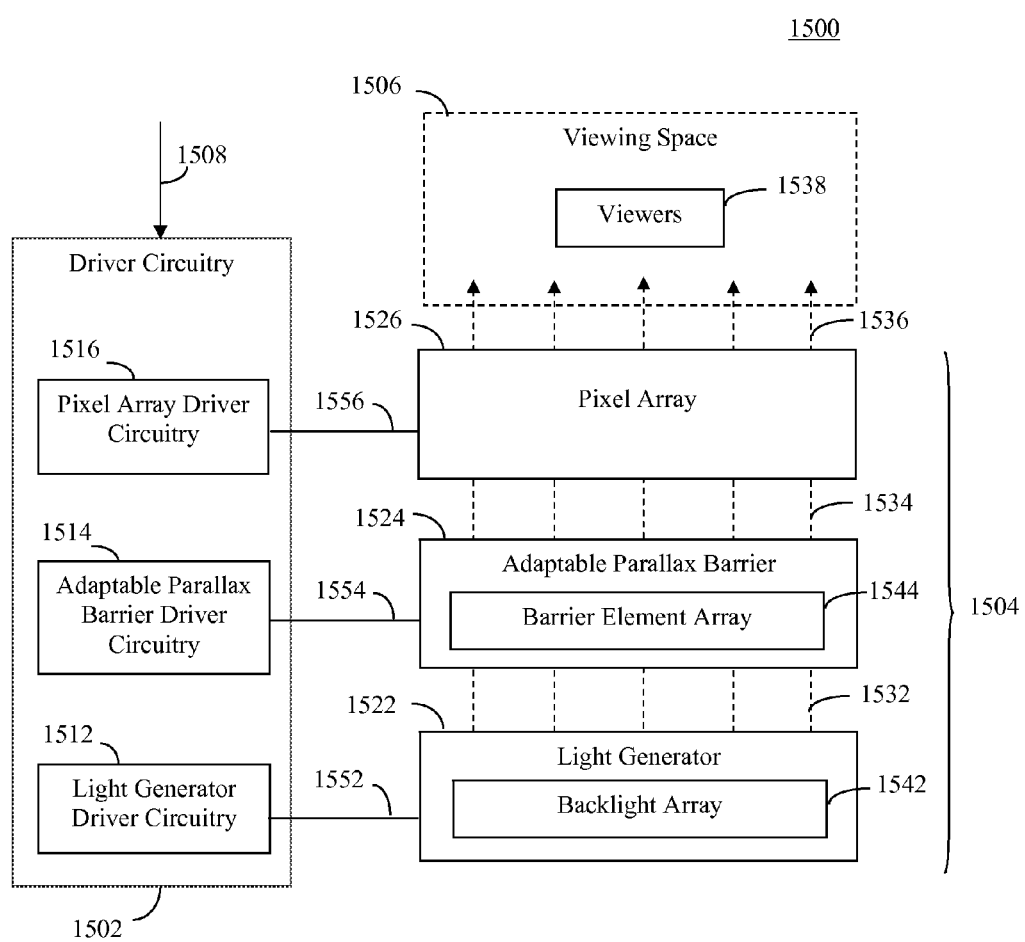
FIG. 15 is a block diagram of an example display system that utilizes an adaptable parallax barrier and a light generator to support multiple viewing configurations in accordance with an embodiment.

FIG. 15 shows a block diagram of yet another example display system 1500 that utilizes an adaptable parallax barrier to support multiple viewing configurations. As shown in FIG. 15, display system 1500 includes driver circuitry 1502 and a screen assembly 1504, wherein screen assembly 1504 include a light generator 1522, an adaptable parallax barrier 1524 and a pixel array 1526. As further shown in FIG. 15, driver circuitry 1502 includes light generator driver circuitry 1512, adaptable parallax barrier driver circuitry 1514 and pixel array driver circuitry 1516.

Light generator 1522 emits light 1532. Adaptable parallax barrier 1524 is positioned proximate to light generator 1522. Barrier element array 1544 is a layer of adaptable parallax barrier 1524 that includes a plurality of barrier elements or blocking regions arranged in an array. Each barrier element of the array is configured to be selectively opaque or transparent. Barrier element array 1544 filters light 1532 received from light generator 1522 to generate filtered light 1534. Filtered light 1534 is configured to enable a two-dimensional image, a three-dimensional image, or a pair of two-dimensional or three-dimensional images to be formed based on images subsequently imposed on filtered light 1534 by pixel array 1526.

Pixel array 1526 includes a two-dimensional array of pixels (e.g., arranged in a grid or other distribution) like pixel array 122 of FIG. 1. Pixel array 1526 is not self-illuminating and operates as a light filter that imposes images (e.g., in the form of color, grayscale, etc.) on filtered light 1534 from adaptable parallax barrier 1524 to generate filtered light 1536 to include one or more images. Each pixel of pixel array 1526 may be a separately addressable filter (e.g., a pixel of a plasma display, an LCD display, an LED display, or of other type of display). Each pixel of pixel array 1526 may be individually controllable to vary the color imposed on the corresponding light passing through, and/or to vary the intensity of the passed light in filtered light 1536. In an embodiment, each pixel of pixel array 1526 may include a plurality of sub-pixels that correspond to separate color channels, such as a trio of red, green, and blue sub-pixels included in each pixel.

Driver circuitry 1502 receives control signals 1508 from control circuitry (not shown in FIG. 15). Control signals 1508 cause driver circuitry 1502 to place screen 1504 in a selected one of a plurality of different viewing configurations. In particular, based on control signals 1508, adaptable parallax barrier driver circuitry 1514 transmits drive signals 1554 that cause barrier element array 1544 to be placed in a state that supports the selected viewing configuration. Likewise, based on control signals 1508, pixel array driver circuitry 1516 transmits drive signals 1556 to cause pixels of one or more images (also referred to herein as "image pixels") to be rendered among the pixels of pixel array 1526 (also referred to herein as "display pixels") in a manner that is consistent with a current configuration of adaptable parallax barrier 1524. The selected viewing configuration may be a particular two-dimensional viewing configuration, a particular three-dimensional viewing configuration, or a viewing configuration that supports the simultaneous display of different types of two-dimensional and/or three-dimensional content.

As discussed in commonly-owned, co-pending U.S. patent application Ser. No. 12/982,020 (A05.01210000), filed on even date herewith and entitled "Backlighting Array Supporting Adaptable Parallax Barrier," the entirety of which is incorporated by reference herein, conventional LCD displays typically include a backlight and a display panel that includes an array of LCD pixels. The backlight is designed to produce a sheet of light of uniform luminosity for illuminating the LCD pixels. When simultaneously displaying two-dimensional, three-dimensional and multi-view three-dimensional regions using an adaptable parallax barrier such as that described in the aforementioned, incorporated U.S. patent application Ser. No. 12/845,440, the use of a conventional backlight will result in a disparity in perceived brightness between the different simultaneously-displayed regions. This is because the number of visible pixels per unit area associated with a two-dimensional region will generally exceed the number of visible pixels per unit area associated with a particular three-dimensional or multi-view three-dimensional region (in which the pixels must be partitioned among different eyes/views).

To address this issue, light generator 1522 includes a backlight array 1542 which is a two-dimensional array of light sources. Such light sources may be arranged, for example, in a rectangular grid. Each light source in backlight array 1542 is individually addressable and controllable to select an amount of light emitted thereby. A single light source may comprise one or more light-emitting elements depending upon the implementation. In one embodiment, each light source in backlight array 1542 comprises a single light-emitting diode (LED) although this example is not intended to be limiting.

The amount of light emitted by the individual light sources that make up backlight array 1542 can selectively controlled by drive signals 1552 generated by light generator driver circuitry 1512 so that the brightness associated with each of a plurality of display regions of screen 1504 can also be controlled. This enables display system 1500 to provide a desired brightness level for each display region automatically and/or in response to user input. For example, backlight array 1542 can be controlled such that a uniform level of brightness is achieved across different simultaneously-displayed display regions, even though the number of perceptible pixels per unit area varies from display region to display region. As another example, backlight array 1542 can be controlled such that the level of brightness associated with a particular display region is increased or reduced without impacting (or without substantially impacting) the brightness of other simultaneously-displayed display regions.

To help illustrate this, FIG. 16 provides an exploded view of a display system 1600 that implements a controllable backlight array as described immediately above. Display system 1600 comprises one implementation of display system 1500. As shown in FIG. 16, display system 1600 includes a light generator 1602 that includes a backlight array 1612, an adaptable parallax barrier 1604 that includes a barrier element array 1622 and a display panel 1606 that includes a pixel array 1632. These elements may be aligned with and positioned proximate to each other to create an integrated screen assembly.

In accordance with the example configuration shown in FIG. 16, a first portion 1634 of pixel array 1632 and a first portion 1624 of barrier element array 1622 have been manipulated to create a first display region that displays multi-view three-dimensional content, a second portion 1636 of pixel array 1632 and a second portion 1626 of barrier element array 1622 have been manipulated to create a second display region that displays a three-dimensional image, and a third portion of 1638 of pixel array 1632 and a third portion 1628 of barrier element array 1622 have been manipulated to create a third display region that displays a two-dimensional image. To independently control the brightness of each of the first, second and third display regions, the amount of light emitted by light sources included within a first portion 1614, a second portion 1616 and a third portion 1618 of backlight array 1612 can respectively be controlled. For example, the light sources within first portion 1614 may be controlled to provide greater luminosity than the light sources within second portion 1616 and third portion 1618 as the number of perceivable pixels per unit area will be smallest in the first display region with which first portion 1614 is aligned. In further accordance with this example, the light sources within second portion 1616 may be controlled to provide greater luminosity than the light sources within third portion 1618 since the number of perceivable pixels per unit area will be smaller in the second display region with which second portion 1616 is aligned than the third display region with which third portion 1618 is aligned. Of course, if uniform luminosity is not desired across the various display regions then other control schemes may be used.

Of course, the arrangement shown in FIG. 16 provides only a single teaching example. It should be noted that a display system in accordance with an embodiment can dynamically manipulate pixel array 1632 and barrier element array 1622 in a coordinated fashion to dynamically and simultaneously create any number of display regions of different sizes and in different locations, wherein each of the created display regions can display one of two-dimensional, three-dimensional or multi-view three-dimensional content. To accommodate this, backlight array 1612 can also be dynamically manipulated in a coordinated fashion with pixel array 1632 and barrier element array 1622 to ensure that each display region is perceived at a desired level of brightness.

In the arrangement shown in FIG. 16, there is a one-to-one correspondence between each light source in backlight array 1612 and every display pixel in pixel array 1632. However, this need not be the case to achieve regional brightness control. For example, in certain embodiments, the number of light sources provided in backlight array 1212 is less than the number of pixels provided in pixel array 1632. For instance, in one embodiment, a single light source may be provided in backlight array 1612 for every N pixels provided in pixel array 1632, wherein N is an integer greater than 1. In an embodiment in which the number of light sources in backlight array 1612 is less than the number of pixels in pixel array 1632, each light source may be arranged so that it provides backlighting for a particular group of pixels in pixel array 1632, although this is only an example. In alternate embodiments, the number of light sources provided in backlight array 1612 is greater than the number of pixels provided in pixel array 1632.

Also, in the examples described above, light sources in backlight array 1612 are described as being individually controllable. However, in alternate embodiments, light sources in backlight array 1612 may only be controllable in groups. This may facilitate a reduction in the complexity of the control infrastructure associated with backlight array 1612. In still further embodiments, light sources in backlight array 1612 may be controllable both individually and in groups.

It is also noted that although FIGS. 15 and 16 show display system configurations in which a barrier element array of an adaptable parallax barrier is disposed between a backlight array of individually addressable and controllable light sources and a pixel array, in alternate implementations the pixel array may be disposed between the backlight array and the barrier element array. Such an alternate implementation is shown in FIG. 17. In particular, FIG. 17 is a block diagram of a display system 1700 that includes a pixel array 1724 disposed between a light generator 1722 that includes a backlight array 1742 and an adaptable parallax barrier 1726 that includes a barrier element array 1744 to support the generation of two-dimensional and/or three-dimensional images perceivable in a viewing space 1706. In such alternate implementations, selective control of the luminosity of groups or individual ones of the light sources in backlight array 1742 may also be used to vary the backlighting luminosity associated with different display regions created by the interaction of backlight array 1742, pixel array 1724 and barrier element array 1744.

Other example display system implementations that utilize a backlight array of independently-controllable light sources are described in the aforementioned, incorporated U.S. patent application Ser. No. 12/982,020 (A05.01210000), filed on even date herewith and entitled "Backlighting Array Supporting Adaptable Parallax Barrier." That application also describes other approaches for controlling the brightness of different simultaneously-displayed display regions of a display system. Some of these approaches will be described below.

For example, to achieve independent region-by-region brightness control in a display system that includes a conventional backlight panel designed to produce a sheet of light of uniform luminosity, the amount of light passed by the individual pixels that make up a pixel array can be selectively controlled so that the brightness associated with each of a plurality of display regions can also be controlled. To help illustrate this, FIG. 18 provides an exploded view of a display system 1800 that implements a regional brightness control scheme based on pixel intensity as described immediately above. As shown in FIG. 18, display system 1800 includes a display panel 1802 and an adaptable parallax barrier 1804. Display system 1800 also includes a backlight panel, although this element is not shown in FIG. 18. These elements may be aligned with and positioned proximate to each other to create an integrated display screen.

As further shown in FIG. 18, display panel 1802 includes a pixel array 1812. Each of the pixels in a first portion 1814 of pixel array 1812 is individually controlled by pixel array driver circuitry to pass a selected amount of light produced by a backlight panel (not shown in FIG. 18), thereby producing display-generated light representative of a single two-dimensional image. Each of the pixels in a second portion 1816 of pixel array 1812 is individually controlled by the pixel array driver circuitry to pass a selected amount of light produced by the backlight panel, thereby producing display-generated light representative of two two-dimensional images that, when combined by the brain of a viewer positioned in an appropriate location relative to display system 1800, will be perceived as a single three-dimensional image.

Adaptable parallax barrier 1804 includes barrier element array 1822 that includes a first portion 1824 and a second portion 1826. Barrier element array 1822 is aligned with pixel array 1814 such that first portion 1824 of blocking region array 1822 overlays first portion 1814 of pixel array 1812 and second portion 1826 of blocking region array 1822 overlays second portion 1816 of pixel array 1812. Adaptable parallax barrier driver circuitry causes all the barrier elements within first portion 1824 of barrier element array 1822 to be transparent. Thus, the two-dimensional image generated by the pixels of first portion 1814 of pixel array 1812 will simply be passed through to a viewer in a viewing space in front of display system 1400. Furthermore, the adaptable parallax barrier driver circuitry manipulates the barrier elements within second portion 1826 of blocking region array 1822 to form a plurality of parallel transparent strips alternated with parallel opaque strips, thereby creating a parallax effect that enables the two two-dimensional images generated by the pixels of second portion 1816 of pixel array 1812 to be perceived as a three-dimensional image by a viewer in the viewing space in front of display system 1800.

Assume that a viewer is positioned such that he/she can perceive both the two-dimensional image passed by first portion 1824 of barrier element array 1822 and the three-dimensional image formed through parallax by second portion 1826 of barrier element 1822. As discussed above, the pixels per unit area perceived by this viewer with respect to the two-dimensional image will be greater than the pixels per unit area perceived by this viewer with respect to the three-dimensional image. Thus, the two-dimensional image will appear brighter to the viewer than the three dimensional image when backlighting of constant luminosity is provided behind pixel array 1812.

To address this issue, drive signals may be transmitted to display panel 1802 that selectively cause the pixels included in first portion 1814 of pixel array 1812 to pass less light from the backlight panel (i.e., become less intense), thereby reducing the brightness of the two-dimensional image produced from the pixels in first portion 1814 of pixel array 1812. Alternatively or additionally, drive signals may be transmitted to display panel 1802 that selectively cause the pixels included in second portion 1816 of pixel array 1812 to pass more light from the backlight panel (i.e., become more intense), thereby increasing the brightness of the three-dimensional image produced from the pixels in second portion 1816 of pixel array 1812. By controlling the intensity of the pixels in portions 1814 and 1816 of pixel array 1812 in this manner, the brightness of the two-dimensional image produced from the pixels in first portion 1814 of pixel array 1812 and the brightness of the three-dimensional image produced from the pixels in second portion 1816 of pixel array 1812 can be kept consistent. Additionally, by providing independent control over the intensity of the pixels in portions 1814 and 1816 of pixel array 1812, independent control over the brightness of the two-dimensional and three-dimensional images generated therefrom can also be achieved.

Of course, the arrangement shown in FIG. 18 provides only a single teaching example. It should be noted that a display system in accordance with an embodiment can dynamically manipulate pixel array 1812 and blocking element array 1822 in a coordinated fashion to dynamically and simultaneously create any number of display regions of different sizes and in different locations, wherein each of the created display regions can display one of two-dimensional, three-dimensional or multi-view three-dimensional content. To accommodate this, the intensity of the pixels in pixel array 1812 can also be dynamically manipulated in a coordinated fashion to ensure that each display region is perceived at a desired level of brightness.

In one embodiment, a regional brightness control scheme combines the use of a backlight array of independently-controllable light sources as previously described with regional pixel intensity control. The advantages of such a control scheme will now be described with reference to FIG. 19. FIG. 19 illustrates a front perspective view of a display panel 1900. Display panel 1900 includes a pixel array 1902 that includes a first portion 1904 and a second portion 1906, wherein each of first portion 1904 and second portion 1906 includes a different subset of the pixels in pixel array 1902. It is to be assumed that first portion 1904 of pixel array 1902 is illuminated by backlighting provided by an aligned first portion of a backlight array (not shown in FIG. 19), wherein the backlight array is similar to backlight array 1542 described above in reference to FIG. 15. Second portion 1906 of pixel array 1902 is illuminated by backlighting provided by an aligned second portion of the backlight array. In one example the amount of light emitted by each light source in the second portion of the backlight array to illuminate second portion 1906 of pixel array 1902 is controlled such that it is greater than the amount of light emitted by each light source in the first portion of the backlight array to illuminate first portion 1904 of pixel array 1902. This control scheme may be applied, for example, to cause a three-dimensional image formed by interaction between the pixels in second portion 1906 of pixel array 1902 and an adaptable parallax barrier to appear to have a uniform brightness level with respect to a two-dimensional image formed by interaction between the pixels in first portion 1904 of pixel array 1902 and the adaptable parallax barrier.

However, the difference in the amount of light emitted by each light source in the first and second portions of the backlight array to illuminate corresponding first and second portions 1904 and 1906 of pixel array 1902 may also give rise to undesired visual artifacts. In particular, the difference may cause pixels in boundary areas immediately outside of second portion 1906 of pixel array 1902 to appear brighter than desired in relation to other pixels in first portion 1904 of pixel array 1902. For example, as shown in FIG. 19, the pixels in boundary area 1912 immediately outside of second portion 1906 of pixel array 1902 may appear brighter than desired in relation to other pixels in first portion 1904 of pixel array 1902. This may be due to the fact that the increased luminosity provided by the light sources in the second portion of the backlight array has "spilled over" to impact the pixels in boundary area 1912, causing those pixels to be brighter than desired. Conversely, the difference may cause pixels in boundary areas immediately inside of second portion 1906 of pixel array 1502 to appear dimmer than desired in relation to other pixels in second portion 1906 of pixel array 1902. For example, as shown in FIG. 19, the pixels in boundary area 1914 immediately inside of second portion 1906 of pixel array 1902 may appear dimmer than desired in relation to other pixels in second portion 1906 of pixel array 1902. This may be due to the fact that the reduced luminosity of the light sources in the first portion of the backlight array has "spilled over" to impact the pixels in boundary area 1914, causing those pixels to be dimmer than desired.

To address this issue, an embodiment may selectively control the amount of light passed by the pixels located in boundary region 1912 and/or boundary region 1914 to compensate for the undesired visual effects. For example, driver circuitry associated with pixel array 1902 may selectively cause the pixels included in boundary area 1912 of pixel array 1902 to pass less light from the backlight panel (i.e., become less intense), thereby reducing the brightness of the pixels in boundary area 1912, thus compensating for an undesired increase in brightness due to "spill over" from light sources in the second portion of the backlight array. Alternatively or additionally, driver circuitry associated with pixel array 1902 may selectively cause the pixels included in boundary area 1914 of pixel array 1902 to pass more light from the backlight panel (i.e., become more intense), thereby increasing the brightness of the pixels in boundary area 1914, thus compensating for an undesired reduction in brightness due to "spill over" from light sources in the first portion of the backlight array. By controlling the intensity of the pixels in boundary areas 1912 and/or 1914 in this manner, the undesired visual effects described above that can arise from the use of a backlight array to provide regional brightness control can be mitigated or avoided entirely.

The illustration provided in FIG. 19 provides only one example of undesired visual effects that can arise from the use of a backlight array to provide regional brightness control. Persons skilled in the relevant art(s) will appreciate that many different display regions having many different brightness characteristics can be simultaneously generated by a display system in accordance with embodiments, thereby giving rise to different undesired visual effects relating to the brightness of boundary areas inside and outside of the different display regions. In each case, the intensity of pixels located in such boundaries areas can be selectively increased or reduced to mitigate or avoid such undesired visual effects.

In additional embodiments, a regional brightness control scheme is implemented in a display system that does not include a backlight panel at all, but instead utilizes a display panel comprising an array of organic light emitting diodes (OLEDs) or polymer light emitting diodes (PLEDs) which function as display pixels and also provide their own illumination. Display system 100 described above in reference to FIG. 1 may be representative of such a system, provided that pixel array 122 comprises an array of OLEDs or PLEDs. In accordance with such an implementation, the amount of light emitted by the individual OLED/PLED pixels that make up the OLED/PLED pixel array can be selectively controlled so that the brightness associated with each of a plurality of display regions of display system 100 can also be controlled. This enables display system 100 to provide a desired brightness level for each display region automatically and/or in response to user input. For example, the OLED/PLED pixel array can be controlled such that a uniform level of brightness is achieved across different simultaneously-displayed display regions, even though the number of perceptible pixels per unit area varies from display region to display region. As another example, the OLED/PLED pixel array can be controlled such that the level of brightness associated with a particular display region is increased or reduced without impacting (or without substantially impacting) the brightness of other simultaneously-displayed display regions.

Where OLED/PLED pixel regions such as those described above are adjacent to each other, it is possible that the brightness characteristics of one pixel region can impact the perceived brightness of an adjacent pixel region having different brightness characteristics, creating an undesired visual effect. For example, a first OLED/PLED pixel region having a relatively high level of brightness to support the viewing of multi-view three-dimensional content may be adjacent to a second OLED/PLED pixel region having a relatively low level of brightness to support the viewing of two-dimensional content. In this scenario, light from pixels in a perimeter area of the first OLED/PLED pixel region that are close to the boundary between the two pixel regions may "spill over" into a perimeter area of the second OLED/PLED pixel region. This may cause pixels in the perimeter area of the second OLED/PLED pixel region to appear brighter than desired in relation to other pixels in the second OLED/PLED pixel region. Conversely, pixels in the perimeter area of the first OLED/PLED pixel array may appear dimmer than desired in relation to other pixels in the first OLED/PLED pixel region because of the adjacency to the second OLED/PLED pixel region. To address this issue, it is possible to selectively increase or reduce the brightness of one or more OLED/PLED pixels in either perimeter area to reduce the "spill over" effect arising from the different brightness characteristics between the regions.

In still further embodiments, a regional brightness control scheme is implemented in a display system that includes an adaptable parallax barrier that also supports brightness regulation via an "overlay" approach. Such an approach involves the use of a brightness regulation overlay that is either independent of or integrated with an adaptable parallax barrier. The brightness regulation overlay is used to help achieve the aforementioned goals of maintaining standard brightness across various regional screen configurations and compensating for or minimizing backlighting dispersion.

The brightness regulation overlay comprises an element that allows regional dimming through various tones of "grey" pixels. In one example embodiment, an adaptable parallax barrier and the brightness regulation overlay are implemented as a non-color (i.e., black, white and grayscale) LCD sandwich, although other implementations may be used. The combined adaptable parallax barrier and brightness regulation overlay provide full transparent or opaque states for each pixel, as well as a grayscale alternative that can be used to "balance out" brightness variations caused by the parallax barrier itself.

Control over the individual barrier elements of the parallax barrier and the individual grayscale pixels of the brightness regulation overlay may be provided by using coordinated driver circuitry signaling. Such coordinate signaling may cause the pixels of the adaptable parallax barrier and the brightness regulation overlay (collectively referred to below as the manipulator pixels) to create opaque and transparent barrier elements associated with a particular parallax barrier configuration and a grayscale support there between to allow creation of overlays.

FIG. 20 illustrates two exemplary configurations of an adaptable light manipulator 2000 that includes an adaptable parallax barrier and a brightness regulation overlay implemented as a light manipulating LCD sandwich with manipulator grayscale pixels. In FIG. 20, the grayscale pixels map to the display pixels on a one-to-one basis, but that need not be the case.

A first exemplary configuration of adaptable light manipulator 2000 is shown above the section line denoted with reference numeral 2002. In accordance with the first exemplary configuration, a three-dimensional region 2004 is created with fully transparent or fully opaque manipulator pixels that provide parallax barrier functionality and a two-dimensional region 2006 is created having continuous medium gray manipulator pixels. The medium gray manipulator pixels operate to reduce the perceived brightness of two-dimensional region 2006 to better match that of three-dimensional region 2004. It is noted that in other example configurations, two-dimensional region 2006 could instead comprise a three-dimensional region having a number of views that is different than three-dimensional region 2004, thus also requiring brightness regulation.

In the first exemplary configuration, no boundary region compensation is performed. In the second exemplary configuration, which is shown below section line 2002, boundary region compensation is performed. For example, a boundary region 2010 within two-dimensional region 2006 may be "lightened" to a light gray to compensate for any diminution of light that might occur near the boundary with three-dimensional region 2004. In contrast, the grayscale level of an inner portion 2008 of two-dimensional region 2006 is maintained at the same medium gray level as in the portion of two-dimensional region 2006 above section line 2002. As a further example, a first boundary region 2012 and a second boundary region 2014 within three-dimensional region 2004 comprise darker and lighter gray transitional areas, respectively, to account for light dispersion from two-dimensional region 2006. In contrast, an inner portion 2016 of three-dimensional region 2004 includes only fully transparent or fully opaque manipulator pixels consistent with a parallax barrier configuration and no brightness regulation.

In one embodiment, the configuration of adaptable light manipulator 2000 is achieved by first creating a white through various grayscale areas that correspond to the regions and boundary areas to be formed. Once established, the manipulator pixels in these areas that comprise the opaque portions of the parallax barrier are overwritten to turn them black. Of course this two-stage approach is conceptual only and no "overwriting" need be performed.

In certain embodiments, adaptable light manipulator 2000 comprises the only component used in a display system for performing brightness regulation and/or boundary region compensation. In alternate embodiments, the display system further utilizes any one or more of the following aforementioned techniques for performing brightness regulation and/or boundary region compensation: a backlight array with independently-controllable light sources, and/or a pixel array and associated control logic for selectively increasing or decreasing the intensity of display pixels (e.g., either LCD pixels or OLED/PLED pixels). Note that in certain embodiments (such as the one described above in reference to FIG. 20), adaptable light manipulator 2000 is implemented as an integrated adaptable parallax barrier and brightness regulation overlay. However, in alternate embodiments, adaptable light manipulator 2000 is implemented using an adaptable parallax barrier panel and an independent brightness regulation overlay panel.

It is noted that any of the non-uniform light generation schemes described above may also be used in conjunction with a display system that includes multiple parallax barriers, such as display system 700 of FIG. 7, to support simultaneous presentation of regional two-dimensional, three-dimensional and multi-view three dimensional views. Furthermore, each region supported by such non-uniform light generation may comprise a region that simultaneously presents multiple different two-dimensional and/or three-dimensional views to multiple respective viewers.

B. Example Screen Assemblies Including Adaptable Lenticular Lenses

In display systems in accordance with further embodiments, rather than using an adaptable parallax barrier to perform light manipulation in support of multiple viewing configurations (including configurations that support the simultaneous display of different visual presentations to different corresponding viewers), an adaptable lenticular lens may be used. For example, with respect to example display system 100 of FIG. 1, adaptable parallax barrier 124 may be replaced with an adaptable lenticular lens. Likewise, with respect to example display system 700 of FIG. 7, either of first parallax barrier 724 or second parallax barrier 726 may be replaced with a lenticular lens, such as an adaptable lenticular lens.

FIG. 21 shows a perspective view of an adaptable lenticular lens 2100 in accordance with an embodiment. As shown in FIG. 21, adaptable lenticular lens 2100 includes a sub-lens array 2102. Sub-lens array 2102 includes a plurality of sub-lenses 2104 arranged in a two-dimensional array (e.g., arranged side-by-side in a row). Each sub-lens 2104 is shown in FIG. 21 as generally cylindrical in shape and having a substantially semi-circular cross-section, but in other embodiments may have other shapes. In FIG. 21, sub-lens array 2102 is shown to include eight sub-lenses for illustrative purposes and is not intended to be limiting. For instance, sub-lens array 2102 may include any number (e.g., hundreds, thousands, etc.) of sub-lenses 2104. FIG. 22 shows a side view of adaptable lenticular lens 2100. In FIG. 22, light may be passed through adaptable lenticular lens 2100 in the direction of dotted arrow 2202 to be diverted. Adaptable lenticular lens 2100 is adaptable in that it can be modified to manipulate light in different ways in order to accommodate different viewing configurations. For example, in one embodiment, adaptable lenticular lens is made from an elastic material and can be stretched or shrunk in one or more directions in response to generated drive signals.

Further description regarding the use of an adaptable lenticular lens to deliver three-dimensional views is provided in commonly-owned, co-pending U.S. patent application Ser. No. 12/774,307, titled "Display with Elastic Light Manipulator," which is incorporated by reference herein in its entirety.

C. Example Display System with Adaptable Screen Assembly

FIG. 23 is a block diagram of an example implementation of a display system 2300 that includes an adaptable screen assembly that supports the simultaneous display of multiple visual presentations in accordance with an embodiment. As shown in FIG. 23, display system 2300 generally comprises control circuitry 2302, driver circuitry 2304 and an adaptable screen assembly 2306.

As shown in FIG. 23, control circuitry 2302 includes a processing unit 2314, which may comprise one or more general-purpose or special-purpose processors or one or more processing cores. Processing unit 2314 is connected to a communication infrastructure 2312, such as a communication bus. Control circuitry 2302 may also include a primary or main memory (not shown in FIG. 23), such as random access memory (RAM), that is connected to communication infrastructure 2312. The main memory may have control logic stored thereon for execution by processing unit 2314 as well as data stored thereon that may be input to or output by processing unit 2314 during execution of such control logic.

Control circuitry 2302 may also include one or more secondary storage devices (not shown in FIG. 23) that are connected to communication infrastructure 2312, including but not limited to a hard disk drive, a removable storage drive (such as an optical disk drive, a floppy disk drive, a magnetic tape drive, or the like), or an interface for communicating with a removable storage unit such as an interface for communicating with a memory card, memory stick or the like. Each of these secondary storage devices provide an additional means for storing control logic for execution by processing unit 2314 as well as data that may be input to or output by processing unit 2314 during execution of such control logic.

Control circuitry 2302 further includes a remote control interface 2318 that is connected to communication infrastructure 2312. Remote control interface 2318 is configured to receive remote control signals from one or more of a plurality of remote control devices. Processing unit 2314 or other processing circuitry within control circuitry 2302 may be configured to interpret such remote control signals and to perform certain operations based on the interpreted remote control signals. Such actions may include, for example, modifying a particular visual presentation being displayed by adaptable screen assembly 2306 or obtaining media content for presentation via a particular view supported by adaptable screen assembly 2306. In one embodiment, remote control signals received by remote control interface 2318 from each of a plurality of remote control devices are interpreted in accordance with a common remote control application programming interface (API). Control circuitry 2302 may include other interfaces other than remote control interface 2318 for receiving input from user.

Control circuitry 2302 also includes a viewer tracking unit 2316. Viewer tracking unit 2316 is intended to generally represent any type of functionality for determining or estimating a location of one or more viewers of display system 2300 relative to adaptable screen assembly 2306, a head orientation of one or more viewers of display system 2300 and/or a point of gaze of one or more viewers of display system 2300. Viewer tracking unit 2316 may perform such functions using different types of sensors (e.g., cameras, motion sensors, microphones or the like) or by using tracking systems such as those that wirelessly track an object (e.g., headset, remote control, or the like) currently being held or worn by a viewer.

Media interface 2320 is intended to represent any type of interface that is capable of receiving media content such as video content or image content. In certain implementations, media interface 2320 may comprise an interface for receiving media content from a remote source such as a broadcast media server, an on-demand media server, or the like. In such implementations, media interface 2320 may comprise, for example and without limitation, a wired or wireless internet or intranet connection, a satellite interface, a fiber interface, a coaxial cable interface, or a fiber-coaxial cable interface. Media interface 2320 may also comprise an interface for receiving media content from a local source such as a DVD or Blu-Ray disc player, a personal computer, a personal media player, smart phone, or the like. Media interface 2320 may be capable of retrieving video content from multiple sources.

Control circuitry 2302 further includes a communication interface 2322. Communication interface 2322 enables control circuitry 2302 to send control signals via a communication medium 2352 to another communication interface 2330 within driver circuitry 2304, thereby enabling control circuitry 2302 to control the operation of driver circuitry 2304. Communication medium 2352 may comprise any kind of wired or wireless communication medium suitable for transmitting such control signals.

As shown in FIG. 23, driver circuitry 2304 includes the aforementioned communication interface 2330 as well as pixel array driver circuitry 2332 and adaptable light manipulator(s) driver circuitry 2334. Driver circuitry also optionally includes light generator driver circuitry 2336. Each of these driver circuitry elements is configured to receive control signals from control circuitry 2302 (via the link between communication interface 2322 and communication interface 2330) and, responsive thereto, to send selected drive signals to a corresponding hardware element within adaptable screen assembly 2306, the drive signals causing the corresponding hardware element to operate in a particular manner. In particular, pixel array driver circuitry 2332 is configured to send selected drive signals to a pixel array 2342 within adaptable screen assembly 2306, adaptable light manipulator(s) driver circuitry 2334 is configured to send selected drive signals to one or more adaptable light manipulators 2344 within adaptable screen assembly 2306, and optional light generator driver circuitry 2336 is configured to send selected drive signals to an optional light generator 2346 within adaptable screen assembly 2306.

In one example mode of operation, processing unit 2314 operates pursuant to control logic to receive media content via media interface 2320 and to generate control signals necessary to cause driver circuitry 2304 to render such media content to screen 2306 in accordance with a selected viewing configuration. For example, processing unit 2314 may operate pursuant to control logic to receive first and second media content via media interface 2320 and present the first and second media content via first and second simultaneously-displayed views of adaptable screen assembly 2306 to corresponding first and second viewers, wherein at least the first view is observable by the first viewer but not the second viewer. Processing unit 2314 may cause such views to be delivered to certain locations based on information obtained from viewer tracking unit 2316. The control logic that is executed by processing unit 2314 may be retrieved, for example, from a primary memory or a secondary storage device connected to processing unit 2314 via communication infrastructure 2312 as discussed above. The control logic may also be retrieved from some other local or remote source. Where the control logic is stored on a computer readable medium, that computer readable medium may be referred to herein as a computer program product.

Among other features, driver circuitry 2304 may be controlled to send coordinated drive signals necessary for simultaneously displaying two-dimensional images, three-dimensional images and multi-view three-dimensional content via adaptable screen assembly 2306. A manner by which pixel array 2642, adaptable light manipulator 2644 (e.g., an adaptable parallax barrier), and light generator 2646 may be manipulated in a coordinated fashion to perform this function is described in commonly-owned, co-pending U.S. patent application Ser. No. 12/982,031, filed on even date herewith and entitled "Coordinated Driving of Adaptable Light Manipulator, Backlighting and Pixel Array in Support of Adaptable 2D and 3D Displays," the entirety of which is incorporated by reference herein. Note that in accordance with certain implementations (e.g., implementations in which pixel array comprises a OLED/PLED pixel array), adaptable screen assembly 2306 need not include light generator 2346.

In one embodiment, at least part of the function of generating control signals necessary to cause pixel array 2342, adaptable light manipulator 2344 and light generator 2346 to render media content to screen 2306 in accordance with a selected viewing configuration is performed by drive signal processing circuitry 2338 which is integrated within driver circuitry 2304. Such circuitry may operate, for example, in conjunction with and/or under the control of processing unit 2314 to generate the necessary control signals.

In certain implementations, control circuitry 2302, driver circuitry 2304 and adaptable screen assembly 2306 are all included within a single housing. For example and without limitation, all these elements may exist within a television, a laptop computer, a tablet computer, or a telephone. In accordance with such an implementation, the link 2350 formed between communication interfaces 2322 and 2330 may be replaced by a direction connection between driver circuitry 2304 and communication infrastructure 2312. In an alternate implementation, control circuitry 2302 is disposed within a first housing, such as set top box or personal computer, and driver circuitry 2304 and adaptable screen assembly 2306 are disposed within a second housing, such as a television or computer monitor. The set top box may be any type of set top box including but not limited to fiber, Internet, cable, satellite, or terrestrial digital.

III. Example Communication Infrastructure Including Simultaneous Pathways for Multi-Viewer Support FIG. 24 is a block diagram of an example communication system 2400 that comprises a communication infrastructure that includes simultaneous pathways for multi-viewer support in accordance with a further embodiment. Communication system 2400 allows co-located viewers to simultaneously consume different media content, such as different video content, via the same display screen, wherein video content delivered to at least one co-located viewer is not visible to the other co-located viewer(s).

In particular, communication system 2400 supports at least two overlapping pathways 2402 from at least two pieces of media content $2412_1$-$2412_n$ (which may either be independent media content pieces or related media content pieces) originating from one or more source media nodes 2402 to the eyes of one or more viewers, such as viewer 2408. For example, one overlapping pathway may service a left eye of viewer 2408 and another overlapping pathway may service a right eye of viewer 2408. As another example, one overlapping pathway may service one or both eyes of viewer 2408 and another overlapping pathway may service one or both eyes of another viewer (not shown in FIG. 24).

Each pathway includes communication links and nodes with constraints, such as but not limited to bandwidth constraints, processing commitments, processing power, link throughput and delays, or the like. For example, one or more shared or dedicated communication links 2414 may be used to provide a downstream media pathway for delivering first media content piece $2412_1$ to a first intermediate media node $2404_1$ and one or more shared or dedicated communication links 2416 may be used to provide a downstream media pathway for delivering second media content piece $2412_2$ to first intermediate media node $2404_1$. Furthermore one or more shared or dedicated communication links 2420 may be used to provide a downstream media pathway for delivering nth media content piece $2412_n$ to second intermediate media node $2404_2$ and one or more shared communication links 2418 may be used to deliver first media content piece $2412_1$ and second media content piece $2412_2$ from first intermediate media node $2404_1$ to second intermediate media node $2404_2$. Any number of additional links and intermediate nodes 2422 may be used to deliver the media content received by second intermediate media node $2404_2$ to nth intermediate media node $2404_n$ and one or more shared or dedicated communication links 2424 may be used to deliver the media content received by nth intermediate node $2404_n$ to a media system 2406. Each one of communication links 2414, 2416, 2418, 2420, 2422 and 2424 has at least one constraint as noted above. Each one of intermediate nodes $2404_1$-$2404_n$ also has at least one constraint as noted above.

Media system 2406 comprises a system that supports the simultaneous display of both a common visual presentation and multiple private, personalized visual presentations to multiple viewers via a single screen display 2430. This functionality may be achieved using one or more light manipulator(s) 2434 as described in the preceding section, and/or using eyewear systems 2432 such as shutter glass systems. Media system 2406 has one or more constraints, such as for example, processing power constraints, display interface constraints, display area (e.g., pixel) constraints, or the like.

A bi-directional pathway 2426 extends between all nodes $2404_1$-$2404_n$ in communication system 2400. Such bi-directional pathway 2426 supports (i) feedback and/or upstream or downstream communication about known pathway constraints; (ii) the communication of status information regarding current performance; (iii) the performance of operations to accommodate one or more constraints; and (iv) the communication of commands or requests to help meet a constraint (e.g., by requesting an alternate media content version or a subset of requested media content, modifying at least one characteristic of flowing media content, or the like).

In communication system 2400, all source media node(s) 2402 and intermediate media nodes $2404_1$-$2404_n$ can each participate directly or indirectly in the process of tailoring at least one if not all of the media pathway flows. Direct participation may include, for example and without limitation, changing resolution of media content, discarding media content associated with particular camera views, reducing a frame rate associated with media content (e.g., by discarding every other frame, or via some other mechanism or technique). Indirect participation may include, for example and without limitation, identifying a need and/or commanding/requesting other nodes to engage/assist via direct participation.

Generally speaking, the various nodes of communication system 2400 participate alone or in concert to try to meet requirements of the one or more viewers of media system 2406 and underlying media content element pieces involved. It is noted the various nodes operate not only to satisfy constraints associated with single screen display 2430, but also the needed amount thereof (regions, 3D/2D, etc.). For example, such nodes may logically reduce requested full screen, full high-definition (HD), and full 3Dx media content pieces (i.e., 3D media content pieces formed from x different perspective views) to meet the overall flow constraints.

For example, a viewer of media system 2406 may request three media content pieces, all of which are stored at some media sources in full 3D4-HD with three associated media pathways that overlap in at least parts thereof. If the link constraints and processing constraints in the various nodes along the way and in media system 2406 so permit, all three media content pieces could be delivered in full. But if the link constraints and processing constraints in the various node along the way and in media system 2406 do not so permit, then the media content pieces can be modified by any of the nodes. For example, the media content pieces could be modified such that one media content piece is presented for 2D viewing in a small region/window of display 2430, a second media content piece is presented in 3D2 in a small picture-in-picture like window/region of display 2430, and the third media content is presented in full screen 3D4 but with substantial overlap from the other two media content pieces in display 2430. Such viewing environment characteristics (e.g., display window/region size, display window/region overlap, resolution, number of three-dimensional views, and the like) comprise constraints of media system 2406 as discussed in more detail below.

Thus, in accordance with the foregoing, one or more nodes within communication system 2400 may determine that a piece of media content must be modified prior to or during delivery to display 2430 to satisfy one or more system constraints. Various approaches may be used to achieve such modification. For example, in one embodiment: (1) first, the overall pathway constraints are determined; (2) second, a decision is made concerning what action it to be taken and by which node(s); and (3) commands/requests are received and processed by such node(s). In a more localized embodiment: (a) a single node evaluates only its locally-known limitations; (b) based thereon, the node decides to take action to meet such constraints; and (c) the node carries out such actions.

FIG. 25 is a block diagram of an example communication system 2500 that comprises a communication infrastructure that includes simultaneous pathways for multi-viewer support in accordance with a further embodiment. Communication system 2500 allows co-located viewers to simultaneously consume different media content, such as different video content, via the same display screen, wherein video content delivered to at least one co-located viewer is not visible to the other co-located viewer(s).

In particular, as shown in FIG. 25, communication system 2500 includes a shared display screen 2502 that simultaneously delivers a first visual experience 2552 based on first media content to the eyes of a first viewer 2514 and a second visual experience 2554 based on second media content to the eyes of a second viewer 2516, wherein first viewer 2514 and second viewer 2516 are co-located in the same viewing area. Each of the first media content and the second media content may be obtained from one or more of a plurality of remote media sources 2510 and/or one or more of a plurality of local media sources 2512. First visual experience 2552, or at least a portion thereof, may be delivered in a manner such that it is not visible to second viewer 2516. Second visual experience 2554, or at least a portion thereof, may be delivered in a manner such that it is not visible to first viewer 2514. Various elements of communication system 2500 will now be described.

Shared display screen 2502 comprises a display screen that is capable of simultaneously presenting different media content to different viewers, wherein at least some media content presented to one viewer is not presented to the other viewer (s). As shown in FIG. 25, shared display screen 2502 includes a pixel array 2526 and driver circuitry 2522 connected thereto. Shared display screen 2502 also optionally includes a light generator 2524 and one or more adaptable light manipulators 2528 connected to driver circuitry 2522.

In one embodiment, shared display screen 2502 comprises an adaptable screen assembly such as any of those described above in reference to FIGS. 1, 7, 15, 17 and 23. In accordance with such an embodiment, driver circuitry 2522 can be controlled to configure adaptable light manipulator(s) 2528 so that a first image rendered to pixel array 2526 is delivered to the eyes of first viewer 2514 but not to the eyes of second viewer 2516 and so that a second image rendered to pixel array 2526 is simultaneously delivered to the eyes of second viewer 2516 but not to the eyes of first viewer 2514. As discussed above in reference to those embodiments, each of the first image and the second image may comprise a two-dimensional or three-dimensional image. Furthermore, as discussed above in reference to those embodiments, each of the first image and the second image may be concurrently rendered to different, overlapping, or partially overlapping areas of pixel array 2526.

In an alternative embodiment, shared display screen 2502 comprises a screen assembly that is configured to support the simultaneous presentation of different media content to different viewers by rendering frames of different media content to pixel array 2526 in an alternating manner that is synchronized with the opening and closing of shutter glasses, such as liquid crystal (LC) shutter glasses, worn by first viewer 2514 and second viewer 2516. For example, driver circuitry 2522 may be controlled to cause frames of first media content and second media content to be rendered to pixel array 2526 in an alternating fashion. First viewer 2514 may wear shutter glasses that are synchronized with shared display screen 2502 such that first viewer 2514 only perceives the rendered frames of the first media content while second viewer 2516 may wear shutter glasses that are synchronized with shared display screen 2502 such that second viewer 2516 only perceives the rendered frames of the second media content. Still other types of screen assemblies that are configured to support the simultaneous presentation of different media content to different viewers may be used, including ones that combine the use of adaptable light manipulators and shutter glasses to support the simultaneous presentation of different media content to different viewers.

As shown in FIG. 25, shared display screen 2502 may optionally include a light generator 2524. Such light generator 2524 may comprise a backlight or other light source suitable for illuminating pixels of pixel array 2526 in embodiments in which the pixels of pixel array 2526 are not self-illuminating. In embodiments of shared display screen 2502 that utilize one or more parallax barriers to perform the functions of adaptable light manipulator(s) 2528 and that support the simultaneous regional display of two-dimensional and three-dimensional content, light generator 2524 may comprise a non-uniform light generator such as described above in reference to FIGS. 15-17. Additionally, in an embodiment in which the pixels of pixel array 2526 are self-illuminating, pixel array 2526 may be controlled in a manner similar to that described above in reference to FIGS. 18 and 19 to achieve non-uniform light generation. Still other methods of achieving non-uniform illumination may be used.

Controller circuitry 2504 comprises circuitry that receives media content for delivery to each of first viewer 2514 and second viewer 2516 and that controls driver circuitry 2522 of shared display screen 2502 to deliver the media content in accordance with a particular viewing configuration. As noted above, controller circuitry 2504 may receive first media content and second media content and send signals to driver circuitry 2522 that causes driver circuitry 2522 to simultaneously deliver first visual experience 2552 based on the first media content to the eyes of first viewer 2514 and second visual experience 2554 based on the second media content to the eyes of second viewer 2516.

Depending upon the implementation, shared display screen 2502 may comprise a part of a television, a computer (such as a desktop computer, laptop computer, tablet computer or the like), a telephone (e.g., a cellular phone, smart phone), a personal media player, a personal digital assistant (PDA), a personal video game player, or any other device or system that includes a displays screen. Furthermore, depending upon the implementation, controller circuitry 2504 may be disposed in the same housing as shared display screen 2502 or may be disposed in a separate housing that is communicatively connected thereto.

Media content that is received by controller circuitry 2504 may originate from any of plurality of remote media sources 2510 and/or any of plurality of local media sources 2512. As shown in FIG. 25, remote media sources 2510 include a first remote media source 2536 and a second remote media source 2538, although it is to be understood that remote media sources 2510 may include more than two remote media sources. Examples of remote media sources 2510 include, but are not limited to, a cable television headend, a satellite broadcasting center, a terrestrial broadcasting center, an Internet server, or the like. Each such remote media source includes equipment for storing, accessing and transmitting media content to controller circuitry 2504 via one or more data communication links. Such media content may comprise broadcast media content or "on demand" media content that is delivered responsive to a particular viewer selection or request.

In contrast to remote media sources 2510 discussed above, local media sources 2512 are typically located on the same premises as shared display screen 2502. As shown in FIG. 25, local media sources 2512 include a first local media source 2540 and a second local media source 2542, although it is to be understood that local media sources 2512 may include more than two local media sources. Examples of local media sources 2512 include, but are not limited to, a computer (e.g., a laptop computer, a tablet computer, a desktop computer), a Digital Versatile Disc (DVD) player, a Blu-ray™ disc player, a video gaming console, a personal media player, a telephone (e.g., a cellular phone, smart phone), or a PDA. Each local media source is capable of accessing and transmitting media content to controller circuitry 2504 via a suitable communication interface. Each local media source may be activated to perform this function responsive to input from one of viewers 2514 or 2516 or responsive to signals received from an element within communication system 2500, such as controller circuitry 2504 or media processing node 2506.

As shown in FIG. 25, controller circuitry 2504 is connected to a media processing node 2506. Media processing node 2506 is intended to represent a system or device that performs functions related to obtaining media content from one or more of the remote and local media sources shown in FIG. 25 and providing such media content, or a substitute therefore, to controller circuitry 2504 in a manner and format suitable for display by shared display screen 2502. Depending upon the implementation, media processing node 2506 may be disposed in the same housing as controller circuitry 2504 or in a separate housing that is connected thereto.

In one embodiment, media processing node 2506 comprises set-top box circuitry such as that described in commonly-owned, co-pending U.S. patent application Ser. No. 12/982,062, filed on even date herewith and entitled "Set-top Box Circuitry that Supports Selective Delivery of 2D and 3D Content to Support a Viewing Environment," the entirety of which is incorporated by reference herein. In accordance with such an embodiment, media processing node 2506 may be configured to receive signals from a remote control device or other input device operated by first viewer 2514 and/or second viewer 2516, wherein such signals may specify media content to be obtained and/or a source from which to obtain media content. Based on such signals, media processing node 2506 may tune to a selected broadcast channel associated with a particular remote media source, send a request for media content to a particular remote "on demand" media source, initiate the streaming of content from a local media source, or the like. Such media content is then received by media processing node 2506 via an appropriate interface (not shown in FIG. 25) and processed for delivery to controller circuitry 2504.

In certain embodiments, media processing node 2506 may be configured to service a request for media content by obtaining different media content from one or more remote and/or local media sources and combining the media content to generate a single media content stream. For example, as described in the aforementioned, incorporated U.S. patent application Ser. No. 12/982,062, filed on even date herewith and entitled "Set-top Box Circuitry that Supports Selective Delivery of 2D and 3D Content to Support a Viewing Environment," media processing node 2506 may service requests for three-dimensional video content by combining different video streams representing different perspectives to create a new video stream (e.g., by combining a first two-dimensional video stream based on a first perspective with a second two-dimensional video stream based on a second perspective to create a three-dimensional video stream based on the first and second perspectives, or by combining a first three-dimensional video stream based on first and second perspectives with a second three-dimensional video stream based on third and fourth perspectives to create a multi-view three-dimensional video stream based on the first, second, third and fourth perspectives). A hierarchical video encoding and decoding scheme that may be used to efficiently deliver such combinable video streams is described in commonly-owned, co-pending U.S. patent application Ser. No. 12/982,053, filed on even date herewith and entitled "Hierarchical Video Compression Supporting Selective Delivery of Two-Dimensional and Three-Dimensional Video Content," the entirety of which is incorporated by reference herein.

As also described in the aforementioned, incorporated U.S. patent application Ser. No. 12/982,062, filed on even date herewith and entitled "Set-top Box Circuitry that Supports Selective Delivery of 2D and 3D Content to Support a Viewing Environment," media processing node 2506 may operate to obtain supplemental media content (e.g., advertisements, offers, bonus content or information) that is related to or unrelated to media content that is requested by a viewer and may combine the supplemental media content with the requested media content prior to delivery to controller circuitry 2504.

As further shown in FIG. 25, a media processing node/gateway 2508 may be disposed along a communication path from remote media source 2536 to media processing node 2506. Media processing node/gateway 2508 is intended to represent any intermediate device or system that serves to connect remote media source 2536 to media processing node 2506. Media processing node/gateway 2508 may comprise, for example, a router, switch, or other node that operates to selectively deliver certain media content to certain destinations. Media processing node/gateway 2508 may also comprise a gateway system or device that operates to transfer media content from a first physical layer to a second physical layer. Media processing node/gateway 2508 may also be configured to process media content received from a remote media source prior to forwarding the same to media processing node 2506. Although FIG. 25 shows only a single media processing node/gateway present on the communication path that connects remote media source 2536 to media processing node 2506, it is to be understood that more than one media processing node/gateway 2508 may be present on this communication path. Furthermore, one or more such media processing nodes/gateways may be present on the communication path connecting remote media source 2538, or any other remote media source, to media processing node 2506.

Communication system 2500 as described above simultaneously delivers first visual experience 2552 based on first media content to first viewer 2514 and second visual experience 2554 based on second media content to second viewer 2516. To achieve this, the infrastructure of communication system 2500 simultaneously utilizes a first pathway from the media source(s) from which the first media content is obtained through processing circuitry 2530 of controller circuitry 2504 and shared display screen 2502 to the eyes of first viewer 2514 and a second pathway from the media source(s) from which the second media content is obtained through processing circuitry 2530 of controller circuitry 2504 and shared display screen 2502 to the eyes of second viewer 2516.

As one example, assume that first viewer 2514 has tuned to a channel broadcast by remote media source 2536 to obtain broadcast video content while second viewer 2516 has activated playback of a DVD by local media source 2540. In accordance with this example, communication system 2500 will utilize a first pathway that passes the broadcast video content from remote media source 2536 to processing circuitry 2530 via media processing node/gateway 2508 and media processing node 2506. The first pathway further comprises the transformation of the broadcast video content by processing circuitry 2530 to control signals necessary to cause driver circuitry 2522 to present the broadcast video content to the eyes of first viewer 2514 via shared display screen 2502 and the corresponding light transmitted from shared display screen 2502 to the eyes of first viewer 2514. In further accordance with this example, communication system 2500 will utilize a second pathway that passes the DVD video content from local media source 2540 to processing circuitry 2530. The second pathway further comprises the transformation of the DVD video content by processing circuitry 2530 to control signals necessary to cause driver circuitry 2522 to present the DVD video content to the eyes of second viewer 2516 via shared display screen 2502 and the corresponding light transmitted from shared display screen 2502 to the eyes of second viewer 2516.

In every case in which communication system 2500 is operated to cause first and second media content to be simultaneously delivered via corresponding first and second pathways to first viewer 2514 and second viewer 2516, respectively, certain display resources will need to be shared among the two different pathways. These display resources may include, for example, pixels of pixel array 2526, and light generated thereby. Furthermore, depending upon how the first and second media content is delivered from the remote and local media source(s) to processing circuitry 2530, certain data communication resources may also need to be shared among the two different pathways. For example, processing power of a media source and/or one or more nodes that connect the media source to processing circuitry 2530 may need to be shared. As another example, one or more communication links that serve to connect a media source to processing circuitry 2530 (either directly or via a node) may also need to be shared.

As will be discussed in more detail below, processing circuitry within communication system 2500 is configured to manage resources that may be shared between multiple pathways of communication system 2500 to simultaneously deliver different media content from one or more media sources to first viewer 2514 and second viewer 2516 via shared display screen 2502.

In particular, such processing circuitry may manage the utilization of one or more shared display resources or data communication resources to simultaneously support two or more pathways. Furthermore, such processing circuitry may operate to allocate one or more shared display resources or data communication resources among the two pathways. The allocation may be performed in a manner that achieves a desired shared viewing configuration and/or that is based on underlying characteristics or constraints associated with one or more of the pathways. Still further, the aforementioned processing circuitry may modify an existing allocation of shared resources among the two pathways responsive to change in an existing shared viewing configuration or a changed characteristic or constraint associated with the one or more pathways. For example, the processing circuitry may set up or modify the allocation of a shared resource among the multiple pathways based on an ascertained characteristic associated with at least one of the pathways. As will also be discussed in detail below, the processing circuitry may be configured to receive feedback and/or to gather pathway characteristics to facilitate pathway support functions and resource allocation decisions. By simultaneously and adaptively managing each of the pathways, the processing circuitry can provide a stable, simultaneous, multiple-viewer viewing environment that can adapt over time as underlying pathway characteristics change.

A. Example Pathway Management Comprising Allocation of Shared Display Resources

In accordance with an embodiment, processing circuitry 2530 within controller circuitry 2504 is configured to manage shared display resources to support two pathways utilized by communication system 2500 to simultaneously deliver first visual experience 2552 based on first media content to the eyes of first viewer 2514 and to deliver second visual experience 2554 based on second media content to the eyes of second viewer 2516. Examples of such display resources include, but are not limited to, the pixels of pixel array 2526, the light emitted therefrom, and processing power of processing circuitry 2530.

In an embodiment in which shared display screen 2502 includes adaptable light manipulator(s) 2528, processing circuitry 2530 may allocate the light emitted by pixel array 2526 between the first pathway and the second pathway by causing driver circuitry 2522 to configure adaptable light manipulator(s) 2528 in a particular manner. In particular, as described above, a configuration of adaptable light manipulator(s) 2528 may be selected that delivers light from certain pixels of pixel array 2526 to first viewer 2514 but not to second viewer 2516 and that delivers light from certain other pixels of pixel array 2526 to second viewer 2516 but not to first viewer 2514. Processing circuitry 2530 may also cause driver circuitry 2522 to configure adaptable light manipulator(s) 2528 in a manner that allocates more display-generated light to one pathway or the other, or allocate certain display-generated light to both pathways.

In an alternate embodiment, processing circuitry 2530 may allocate the light emitted by pixel array 2526 to both pathways by causing frames of first media content and second media content to be rendered to pixel array 2526 in an alternating manner that is synchronized with the opening and closing of shutter lenses of glasses worn by first viewer 2514 and second viewer 2516. The light from pixel array 2526 is thus partitioned between the pathways on a time-domain basis. In accordance with such an embodiment, processing circuitry 2530 may control driver circuitry 2522 to modify a frequency at which frames of the first and second media content are rendered to pixel array 2526 and/or the duration of display of such frames. The shutter glasses worn by first viewer 2514 and second viewer 2516 are synchronized therewith. In this manner, processing circuitry 2530 and the shutter glasses may operate together to modify the amount of time first viewer 2514 and second viewer 2516 are able to view corresponding media content presented via shared display screen 2502. For example, processing circuitry 2530 may increase the frequency and/or duration of display of first media content to be delivered to the eyes of first viewer 2514 while reducing the frequency and/or duration of display of second media content to be delivered to the eyes of second viewer 2516.

Processing circuitry 2530 may also simultaneously allocate pixels of pixel array 2526 both to a first pathway used to deliver first visual experience 2552 based on first media content to the eyes of first viewer 2514 and to a second pathway to deliver second visual experience 2554 based on second media content to the eyes of second viewer 2516. For example, in an embodiment in which shared display screen 2502 includes adaptable light manipulator(s) 2528 in the form of one or more adaptable parallax barriers, processing circuitry 2530 may control driver circuitry 2522 to selectively render the first media content to a first portion of the pixels of pixel array 2528 made visible to only first viewer 2514 by the parallax barrier(s) while selectively rendering the second media content to a second portion of the pixels of pixel array 2528 made visible to only second viewer 2516 by the parallax barrier(s), wherein the size of the portions may vary depending upon the pathway allocations. Still further, processing circuitry 2530 may control driver circuitry 2522 to selectively render the first or second media content to a portion of the pixels of pixel array 2528 visible to both first viewer 2514 and second viewer 2516. In this manner, processing circuitry 2530 may selectively allocate more pixels of pixel array 2526 to the first pathway or the second pathway, or allocate pixels to both pathways.

Processing circuitry 2530 may also manage how pixels of pixel array 2526 that are allocated to each pathway are used to render media content to be delivered via that pathway. For example, processing circuitry 2530 may receive media content for display to first viewer 2514 via a first allocated pixel region of pixel array 2526. Processing circuitry 2530 may selectively map the media content to the pixels of the first allocated pixel region in different ways by, for example, selecting or changing a resolution at which the media content is displayed or selecting or changing a number of perspective views associated with the media content that are rendered to the allocated pixel region. Thus, for example, processing circuitry 2530 may receive high-definition media content representing eight perspective views (i.e., 4 different three-dimensional views) and selectively render it to a particular pixel region at the same resolution or with the same number of views, or selectively render it to the particular pixel region at standard definition and in a manner that only presents four perspective views.

Processing circuitry 2530 may selectively allocate shared display resources to the first pathway and the second pathway based on a wide variety of factors depending upon the implementation. These factors may include, for example and without limitation, whether or not first viewer 2514 and second viewer 2516 want to view different media content, a desired joint viewing configuration determined based on input received from first viewer 2514 and/or second viewer 2516, a current location/head orientation/point of gaze of first viewer 2514 and/or second viewer 2516, manually or automatically obtained feedback relating to how media content is being perceived by first viewer 2514 and/or second viewer 2516, current or fixed display constraints associated with shared display screen 2502 or interfaces thereto, characteristics of first media content to be displayed to first viewer 2514 and/or second media content to be displayed to second viewer 2516, constraints associated with communication links over which such media content is delivered (e.g., bandwidth constraints, channel quality limitations, delay), constraints associated with a media source or node that provides or processes such media content (e.g., processing power constraints), payment terms associated with media content or media content delivery services purchased or ordered by first viewer 2514 or second viewer 2516, and a quality of service associated with or assigned to first viewer 2514 or second viewer 2516 or media content delivered thereto.

Various examples of how processing circuitry 2530 may operate to manage and utilize display resources associated with shared display screen 2502 to simultaneously support two pathways used to simultaneously deliver two different visual experiences to two different viewers will now be described in reference to FIG. 26. In particular, FIG. 26 illustrates an example viewing environment 2600 in which shared display screen 2502 of communication system 2500 is used to simultaneously deliver first visual experience 2552 to first viewer 2514 and deliver second visual experience 2554 to second viewer 2516. In FIG. 26, screen interface circuitry 2602 is intended to encompass controller circuitry 2504 of FIG. 25 and may also encompass media processing node 2506 in certain embodiments.

As shown in FIG. 26, shared display screen 2502 is delivering entirely different visual experiences to first viewer 2514 and second viewer 2516. As discussed above, processing circuitry 2530 of controller circuitry 2504 may achieve this by selectively rendering first media content associated with first visual experience 2552 to a first set of pixels of pixel array 2526 and selectively rendering second media content associated with second visual experience 2554 to a second set of pixels of pixel array 2526 and then controlling adaptive light manipulator(s) 2528 to cause light generated by the first set of pixels to be observable only by first viewer 2514 and to cause light generated by the second set of pixels to be observable only to second viewer 2516. Alternatively, processing circuitry 2530 may achieve this by rendering frames of the first media content associated with first visual experience 2552 and frames of the second media content associated with second visual experience 2554 to pixel array 2526 in an alternating manner that is synchronized with shutter glasses worn by first viewer 2514 and second viewer 2516. In either case, processing circuitry 2530 acts to selectively allocate pixels of pixel array 2526 and the light generated therefrom to the pathways used to simultaneously produce first visual experience 2552 and second visual experience 2554.

Processing circuitry 2530 may also manage how pixels of pixel array 2526 that are allocated to each pathway are used to render media content to be delivered via that pathway. For example, processing circuitry 2530 may allocate a first region of pixel array 2526 to render first media content associated with first visual experience 2552 for display to first viewer 2514. Processing circuitry 2530 may selectively map the first media content to the pixels of the first allocated pixel region in different ways by, for example, selecting or changing a resolution at which the media content is displayed or selecting or changing a number of perspective views associated with the media content that are rendered to the allocated pixel region.

Processing circuitry 2530 may allocate and utilize such display resources in support of the two pathways responsive to at least input received from first viewer 2514 and/or second viewer 2516. Such input may specify, for example, the media content that each viewer desires to view and a desired viewing configuration associated therewith. First viewer 2514 may provide such input, for example, via a first remote control device 2604 and second viewer 2516 may provide such input, for example, via a second remote control device 2606. Such remote control input may be transmitted in the form of wireless remote control signals 2610 and 2612 to a remote control interface 2608 within screen interface circuitry 2602. Examples of such remote control devices and display systems that incorporate the same are described in commonly-owned, co-pending U.S. patent application Ser. No. 12/982,078, filed on even date herewith and entitled "Multiple Remote Controllers that Each Simultaneously Controls a Different Visual Presentation of a 2D/3D Display," the entirety of which is incorporated by reference herein. Additional user interfaces and devices may also be used to provide input from first viewer 2514 and second viewer 2516 to screen interface circuitry 2602.

In addition to input from first viewer 2514 and second viewer 2516 regarding desired media content and viewing configurations, processing circuitry 2530 may take a wide variety of other factors into account in determining how to utilize the shared display resources of communication system 2500 both when initially setting up the pathways associated with first visual presentation 2552 and second visual presentation 2554 and during ongoing utilization thereof.

For example, processing circuitry 2530 may adapt a configuration of pixel array 2526 and adaptable light manipulator (s) 2528 of shared display screen 2502 to deliver images associated with first visual experience 2552 to a first location and/or having a first orientation based on a determined location, head orientation and/or point of gaze of first viewer 2514. Likewise, processing circuitry 2530 may configure pixel array 2526 and adaptable light manipulator(s) 2528 of shared display screen 2502 to deliver images associated with second visual experience 2554 to a second location and/or having a second orientation based on a determined location, head orientation and/or point of gaze of second viewer 2516. Example techniques for determining a location, head orientation and/or point of gaze of a viewer of display screen such as shared display screen 2502 and adapting the display screen based on such information are described in commonly-owned, co-pending U.S. patent application Ser. No. 12/982, 068, filed on even date herewith and entitled "Three-Dimensional Display System with Adaptation Based on Viewing Reference of Viewer(s)," the entirety of which is incorporated by reference herein. Such techniques may involve, for example, communication between screen interface circuitry 2602 and location tracking circuitry disposed in either or both of remote control devices 2604 and 2606 or in either or both of a headset 2614 worn by first viewer 2514 and a headset 2616 worn by second viewer 2516.

Furthermore, processing circuitry 2530 may modify the allocation or usage of display resources based on feedback received from one or both of first viewer 2514 and second viewer 2516. Such feedback may be provided by each viewer via an interface (e.g., remote control devices 2604 and 2606) or obtained automatically (e.g., by cameras attached to remote control devices 2604 and 2606 or headsets 2614 and 2616). Mechanisms for providing such feedback are generally represented in FIG. 25 as feedback mechanism(s) 2518 and 2520. For example, if first viewer 2514 is wearing shutter glasses that are out of synchronization with shared display screen 2502, feedback generated by feedback mechanism(s) 2518 indicative of this condition may be received by controller circuitry 2504 and processing circuitry 2530 may operate to bring shared display screen 2502 and the shutter glasses into synchronization. As another example, if first viewer 2504 is receiving image content that is filtered by adaptable light manipulator(s) 2528 in a manner that is less than optimal given a current location, head orientation or point of gaze of first viewer 2504, feedback generated by feedback mechanism(s) 2518 indicative of this condition may be received by controller circuitry 2504 and processing circuitry 2530 may operate to modify a configuration of adaptable light manipulator(s) 2528 accordingly.

Processing circuitry 2530 may manage the utilization of the display resources to take into account certain current or fixed display constraints associated with shared display screen 2502. For example, processing circuitry 2530 may deliver requested media content to first viewer 2514 or second viewer 2516 having a number of perspective views or having a resolution than is less than what is desired by the viewer if shared display screen 2502 does not support display of the desired number of perspective views or desired resolution.

Furthermore, certain constraints associated with data communication links and nodes over which media content is delivered from remote or local media sources to processing circuitry 2530 may impact the manner in which processing circuitry 2530 delivers such media content to first viewer 2514 and/or second viewer 2516. For example, overloading of a media source or intermediate node (e.g., media processing node 2506, media processing node/gateway 2508) responsible for delivering media content to processing circuitry 2530 may require processing circuitry 2530 to present media content in a manner that is different than that desired by a viewer. As another example, bandwidth constraints or impairments on one or more links connecting a media source to processing circuitry 2530 may also require processing circuitry 2530 to present media content in a manner that is different than that desired by a viewer. Presenting media content in a manner that is different than that desired by a viewer may include presenting media content having a number of perspective views or having a resolution than is less than what is desired by a viewer, or presenting media content in a smaller region of shared display screen 2502 than desired by a viewer.

Processing circuitry 2530 is further configured to allocate display resources in a manner that takes into account the competing demands of presenting first visual experience 2552 to first viewer 2518 and presenting second visual experience 2552 to second viewer 2518 in light of existing display and data communication constraints. To this end, processing circuitry 2530 may operate to allocate a certain display resource evenly among the pathway associated with first visual experience 2552 and the pathway associated with second visual experience 2554, or may allocate more of a certain display resource to one pathway than another.

For example, in an embodiment in which processing circuitry 2530 alternately renders first and second media content to pixel array 2526 in a manner that is synchronized with the opening and closing of shutter lenses of glasses worn by first viewer 2514 and second viewer 2516, processing circuitry 2530 may increase the frequency and/or duration of display of the first media content to be delivered to the eyes of first viewer 2514 while reducing the frequency and/or duration of display of second media content to be delivered to the eyes of second viewer 2516.

As another example, in an embodiment in which processing circuitry 2530 selectively renders first media content to a first portion of the pixels of pixel array 2528 made visible to only first viewer 2514 by adaptable light manipulator(s) 2528 while selectively rendering second media content to a second portion of the pixels of pixel array 2528 made visible to only second viewer 2516 by adaptable light manipulator(s) 2528, processing circuitry 2530 may increase the size of the first portion at the expense of the size of the second portion.

The processing power of processing circuitry 2530 consumed in causing media content to be displayed via shared display screen 2502 may itself be a constrained resource that must be allocated between the two pathways. For example, more processing power of processing circuitry 2530 may be allocated to a first pathway associated with first visual experience 2552 than a second pathway associated with second visual experience 2554. This may enable the first pathway to deliver media content that consumes more processing power of processing circuitry 2530 than that being delivered by the second pathway. For example, this may enable the first pathway to deliver media content that occupies a larger pixel array region, has a higher resolution and/or more perspective views than media content being delivered over the second pathway.

Processing circuitry 2530 may allocate more of a finite display resource to one pathway than another based on a variety of factors. For example, payment terms associated with media content being delivered to either first viewer 2514 or second viewer 2516 may dictate a certain allocation of display resources. Furthermore, one or more of the pathways may have a quality of service associated therewith that may dictate a certain allocation of display resources.

Processing circuitry 2530 may also be configured to determine if a constraint associated with a particular portion of either pathway has been imposed or removed, thereby enabling or requiring processing circuitry 2530 to adaptively modify allocation of shared display resources between pathways based on the change. For example, if the delivery of first media content upon which first visual presentation 2552 is based is delayed due to an issue with a data communication link or node, processing circuitry 2530 may be required to present the first media content at a reduced resolution or using a lesser number of perspective views. This may "free up" other pixels of pixel array 2526 that can then be allocated by processing circuitry 2530 to support second visual presentation 2552.

FIG. 27 illustrates a further example viewing environment 2700 in which shared display screen 2504 of communication system 2500 is used to simultaneously deliver first visual experience 2552 to first viewer 2514 and deliver second visual experience 2554 to second viewer 2516. FIG. 27 illustrates that first visual experience 2552 and second visual experience 2554 may each include a shared view 2702, which comprises a visual presentation of the same media content. In accordance with one embodiment, processing circuitry 2530 may cause shared view 2602 to be presented to each of first viewer 2514 and second viewer 2516 by "turning off" certain light manipulator elements of adaptable light manipulator(s) 2528 associated with a corresponding portion of pixel array 2526. Alternatively, processing circuitry 2530 may cause shared view 2602 to be presented to each of first viewer 2516 and second viewer 2518 by configuring adaptable light manipulator(s) 2528 to deliver identical versions of the same media content to both viewers.

As further shown in FIG. 27, first visual experience 2552 includes a first visual element 27610 that is observable by first viewer 2514 but not by second viewer 2516. In an embodiment, processing circuitry 2530 causes first visual element 2710 to be presented to first viewer 2514 but not to second viewer 2516 by configuring adaptable light manipulator(s) 2528 to deliver certain pixels in a region of pixel array 2526 corresponding to first visual element 2710 to first viewer 2514 but not to second viewer 2516 and to deliver certain other pixels in the region of pixel array 2526 corresponding to first visual element 2710 to second viewer 2516 but not to first viewer 2514.

First visual element 2710 comprises a presentation of media content that is different than the media content used to support shared view 2702. For example, first visual element 2710 may comprise a "picture-in-picture" display of such other media content. For example, in accordance with one configuration, shared view 2702 comprises a visual presentation of first video content while first visual element 2710 comprises a picture-in-picture visual presentation of second video content. However, this is only an example, and first visual element 2710 may comprise a visual presentation of other types of media content as well.

As also shown in FIG. 27, second visual experience 2554 includes a second visual element 2704, a third visual element 2706 and a fourth visual element 2708 that are observable to second viewer 2516 but not to first viewer 2514. In an embodiment, processing circuitry 2530 causes these views to be presented to second viewer 2516 but not to first viewer 2514 by configuring adaptable light manipulator(s) 2528 to deliver certain pixels in regions of pixel array 2526 corresponding to these views to second viewer 2516 but not to first viewer 2514 and to deliver certain other pixels in the regions of pixel array 2526 corresponding to these views to first viewer 2514 but not to second viewer 2516.

Each of second visual element 2704, third visual element 2706 and fourth visual element 2708 comprises a presentation of media content that is different than the media content used to support shared view 2702. For example, in one embodiment, each of second visual element 2704, third visual element 2706 and fourth visual element 2708 may comprise a visual presentation of a different interactive graphical element or "widget" that appears overlaid upon shared view 2702. However, this is only an example, and each of these views may comprise visual presentations of other types of media content as well.

In accordance with the foregoing description, communication system 2500 may utilize a first pathway to deliver media content associated with first visual element 2710 to first viewer 2514 and a second pathway to deliver media content associated with any of second visual element 2704, third visual element 2706 or fourth visual element 2708 to second viewer 2516. As discussed above, processing circuitry 2530 may manage, utilize and selectively allocate display resources associated with shared display screen 2502 among these multiple pathways to achieve a particular viewing configuration based on a variety of factors including various characteristics and constraints associated with each of the various pathways.

B. Example Pathway Management Comprising Allocation of Shared Data Communication Resources Communication system 2500 includes processing circuitry that is configured to manage certain data communication resources that may be shared between multiple pathways to simultaneously deliver different media content from one or more media sources to first viewer 2514 and second viewer 2516 via shared display screen 2502. Such data communication resources may include for example and without limitation, processing resources of any of remote media sources 2510 and any of local media sources 2512, processing resources of media processing node/gateway 2508 and media processing node 2506, and communication links between any media source and node, any node and controller circuitry 2504, and any media source and controller circuitry 2504.

For example, first visual presentation 2552 may be supported by first media content obtained from remote media source 2536 and second visual presentation 2554 may be supported by second media content also obtained from remote media source 2536. In this case, the pathway associated with first visual presentation 2552 and second visual presentation 2554 is essentially the same. This means that processing power associated with each of remote media source 2536, media processing node/gateway 2508 and media processing node 2506 may need to be shared between the pathways. This also means that bandwidth along the communication link connecting remote media source 2536 to media processing node/gateway 2508, bandwidth along the communication link connecting media processing node/gateway 2508 to media processing node 2506, and bandwidth along the communication link between media processing node 2506 and controller circuitry 2504 may need to be shared between both pathways.

As another example, first visual presentation 2552 may be supported by first media content obtained from remote media source 2536 and second visual presentation 2554 may be supported by second media content obtained from local media source 2540. In this case, the pathways associated with first visual presentation 2552 and second visual presentation 2554 merge at media processing node 2506. This means that processing power associated with media processing node 2506 may need to be shared between the pathways. This also means that bandwidth along the communication link connecting media processing node 2506 to controller circuitry 2504 may need to be shared between both pathways.

To manage the sharing of media source processing power between two pathways leading to shared display screen 2502, each remote and local media source shown in FIG. 25 includes processing circuitry. In particular, remote media source 2536 includes processing circuitry 2544, remote media source 2538 includes processing circuitry 2546, local media source 2540 includes processing circuitry 2548 and local media source 2542 includes processing circuitry 2550. The processing circuitry of each media source may selectively allocate more processing power to delivering media content to one pathway versus another, or allocate roughly the same amount of processing power to each pathway. The allocation decision may be based on any of a variety of factors, including but not limited to characteristics of the media content being sent along each pathway, a quality of service associated with at least one of the pathways, payment terms associated with one of the pathways, or the like. The processing circuitry of each media source may adaptively modify the processing power allocation to each pathway responsive to changing conditions, such as changing load conditions on the media source or the like. The processing circuitry of each media source may be configured to obtain such load condition information or other information relating to the available processing power of the media source.

The processing circuitry of each media source may also operate to allocate bandwidth of a communication link between the media source and a downstream node (e.g., media processing node/gateway 2508 or media processing node 2506) between the two pathways. The processing circuitry of each media source may also adaptively modify such allocation based on changing conditions. For example, in certain embodiments, the processing circuitry of each media source may be configured to gather performance characteristics associated with the downstream communication link or downstream node and adaptively modify the bandwidth allocation of one or both pathways based on the performance characteristics.

As also shown in FIG. 25, media processing node/gateway 2508 also includes processing circuitry 2534. Processing circuitry 2534 may manage the sharing of the processing power of media processing node/gateway 2508 between two pathways leading to shared display screen 2502. In particular, processing circuitry 2534 may selectively allocate more processing power to processing media content on one pathway versus another, or allocate roughly the same amount of processing power to each pathway. The allocation decision may be based on any of a variety of factors, including but not limited to characteristics of the media content being sent along each pathway, a quality of service associated with at least one of the pathways, payment terms associated with one of the pathways, or the like. Processing circuitry 2534 may adaptively modify the processing power allocation to each pathway responsive to changing conditions, such as changing load conditions on media processing node/gateway 2508 or the like. Processing circuitry 2534 may be configured to obtain such load condition information or other information relating to the available processing power of media processing node/gateway 2508.

Processing circuitry 2534 may also operate to allocate bandwidth of a communication link between media processing node/gateway 2508 and a downstream node (e.g., media processing node 2506) between the two pathways. Processing circuitry 2534 may further operate to allocate bandwidth of a communication link between media processing node/gateway 2508 and an upstream node (e.g., any of remote media sources 2510) between the two pathways. Processing circuitry 2534 may also adaptively modify such allocations based on changing conditions. For example, in certain embodiments, processing circuitry 2534 may be configured to gather performance characteristics associated with an upstream communication link, an upstream node, a downstream communication link or downstream node and adaptively modify the bandwidth allocation of one or both pathways based on the performance characteristics.

As further shown in FIG. 25, media processing node 2506 also includes processing circuitry 2532. Processing circuitry 2532 may manage the sharing of the processing power of media processing node 2506 between two pathways leading to shared display screen 2502. In particular, processing circuitry 2532 may selectively allocate more processing power to processing media content on one pathway versus another, or allocate roughly the same amount of processing power to each pathway. The allocation decision may be based on any of a variety of factors, including but not limited to characteristics of the media content being sent along each pathway, a quality of service associated with at least one of the pathways, payment terms associated with one of the pathways, or the like. Processing circuitry 2532 may adaptively modify the processing power allocation to each pathway responsive to changing conditions, such as changing load conditions on media processing node 2506 or the like. Processing circuitry 2532 may be configured to obtain such load condition information or other information relating to the available processing power of media processing node 2506.

Processing circuitry 2532 may also operate to allocate bandwidth of a communication link between media processing node 2506 and a downstream node (e.g., controller circuitry 2530) between the two pathways. Processing circuitry 2532 may further operate to allocate bandwidth of a communication link between media processing node 2506 and an upstream node (e.g., any of remote media sources 2510, local media source 2512 or media processing node/gateway 2508) between the two pathways. Processing circuitry 2532 may also adaptively modify such allocations based on changing conditions. For example, in certain embodiments, processing circuitry 2532 may be configured to gather performance characteristics associated with an upstream communication link, an upstream node, a downstream communication link or downstream node and adaptively modify the bandwidth allocation of one or both pathways based on the performance characteristics.

C. Example Method for Operating Communication System that includes Simultaneous Pathways for Multi-Viewer Support FIG. 28 depicts a flowchart 2800 of an example method for operating a communication system that utilizes multiple pathways to simultaneously deliver media content to multiple corresponding viewers via a shared display screen. The method of flowchart 2800 may be implemented, for example, by communication system 2500 as described above in reference to FIG. 25. However, the method is not limited to that implementation. Persons skilled in the relevant art(s) will appreciate that the method may be implemented in other communication systems as well.

As shown in FIG. 28, the method of flowchart 2800 begins at step 2802 in which a first pathway from one or more media sources and through both processing circuitry and a shared display screen to a first viewer is utilized to deliver a first visual experience to the first viewer, the first visual experience being based on at least a first part of media content obtained from the media source(s). In accordance with an embodiment, at least a portion of the first visual experience is observable by the first viewer but not by a second viewer. For example, as discussed above in reference to communication system 2500 of FIG. 25, a first pathway from one or more of remote media sources 2510 and/or local media sources 2512 and through both processing circuitry 2530 and shared display screen 2502 to first viewer 2514 may be utilized to deliver first visual experience 2552 to first viewer 2514, wherein first visual experience 2552 is based on at least a first part of media content obtained from the one or more of remote media sources 2510 and/or local media sources 2512. As also discussed above, at least a portion of first visual experience 2552 may be observable by first viewer 2514 but not by second viewer 2516.

At step 2804, a second pathway from the media source(s) and through both the processing circuitry and the shared display screen to a second viewer is utilized to deliver a second visual experience to the second viewer simultaneously with the delivery of the first visual experience to the first viewer, the second visual experience being based on at least a second part of media content obtained from the media source(s). In accordance with an embodiment, at least a portion of the second visual experience is observable by the second viewer but not by the first viewer. For example, as discussed above in reference to communication system 2500 of FIG. 25, a second pathway from one or more of remote media sources 2510 and/or local media sources 2512 and through both processing circuitry 2530 and shared display screen 2502 to second viewer 2516 may be utilized to deliver second visual experience 2554 to second viewer 2516 simultaneously with the delivery of first visual experience 2552 to first viewer 2514, wherein second visual experience 2554 is based on at least a second part of media content obtained from the one or more of remote media sources 2510 and/or local media sources 2512. As also discussed above, at least a portion of second visual experience 2554 may be observable by second viewer 2516 but not by first viewer 2514.

At step 2806, at least one pathway resource that is shared between the first pathway and the second pathway is managed, or assistance for performing such management is provided. For example, as discussed above in reference to communication system 2500 of FIG. 25, processing circuitry 2530 may manage or assist in the management of one or more display resources associated with shared display screen 2502 that are shared between the two pathways. As also discussed above, such display resources may include but are not limited to pixels of pixel array 2526, light emitted thereby, processing power of controller circuitry 2504, or the like). As a further example, processing circuitry 2532 of media processing node 2506, processing circuitry 2534 of media processing node/gateway 2508 and any of processing circuitry 2544, 2546, 2548 and 2550 (associated with remote media source 2536, remote media source 2538, local media source 2540 and local media source 2542) may manage or assist in the management of one or more data communication resources associated with communication system 2500 that are shared between the two pathways. As also discussed above, such data communication resources may include but are not limited to processing power of any of remote media sources 2510, local media sources 2512, media processing node/gateway 2508 and media processing node 2506 and bandwidth along any direct or indirect communication link between any of the media sources and controller circuitry 2504.

In one embodiment, step 2806 includes at least assisting in the managing of the at least one pathway resource that is shared between the first pathway and the second pathway prior to beginning the simultaneous delivery of the first visual experience and the second visual experience. For example, with continued reference to communication system 2500 of FIG. 25, any of processing circuitry 2530, processing circuitry, 2532, processing circuitry 2534, processing circuitry 2544, processing circuitry 2546, processing circuitry 2548 and processing circuitry 2550 may operate to allocate a shared resource among the two pathways or obtain information used to allocate a shared resource among the two pathways prior to the utilization of such pathways to deliver first visual experience 2552 and second visual experience 2554, respectively.

In a further embodiment, step 2806 includes changing an allocation of the at least one pathway resource during the simultaneous delivery of the first visual experience and the second visual experience. For example, as discussed above in reference to communication system 2500 of FIG. 25, any of processing circuitry 2530, processing circuitry 2532, processing circuitry 2534, processing circuitry 2544, processing circuitry 2546, processing circuitry 2548 and processing circuitry 2550 may operate to change an allocation of a shared resource to the two pathways used to deliver first visual experience 2552 and second visual experience 2554 during the delivery of such visual experiences.

In another embodiment, step 2806 includes at least assisting in gathering a pathway characteristic. For example, with continued reference to communication system 2500 of FIG. 25, processing circuitry 2530 may gather characteristics associated with the pathway through display screen 2502 to first viewer 2514 used to deliver first visual experience 2552 and the pathway through display screen 2502 to second viewer 2516 used to deliver second visual experience 2554 for use in performing shared resource management functions. As discussed above, such characteristics may include but are not limited to a desired joint viewing configuration determined based on input received from first viewer 2514 and/or second viewer 2516, a current location/head orientation/point of gaze of first viewer 2514 and/or second viewer 2516, manually or automatically obtained feedback relating to how media content is being perceived by first viewer 2514 and/or second viewer 2516, current or fixed display constraints associated with shared display screen 2502 or interfaces thereto, characteristics of first media content to be displayed to first viewer 2514 and/or second media content to be displayed to second viewer 2516, constraints associated with communication links over which such media content is delivered (e.g., bandwidth constraints, channel quality limitations, delay), constraints associated with a media source or node that provides or processes such media content (e.g., processing power constraints), payment terms associated with media content or media content delivery services purchased or ordered by first viewer 2514 or second viewer 2516, and a quality of service associated with or assigned to first viewer 2514 or second viewer 2516 or media content delivered thereto. As further discussed above in reference to communication system 2500 of FIG. 25, one or more of processing circuitry 2532, processing circuitry 2534, processing circuitry 2544, processing circuitry 2546, processing circuitry 2548 and processing circuitry 2550 may be configured to gather performance characteristics associated with a node to which it is connected or a communication link thereto for use in performing shared resource management functions.

In yet another embodiment, the first pathway and the second pathway are both adaptive pathways and step 2806 includes adapting the first pathway and the second pathway based on at least one pathway performance characteristic. For example, as discussed above in reference to communication system 2500, both the first pathway used to deliver first visual experience 2552 to first viewer 2514 and the second pathway used to simultaneously deliver visual experience 2554 to second viewer 2516 may be adaptive in that aspects of each pathway (e.g., configuration or utilization of elements of shared display screen 2502, utilization of processing power of various nodes and communication links between same, etc.) may be dynamically modified by processing circuitry in response to changing conditions. Furthermore, such processing circuitry may adapt both pathways responsive to a changed condition associated with only one pathway. For example, in response to a changed condition on the pathway that is used to deliver first visual experience 2552 to first viewer 2514, processing circuitry may reduce the allocation of a particular shared resource to that pathway and increase the allocation of the shared resource to the pathway used to deliver second visual experience 2554 to second viewer 2516, or vice versa. As a particular example, a node associated with the delivery of media content in support of second visual experience 2554 may experience a performance issue. In response, processing circuitry 2502 may reduce the allocation of display resources to second visual experience 2554 (e.g., present a smaller view, thereby reducing pixels consumed by second visual experience 2554, or a view with less resolution or perspective views, thereby reducing process requirements associated with the display of second visual experience 2554). Processing circuitry 2502 may then allocate any excess display resources no longer required to support second visual experience 2554 to support first visual experience 2552.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A communication infrastructure used to support visual presentations based on media content observable by both a first viewer and a second viewer, the communication infrastructure comprising:
    a shared display screen having a pixel array;
    one or more media sources that store the media content, the media source(s) being external to the shared display screen;
    processing circuitry;
    a first pathway from the one or more media sources and through both the processing circuitry and the shared display screen, the first pathway supporting delivery of a first visual experience, the first visual experience being based on at least a first part of the media content, and at least a portion of the first visual experience being observable by the first viewer but not by the second viewer;
    a second pathway from the one or more media sources and through both the processing circuitry and the shared display screen, the second pathway supporting delivery of a second visual experience, the second visual experience being based on at least a second part of the media content, and at least a portion of the second visual experience being observable by the second viewer, the first pathway and the second pathway operating to simultaneously deliver via the shared display screen both the first visual experience and the second visual experience; and
    the processing circuitry at least assists in managing at least one shared data communication resource that is shared between the first pathway and the second pathway, the at least one shared data communication resource including at least one of processing power of a node located along the first pathway and the second pathway or bandwidth on a link located along the first pathway and the second pathway, managing the at least one shared data communication resource including managing an amount of the at least one shared data communication resource that is allocated to the first pathway and an amount of the at least one shared data communication resource that is allocated to the second pathway.

2. The communication infrastructure of claim 1, wherein the processing circuitry at least assists in the managing the at least one shared data communication resource prior to beginning the simultaneous delivery of the first visual experience and the second visual experience.

3. The communication infrastructure of claim 1, wherein the processing circuitry changes the allocation of the at least one shared data communication resource during the simultaneous delivery of the first visual experience and the second visual experience.

4. The communication infrastructure of claim 1, wherein the processing circuitry at least assists in managing the at least one shared data communication resource by at least assisting in gathering a pathway characteristic.

5. The communication infrastructure of claim 1, wherein the first pathway and the second pathway are both adaptive pathways and wherein the processing circuitry adapts the first pathway and the second pathway based on at least one pathway performance characteristic.

6. The communication infrastructure of claim 4, wherein the pathway characteristic comprises a number of camera views or resolution associated with the first video content or the second video content.

7. The communication infrastructure of claim 4, wherein the pathway characteristic comprises a quality of service associated with at least one of the first pathway and the second pathway.

8. The communication infrastructure of claim 4, wherein the pathway characteristic comprises payment terms associated with at least one of the first pathway and the second pathway.

9. A method for operating a communication system, comprising:
utilizing a first pathway from one or more media sources and through both processing circuitry and a shared display screen to deliver a first visual experience, the media source(s) being external to the shared display screen, the first visual experience being based on at least a first part of media content obtained from the media source(s) and at least a portion of the first visual experience being observable by a first viewer but not a second viewer;
utilizing a second pathway from the media source(s) and through both the processing circuitry and the shared display screen to deliver a second visual simultaneously with the delivery of the first visual experience, the second visual experience being observable by the second viewer and being based on at least a second part of the media content obtained from the media source(s); and
at least assisting in managing at least one shared data communication resource that is shared between the first pathway and the second pathway, the at least one shared data communication resource including at least one of processing power of a node located along the first pathway and the second pathway or bandwidth on a link located along the first pathway and the second pathway, managing the at least one shared data communication resource including managing an amount of the at least one shared data communication resource that is allocated to the first pathway and an amount of the at least one shared data communication resource that is allocated to the second pathway.

10. The method of claim 9, wherein the at least assisting in the managing of the at least one shared data communication resource comprises:
at least assisting in managing the at least one shared data communication resource prior to beginning the simultaneous delivery of the first visual experience and the second visual experience.

11. The method of claim 9, wherein the at least assisting in the managing of the at least one shared data communication resource comprises:
changing an allocation of the at least one shared data communication resource during the simultaneous delivery of the first visual experience and the second visual experience.

12. The method of claim 9, wherein the at least assisting in the managing of the at least one shared data communication resource comprises:
at least assisting in gathering a pathway characteristic.

13. The method of claim 9, wherein the first pathway and the second pathway are both adaptive pathways and wherein at least assisting in the managing of the at least one shared data communication resource comprises:
adapting the first pathway and the second pathway based on at least one pathway performance characteristic.

14. A communication infrastructure, comprising:
a first pathway that delivers via a screen assembly first video content from one or more media sources external to the screen assembly, the first video content being observable by a first viewer but not a second viewer, and the screen assembly comprising a pixel array;
a second pathway that simultaneously delivers via the screen assembly second video content from the media source(s), the second video content being observable by the second viewer but not the first viewer, and the first pathway and the second pathway sharing one or more shared data communication resources including at least one of processing power of at least one node located along the first pathway and the second pathway or bandwidth on at least one link located along the first pathway and the second pathway; and
processing circuitry connected to the screen assembly that at least assists in managing at least one of the shared data communication resources between the first pathway and the second pathway responsive to ascertaining at least one characteristic of the first pathway or the second pathway, managing the at least one shared data communication resource including managing an amount of the at least one shared data communication resource that is allocated to the first pathway and an amount of the at least one shared data communication resource that is allocated to the second pathway.

15. The communication infrastructure of claim 14, wherein the at least one ascertained characteristic of the first pathway or the second pathway comprises a number of camera views or resolution associated with the first video content or the second video content.

16. The communication infrastructure of claim 14, wherein the at least one ascertained characteristic of the first pathway or the second pathway comprises a quality of service associated with at least one of the first pathway and the second pathway.

17. The communication infrastructure of claim 14, wherein the at least one ascertained characteristic of the first pathway or the second pathway comprises payment terms associated with at least one of the first pathway and the second pathway.

18. The communication infrastructure of claim 14, wherein the at least one node operates to modify the first video content prior to delivery to the screen assembly.

19. The communication infrastructure of claim 18, wherein the at least one node modifies the first video content by changing a number of camera views included in the first video content.

20. The communication infrastructure of claim 18, wherein the at least one node modifies the first video content by changing a resolution level associated with the first video content.

21. The communication infrastructure of claim 18, wherein the at least one node operates to modify the first video content based on at least one of:
a delay associated with at least one link along the portion of the first pathway that extends between a source of the first media content and the screen assembly; and
a processing constraint associated with at least one node located along the portion of the first pathway that extends between the source of the first media content and the screen assembly.

22. The communication infrastructure of claim 14, wherein the at least one node operates to modify the second video content prior to delivery to the screen assembly.

23. The communication infrastructure of claim 22, wherein the at least one node modifies the second video content by changing a number of camera views included in the second video content.

24. The communication infrastructure of claim 22, wherein the at least one node modifies the second video content by changing a resolution level associated with the second video content.

25. The communication infrastructure of claim 22, wherein the at least one node operates to modify the second video content based on at least one of:
   a delay associated with at least one link along the portion of the second pathway that extends between a source of the second media content and the screen assembly; and
   a processing constraint associated with at least one node located along the portion of the second pathway that extends between the source of the second media content and the screen assembly.

26. The communication infrastructure of claim 14, wherein the processing circuitry at least assists in managing the at least one shared data communication resource prior to beginning the simultaneous delivery of the first video content and the second video content.

27. The communication infrastructure of claim 14, wherein the processing circuitry changes the allocation of the at least one shared data communication resource during the simultaneous delivery of the first video content and the second video content.

28. The communication infrastructure of claim 14, wherein the first pathway and the second pathway are both adaptive pathways and wherein the processing circuitry adapts the first pathway and the second pathway based on at least one pathway performance characteristic.

\* \* \* \* \*